United States Patent
Ikeno

(10) Patent No.: US 7,154,617 B2
(45) Date of Patent: Dec. 26, 2006

(54) INFORMATION PROCESSING APPARATUS AND METHOD WITH ASYNCHRONOUS RECEPTION OF AN OUTPUT JOB AND UPDATABLE RESOURCE DATA

(75) Inventor: Hideo Ikeno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 783 days.

(21) Appl. No.: 10/190,533

(22) Filed: Jul. 9, 2002

(65) Prior Publication Data

US 2003/0011816 A1    Jan. 16, 2003

(30) Foreign Application Priority Data

Jul. 16, 2001    (JP) .............................. 2001-215935

(51) Int. Cl.
*G06F 3/12*    (2006.01)
(52) U.S. Cl. ..................................... 358/1.13; 358/1.14
(58) Field of Classification Search ............... 358/1.13, 358/1.14
See application file for complete search history.

(56) References Cited

U.S. PATENT DOCUMENTS

| 5,432,899 | A | | 7/1995 | Iwatani et al. .............. 395/145 |
|---|---|---|---|---|
| 5,542,050 | A | | 7/1996 | Onozawa ..................... 395/110 |
| 5,592,593 | A | * | 1/1997 | Speed ......................... 358/1.11 |
| 5,819,015 | A | * | 10/1998 | Martin et al. ............... 358/1.15 |
| 6,202,092 | B1 | * | 3/2001 | Takimoto ..................... 709/225 |
| 6,246,485 | B1 | * | 6/2001 | Brown et al. ............... 358/1.13 |
| 6,606,163 | B1 | * | 8/2003 | Suzuki et al. ............... 358/1.15 |
| 2001/0022670 | A1 | * | 9/2001 | Nagata ........................ 358/405 |

FOREIGN PATENT DOCUMENTS

| JP | 10-091371 | 4/1998 |
|---|---|---|
| JP | 2000-25860 | 1/2000 |

* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

This invention relates to a printing apparatus or information processing apparatus, which is connected to a peripheral device management apparatus and holds updatable resource data. The printing apparatus or information processing apparatus asynchronously receives an output job and resource data used upon processing the output job from the peripheral device management apparatus connected to it. Upon receiving the resource data, reception of a new output job after the reception of the resource data is stopped. When it is determined that the process of a print job, which has already been received and queued, is complete, the held resource data is updated by the resource data received by a reception unit.

28 Claims, 41 Drawing Sheets

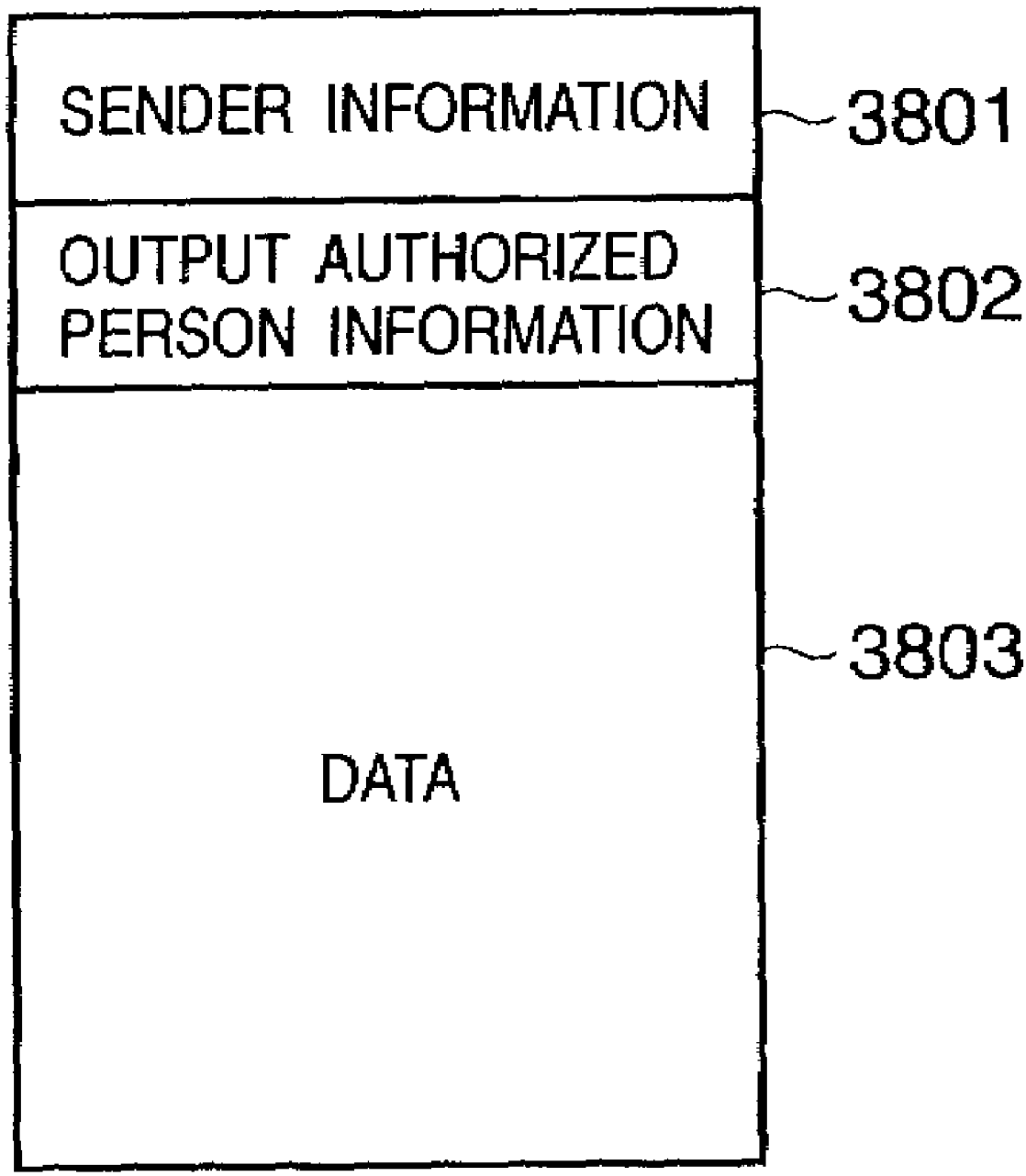

INFORMATION PROCESSING APPARATUS AND METHOD WITH ASYNCHRONOUS RECEPTION OF AN OUTPUT JOB AND UPDATABLE RESOURCE DATA

FIELD OF THE INVENTION

The present invention relates to an information processing apparatus and printing apparatus, and their control method, in a system that provides an environment in which an information processing apparatus such as a computer or the like is connected to a printer, hybrid function copying machine, or the like, and these apparatuses can asynchronously exchange data via multi-channels.

BACKGROUND OF THE INVENTION

In a conventional system that downloads resources such as font data and the like to an output device, such downloading is to be managed by a system administrator. The downloading method includes a first method in which connections to the output device to which resources are to be downloaded other than that from the administrator are physically shut off, and the administrator downloads the resources while occupying the output device, and a second method in which the administrator downloads resources, while print data from other users are accepted, so as to parallelly execute the output and download processes.

Japanese Patent Laid-Open No. 2000-25860 has proposed a third method. In this method, upon downloading resources to be used by print data, the print process of which is underway by a given output device, in a multi-channel environment in which the output device can be simultaneously connected to a plurality of information processing apparatuses, the print process of that output device is temporarily paused to preferentially download resources, and restarts upon completion of downloading.

However, it is impossible to practically implement the first method in which the administrator physically occupies the output device in a large-scale network environment connected to a LAN or the Internet.

In the second method in which the print and download processes are parallelly executed, since the resources used to generate a print image are changed simultaneously with generation of the print image, an unexpected output such as garbled characters or the like is formed, and it becomes impossible to recover the output device due to destruction of data.

In the third method that preferentially executes downloading, upon outputting a given output job, the resources of the output device and only that output job are accommodated. For this reason, in an environment in which the resource download process and the output process are not synchronously done, the resource download process may unexpectedly influence other output jobs which do not use those resources. For example, in an environment in which a printer is connected to a network, many uses use it as an output device, and the administrator downloads the resources, the output results of many users are unexpectedly influenced by the download process of the resources, which are used by a specific print job.

As described above, in any of the conventional methods, it is difficult to implement downloading of resources to an output device, which is connected to a network and is shared by apparatuses on the network, and use of the output apparatus without causing any unexpected results.

SUMMARY OF THE INVENTION

The present invention has been made in consideration of the prior arts, and has as its object to provide a peripheral device management apparatus and method, and a printing apparatus and its control method, which can prevent conflict between the resource download process and the output process, and can download resources without unexpectedly influencing output results.

In order to achieve the above object, the present invention comprises the following arrangement.

A printing apparatus which can asynchronously receive an output job and resource data used upon processing the output job from a peripheral device management apparatus, and holds updatable resource data, comprises reception control means arranged to stop, when resource data is received by a reception unit, reception of a new output job after the reception of the resource data; and an update unit arranged to update the held resource data by the received resource data, when it is determined that a process of a print job which has already been received and queued is complete.

Preferably, the update unit determines, upon receiving the resource data, completion of the process of the print job if a printout process of the print job which has already been received and queued is complete.

More preferably, the update unit determines, upon receiving the resource data, completion of the process of the print job by deleting the print job which has already been received and queued.

More preferably, the apparatus further comprises a conversion unit arranged to convert, upon receiving the resource data, data of the print job, which has already been received and queued, using the held resource data, and to store the converted data in a save area, and wherein the update unit determines completion of the process of the print job after the conversion unit has converted the data of the queued print job.

More preferably, the resource data contains font data, and the conversion unit converts the print job into image data using the held resource data.

More preferably, the print job includes a print job which requires authentication of an authorized person upon outputting the print job, and the conversion unit stores authentication information required to permit output of the image data together with the image data for the print job which requires authentication.

More preferably, the apparatus further comprises issuing means arranged to issue, upon receiving the resource data, a message indicating that the resource data is to be updated to an address designated by each print job, which has already been received and queued, and wherein the update unit deletes the print job a predetermined time period after the message is issued.

More preferably, the print job includes a print job which requires authentication of an authorized person upon outputting the print job, and the update unit stores authentication information required to permit output of the image data together with the image data for the print job which requires authentication.

Or more specifically, an information processing apparatus connected to a printing apparatus, which can asynchronously receive an output job and resource data used upon processing the output job from a peripheral device management apparatus, and holds updatable resource data, comprising reception control means arranged to stop, when resource data is received, reception of a new output job after the reception of the resource data; and an update unit arranged to update the resource data held by the printing apparatus by the received resource data, when it is determined that a process of a print job which has already been received and queued is complete.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 41 shows the structure of print data (print job).

DETAILED DESCRIPTION OF THE PREFERRED EMBODIMENTS

[First Embodiment]
<System Arrangement>

Figure 1:
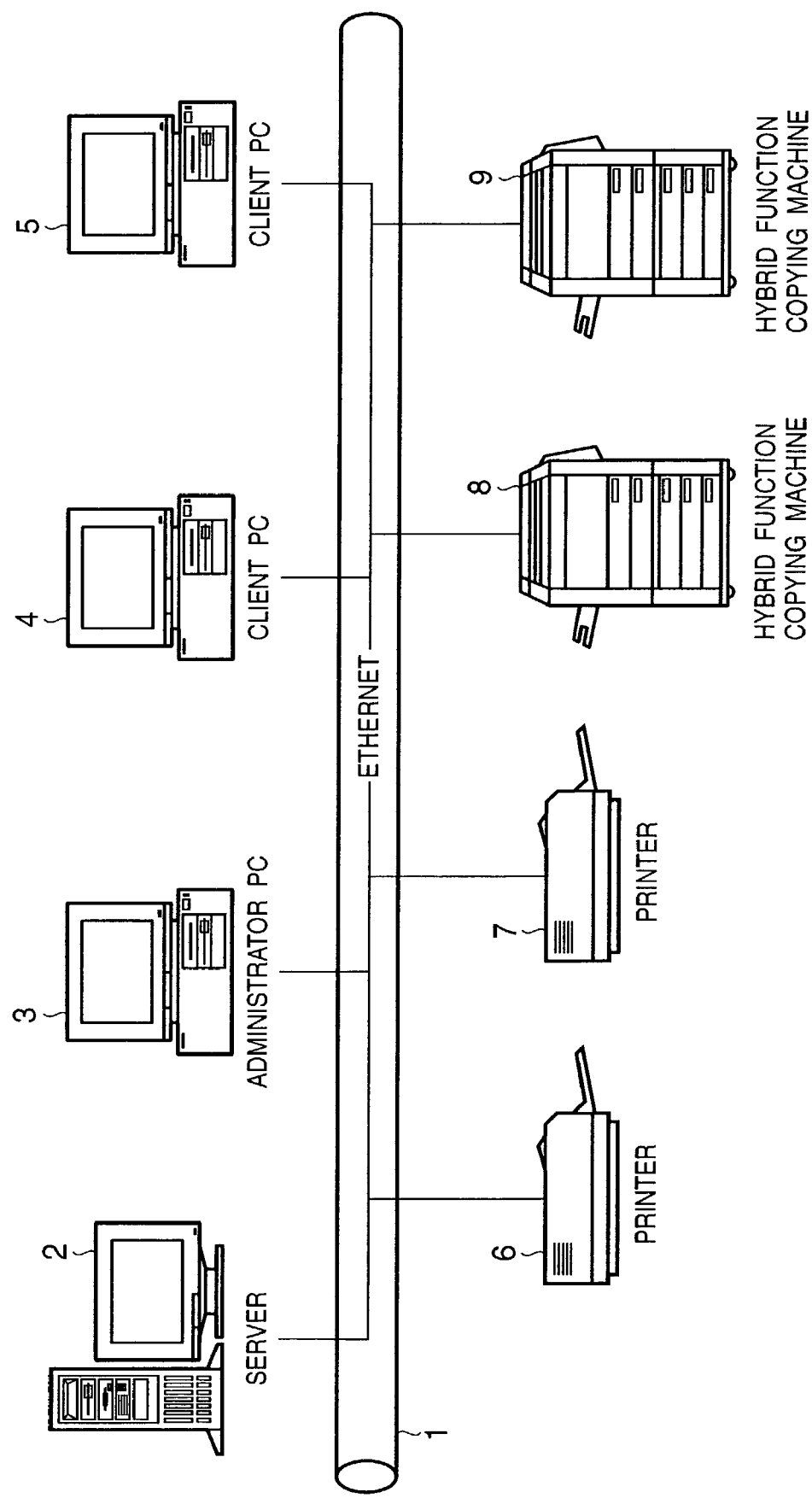
FIG. 1 is a diagram showing the arrangement of devices according to the first embodiment of the present invention.

FIG. 1 best illustrates a characteristic feature of the present invention, and the arrangement of a print system according to an embodiment of the present invention will be described below using FIG. 1. In FIG. 1, Ethernet is normally used as a network 1. In addition to Ethernet, LocalTalk or the like may be used. Note that "network" in this embodiment indicates a physical cable, an electrical signal that flows on the cable, and one or a plurality of protocols which implement information exchange as a combination of electrical signals, and normally indicates their generic description. A server computer 2 has functions of a file server, Web server, and the like, and comprises the core of this system. An administrator personal computer (to be abbreviated as a PC hereinafter) 3 is used to issue instructions to the server and peripheral devices. Client PCs 4 and 5 are connected to the network, and are used by normal users. Note that even the administrator PC may be used as a client PC. Printers 6 and 7 are connected to the network 1, receive print commands from the client PCs 4 and 5, and execute print processes according to the commands. Hybrid function copying machines 8 and 9 comprise an image scanner function, printer function, and facsimile function, and can be used as a copying machine, printer, scanner, and facsimile by combining one or a plurality of functions.

The operation of this system will be explained below using FIG. 1. The server 2 periodically communicates with the printers 6 and 7 and hybrid function copying machines 8 and 9 to monitor their states and software setups. The administrator PC 3 changes setups, software, and resources used by software in the devices. The results of instructions issued by the administrator PC 3 are collected as information in the server 2, and the client PCs 4 and 5 receive that information from the server 2. The server 2 comprises a communication means using the http protocol, and the administrator PC 3, and client PCs 4 and 5 can acquire information from the server 2 using Web browsers or can issue instructions to the server 2. Upon receiving an instruction from the administrator PC 3 or the client PC 4 or 5, the server 2 returns information to the administrator PC 3 or the client PC 4 or 5 using information stored in it. Depending on the contents of information, the server 2 acquires information from the printers 6 and 7 and hybrid function copying machines 8 and 9, and returns that information to the administrator PC 3 or the client PC 4 or 5, or executes a process such as a setup process for the printers 6 and 7 and hybrid function copying machines 8 and 9. The administrator PC 3 comprises a downloader, and downloads software or resources used by software to the printers 6 and 7 and hybrid function copying machines 8 and 9. The software includes print control firmware, network control firmware, and the like of a device. In the hybrid function copying machines 8 and 9, the software to be downloaded includes scanner control firmware, facsimile control firmware, copying machine firmware, panel operation firmware, image management software, address management software, and the like in addition to the aforementioned firmware programs. The resources used by software include fonts, external characters, overlay forms, calibration tables, address information and facsimile numbers used by address management software, and the like.

The client PCs 4 and 5 hold software (drivers and the like) required to access and use the printers 6 and 7 and hybrid function copying machines 8 and 9, and resources (client PC resources) used by the software. The software held by these PCs includes a printer driver required to use a printer, a scanner driver required to use a scanner, a facsimile driver required to use a facsimile, copying machine utility software required to control the copying machine, a network driver required to use the network, a Web browser, application software, and the like. The resources used by the software include client PC fonts corresponding to printer fonts, address information used by the facsimile driver, print data required upon color calibration, an overlay image used in preview, and the like.

In addition to the aforementioned functions, the setup contents, software, and resources used by software of the printer 6 can be reflected in the printer 7, and hybrid function copying machines 8 and 9. Likewise, the setup contents, software, and resources used by software of the hybrid function copying machine 8 can be reflected in the hybrid function copying machine 9 and the printers 6 and 7. If functions are different between models, only functions common to these models are reflected. Information such as resources or the like that can be converted is reflected after conversion. Also, information on the client PC 4 that pertains to these models can be reflected in the client PC 5. Such processes are implemented by exchanging information via the server 2.

The setup contents of the printers 6 and 7 and hybrid function copying machines 8 and 9 are often changed not only by instructions from the administrator PC 3 but also by setups from a panel and the client PCs. As for information that must be accurately passed to each client PC, when a display instruction or the like is received from the client PC, an inquiry is issued to the printers 6 and 7 and hybrid function copying machines 8 and 9, and information at the time of the inquiry is returned to the client PC. As for information that does not strictly require accuracy, information held in the server is used.

Figure 2:
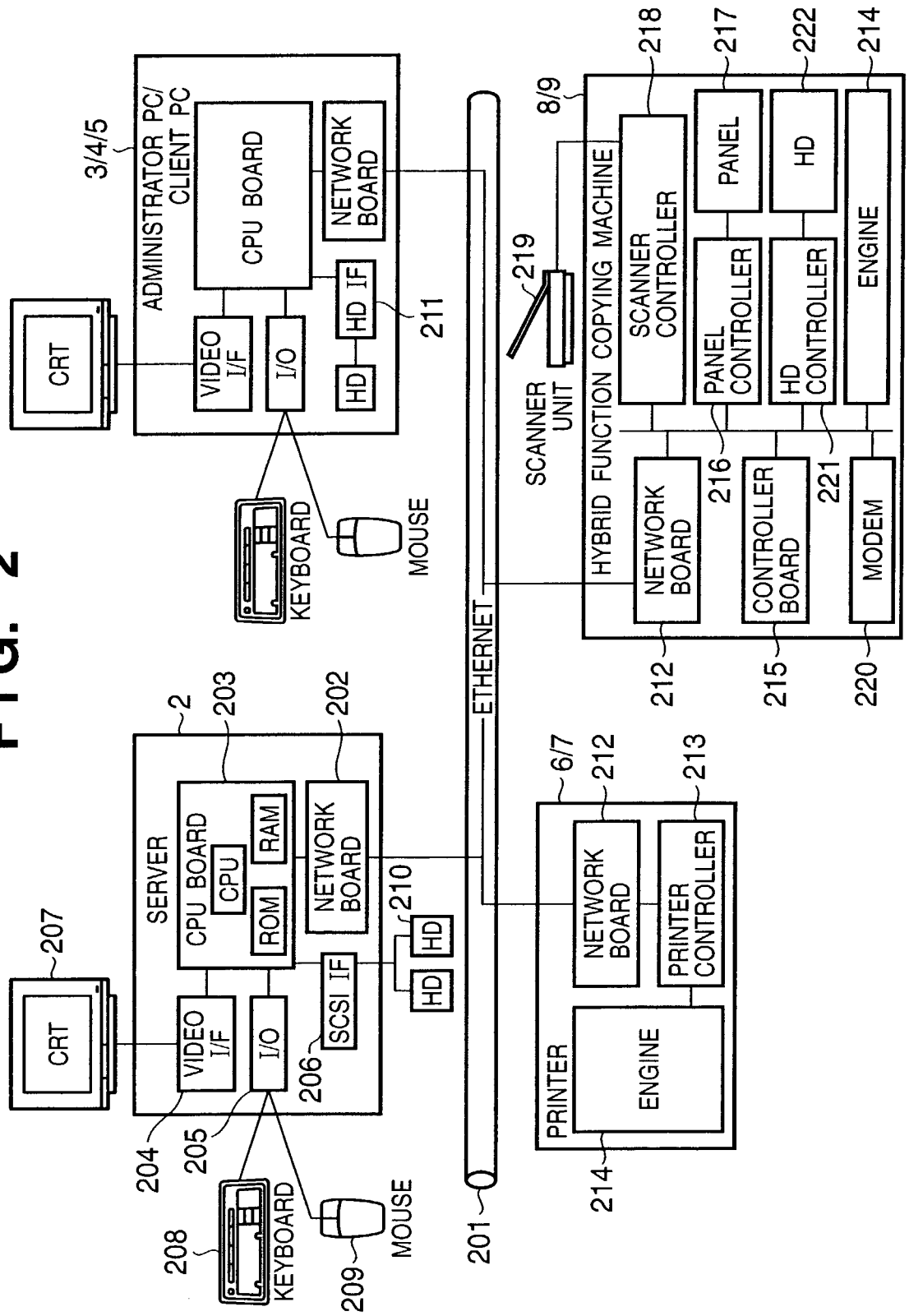
FIG. 2 is a block diagram showing principal hardware modules of the respective devices in the present invention.

FIG. 2 shows principal hardware modules of the respective devices in the system shown in FIG. 1. The functions of the hardware modules of the respective devices will be explained below using FIG. 2. Referring to FIG. 2, a network line 201 is a physical line which forms a network among the respective devices, and normally uses a twisted pair cable, coaxial cable, optical fiber, or the like. Hardware modules which form the server 2 include a network board 202, CPU board 203, Video interface 204, I/O interface 205, and SCSI interface 206, and a CRT 207, keyboard 208, mouse 209, and hard disk drive 210 which latter four are connected to these boards and interfaces. The hard disk drive 210 comprises a parallel circuit of a plurality of hard disk units, and assures high-speed and highly reliable data transfer. Hardware modules which form each of the administrator PC 3 and client PCs 4 and 5 include a network board 202, CPU board 203, Video interface 204, I/O interface 205, and IDE interface 211, and a CRT 207, keyboard 208, mouse 209, and hard disk drive 210 which latter four are connected to these boards and interfaces. These PCs and server have different hard disk configurations. Hardware modules of each of the printers 6 and 7 include a network board 212 compatible to a peripheral device, a network board 212, and a printer controller 213. Hardware modules of each of the hybrid function copying machines 8 and 9 include a network board 212 compatible to a peripheral device, a hybrid function copying machine controller 215, a print engine 214, a control panel controller 216, a control panel 217, a scanner controller 218, a scanner unit 219, a modem 220, a hard disk IF 221, and a hard disk 222.

Figure 3:
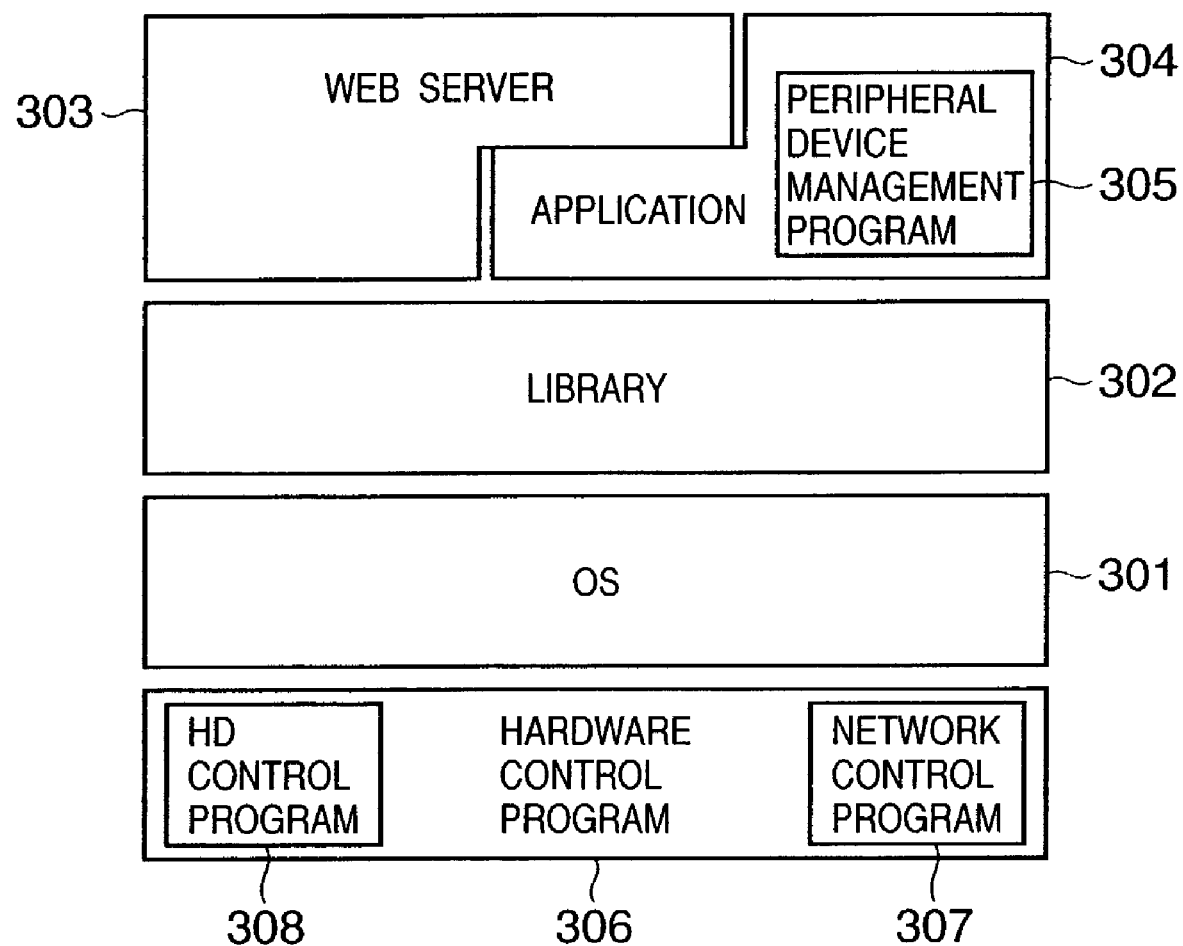
FIG. 3 shows the software configuration of a server.

FIG. 3 shows the software configuration of the server 2. Referring to FIG. 3, an OS (operating system) 301 manages various resources of the server 2. A library 302 includes a software module group that provides various functions to an application. A Web server 303 has a function of providing data and the like possessed by the server 2 to Web clients in accordance with the hypertext transport protocol (http), and passing data received from a Web client to a backend program (CGI program) that runs on the server 2 to make it process the data. An application 304 includes a peripheral device management program 305. A hardware control program 306 includes a network board control program 307 and hard disk control program 308.

Figure 4:
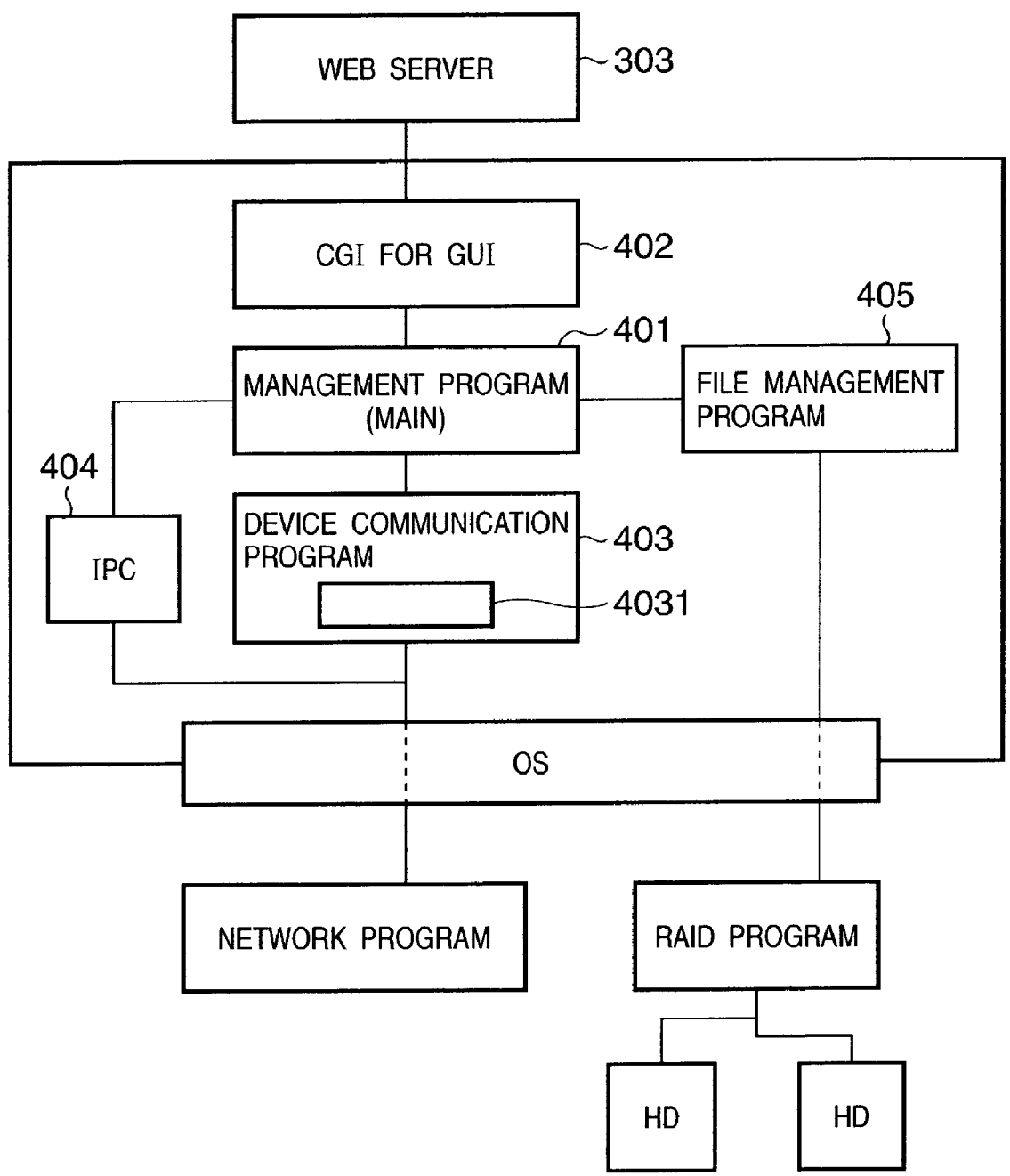
FIG. 4 is a block diagram showing the configuration of a peripheral device management program.

FIG. 4 shows the configuration of the peripheral device management program 305 of the server 2. The peripheral device management program 305 is implemented as one of applications on the server 2. A main module 401 of the management program controls the entire management program. A CGI program 402 for GUI (CGI 402) passes screen data expressed in the html format to the Web server 303. The Web server 303 outputs data of the CGI 402 to the administrator PC 3 or the client PC 4 or 5 in the http format, and sends an instruction from the administrator PC 3 or the client PC 4 or 5 to the management program 401. A device communication program 403 makes communications between peripheral devices and the server using the network program 307 to acquire information or the like from devices, to set up devices, to download software or resources used by software, and so forth. The device communication program 403 includes a peripheral device information acquisition module 4031. An IPC 404 is a program used to make inter-process communications, and makes communications with another PC (especially, the administrator PC 3) using the network program 307. A file management program 405 implements a file server function exploiting the HD control program 308.

Figure 5:
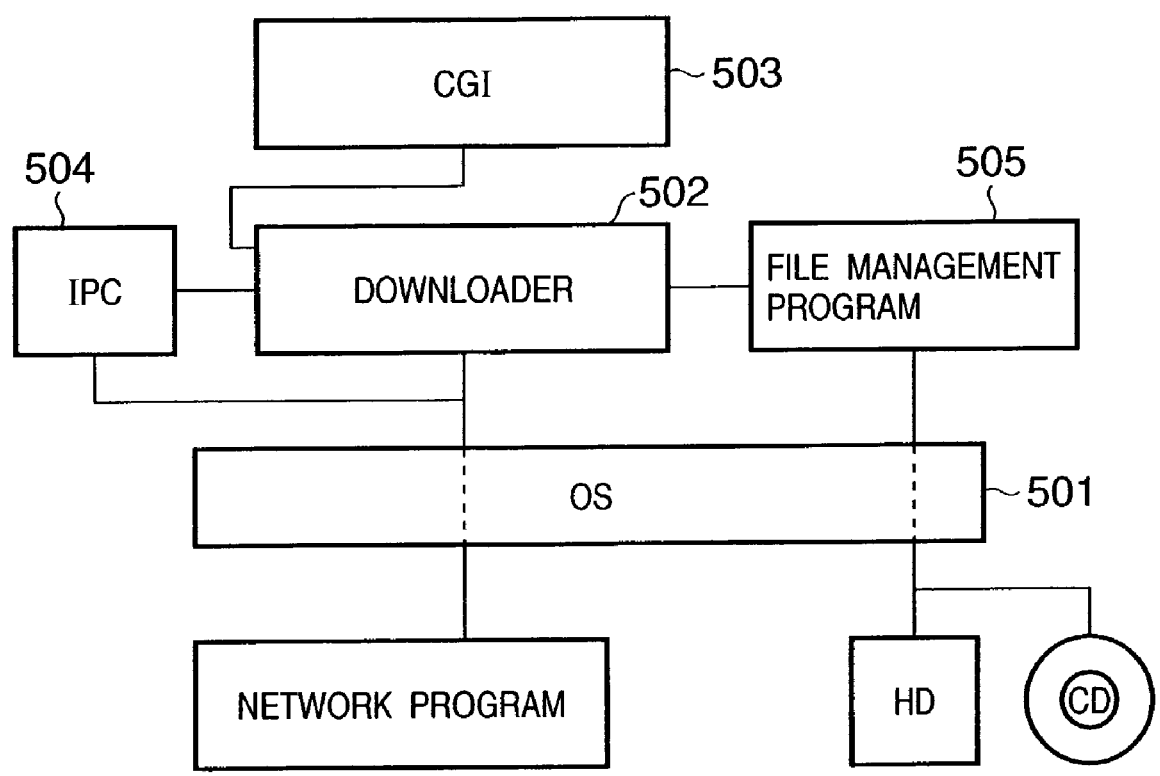
FIG. 5 is a block diagram showing the software configuration of an administrator PC.

FIG. 5 shows the software configuration of the administrator PC 3. Referring to FIG. 5, an OS 501 executes general processes of the administrator PC. A main program of a downloader 502 downloads software and resources used by software to peripheral devices. A GUI program 503 implements a user interface function such as display, transmission of a user's instruction to the downloader, and the like. An IPC program 504 communicates with the IPC 404 of the server. A file management program 505 is normally implemented as a part of the OS 501, and manages files as the contents of the hard disk or a CD-ROM upon downloading the files to peripheral devices via the downloader 502. A network program 506 is normally implemented as a part of the OS 501, and makes network communications upon downloading files as the contents of the hard disk or CD-ROM to peripheral devices via the downloader 502.

Figure 6:
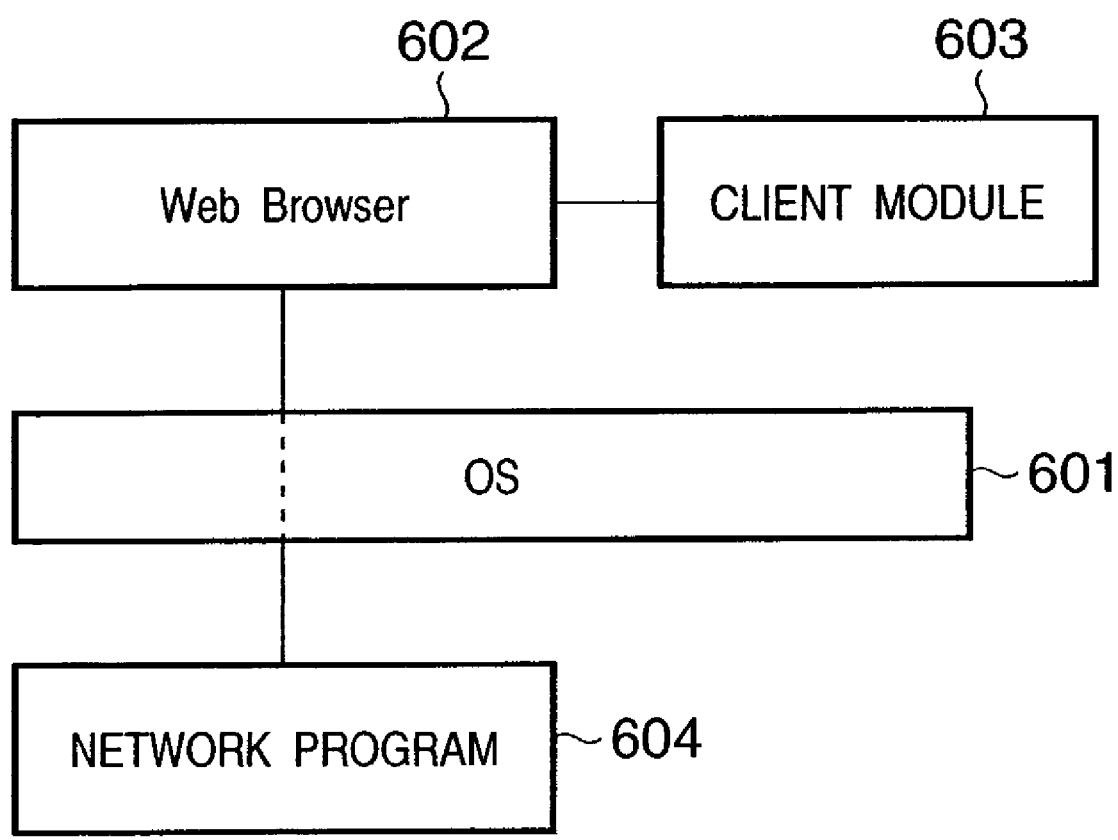
FIG. 6 is a block diagram showing the software configuration of a client PC.

FIG. 6 shows the software configuration of the client PCs 4 and 5. Referring to FIG. 6, an OS 601 executes general processes of the client PC. A Web browser 602 receives data expressed in the html format from the Web server 303 of the server 2, displays the received data on a screen, and sends a user's instruction to the server 2 via the http protocol. A client module 603 executes a process for some of data which are received by the Web browser 602 but cannot be processed by it. Note that the data that cannot be processed by the Web browser 602 include software such as a printer driver and the like for the client PC, and resources such as client PC fonts and the like, and they must be installed in the client PC by predetermined methods. A network program 604 is normally implemented as a part of the OS 601, and communicates with the Web server 303 using the http protocol.

Figure 7:
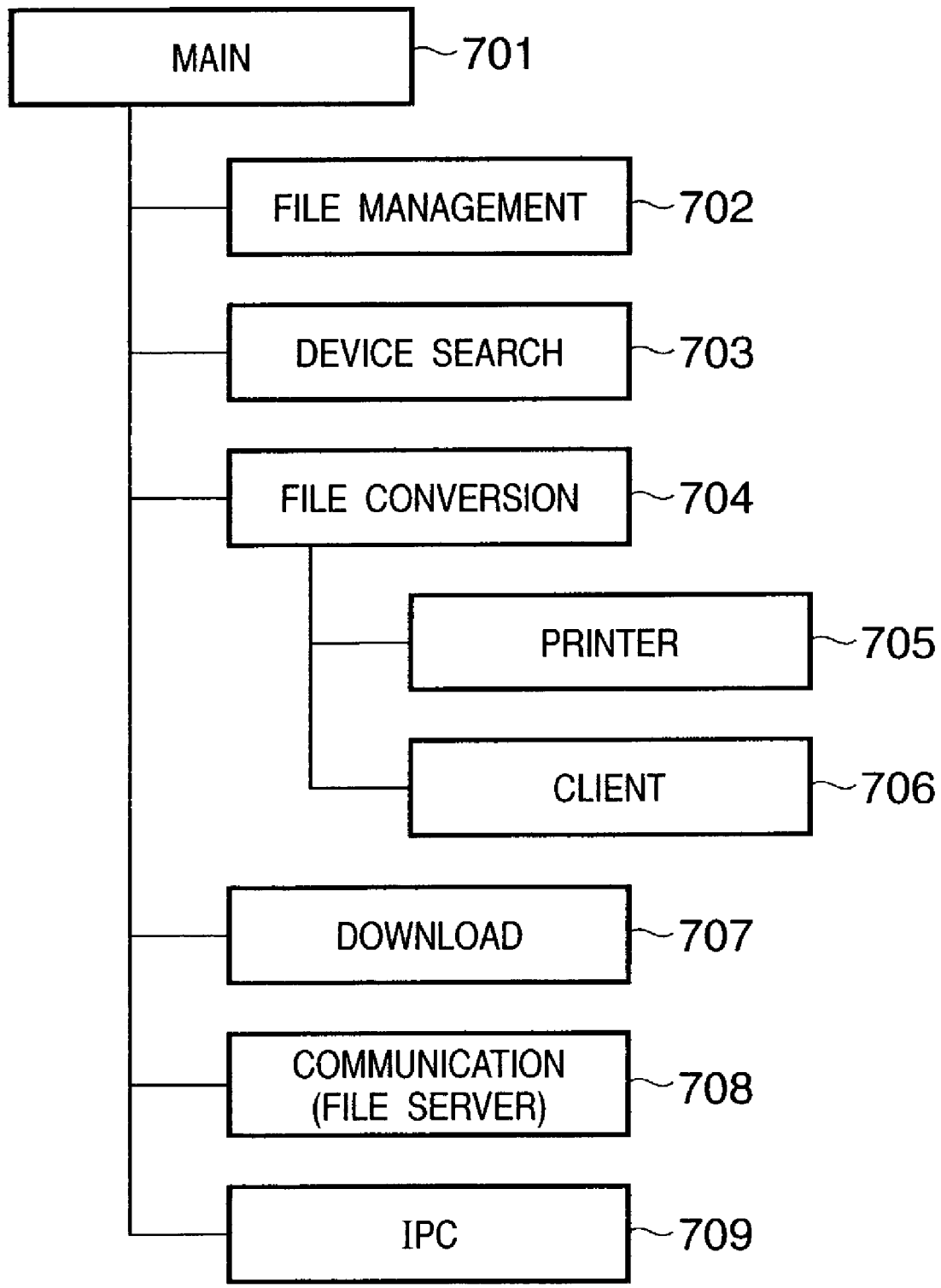
FIG. 7 is a block diagram showing the configuration of a downloader.

FIG. 7 shows the configuration of the downloader 502 of the administrator PC 3. Referring to FIG. 7, a main module 701 calls respective modules, processes parameters, and so forth. A file management module 702 opens and reads a file to be downloaded using the file management program 505. A device search module 703 searches for a peripheral device to which a file can be downloaded, and acquires a protocol that allows communications, device address, and the like. A file conversion module 704 makes conversion if printer resources have a format different from that of client PC resources in the resources used by software. The file conversion module 704 includes a printer file conversion module 705 and client PC file conversion module 706. The resources have different formats, e.g., when the printer uses fonts expressed by ternary curves, and the client PC uses fonts expressed by quadratic curves, and when the printer and client PC use different expression formats of overlay images. A download module 707 downloads data using the network program 506. A communication module 708 communicates with the server 2 and sends the client PC resources and the like to the server. An IPC module 709 is used to make inter-process communications, and implements the communications using the IPC program 504.

Figure 8:
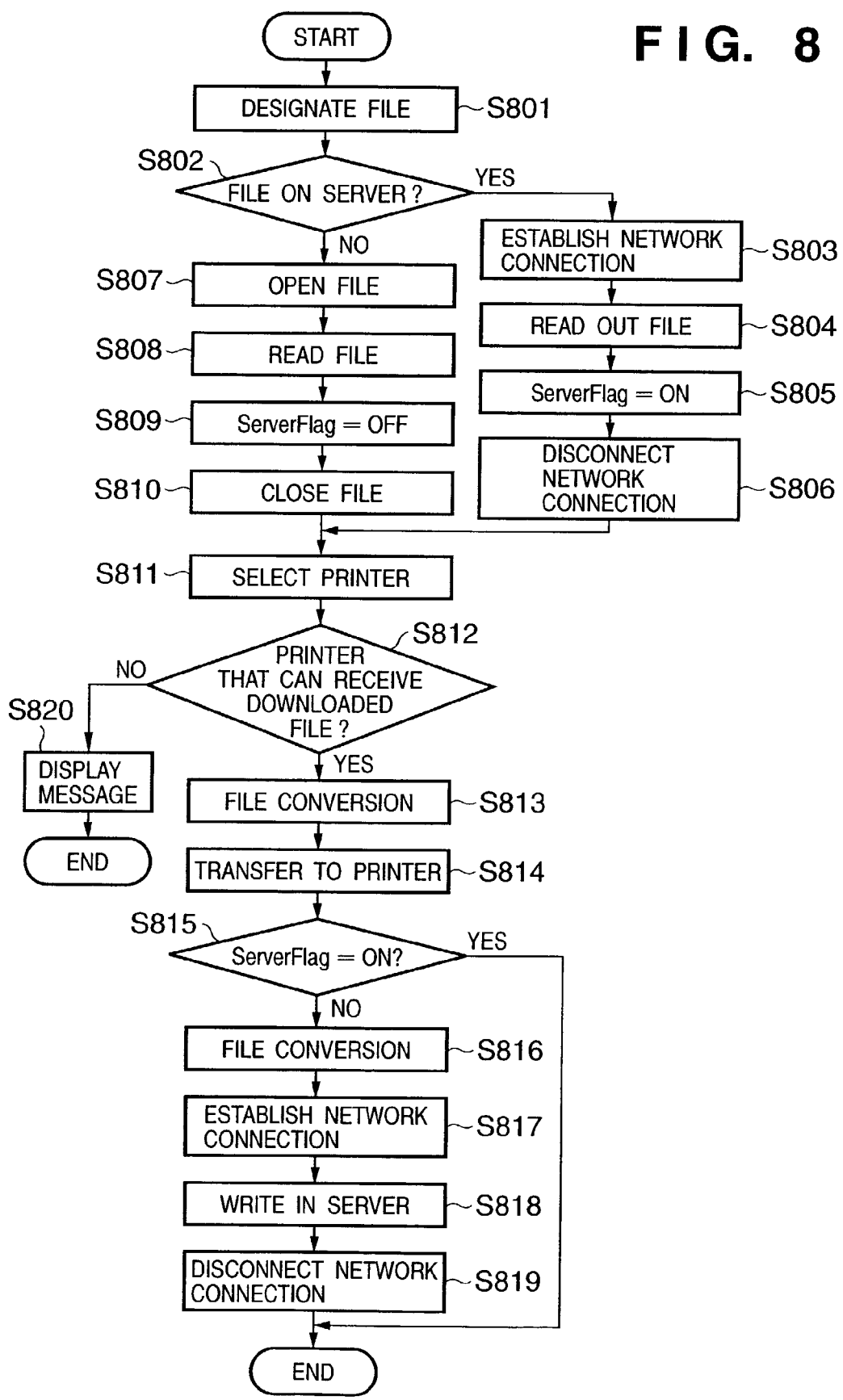
FIG. 8 is a flow chart showing the operation of the downloader.

FIG. 8 is a flow chart showing the operation of the downloader 502 in FIG. 7. The operation of the downloader will be explained below using FIG. 8. A font download process will be exemplified, and the same applies to other kinds of software and other resources used by software. Assume that the downloader 502 and server 2 always communicate with each other, and can acquire file names, device names, and the like, but must additionally establish connection to read out a file upon acquiring a file managed in the file server.

In step S801, a file to be downloaded is designated. The user of the downloader 502 designates the file by inputting a file name. It is checked in step S802 if the designated file is that on the server 2. If YES in step S802, the flow advances to step S802; otherwise, the flow advances to step S807.

In step S803, network connection with the server 2 is established. In step S804, the file is read out. In step S805, ServerFlag indicating that the designated file has been read out from the server 2 is set ON. In step S806, the network connection is disconnected.

In step S807, the file is opened. In step S808, the file is read. In step S809, ServerFlag is set OFF. In step S810, the file is closed. That is, the file to be downloaded has been loaded by the downloader at the time of step S806 or S810.

In step S811, a printer is selected. The printer is selected by the operator, and selection itself may be done simultaneously with file designation. It is checked in step S812 if the printer selected in step S811 can receive a downloaded file. Whether or not the printer can receive a downloaded file is determined based on the printer model and attached storage device (RAM, flash memory, hard disk, or the like). That is, if the designated printer is a model that can receive a downloaded file and a storage device that can store a downloaded file is present in that model, it is determined that the printer can receive a downloaded file.

If it is determined in step S812 that the printer can receive a downloaded file, the flow advances to step S813; otherwise, the flow advances to step S820. In step S813, a font file is converted into a format that can be downloaded to the printer. If the font file already has a downloadable format, step S813 is skipped.

In step S814, the font file converted into the downloadable format is transferred to the printer. It is checked in step S815 if ServerFlag is ON. If ServerFlag is ON, it is determined that a client file corresponding to the downloaded font file is already present in the server, and the processing ends. If ServerFlag is not ON (i.e., OFF), the flow advances to step S816. In step S816, the font file is converted into a format that the client PC can access. If the font file already has a format that the client PC can access, step S816 is skipped.

In step S817, network connection with the server 2 is established. In step S818, the font file for the client PC, which is converted in step S816, is written in the server 2. In step S819, connection is disconnected to execute a network close process, thus ending the processing.

In step S820, a message indicating that a file cannot be downloaded to the printer is displayed, and the processing ends.

With the aforementioned process, the font file for the client PC, which corresponds to the font file downloaded to the printer, is always present in the server 2. Conversion of the font file includes that of the font file format itself, and appending of header information and the like. For example, when a font file in the TrueType® format is to be downloaded to a printer which mounts a TrueType rasterizer, since it must be downloaded after header information for the printer and the like are appended to that file, the file conversion process appends header information for the printer and the like. When this font file is used on the MacOS, information called FOND resource is appended as additional information.

Figure 9:
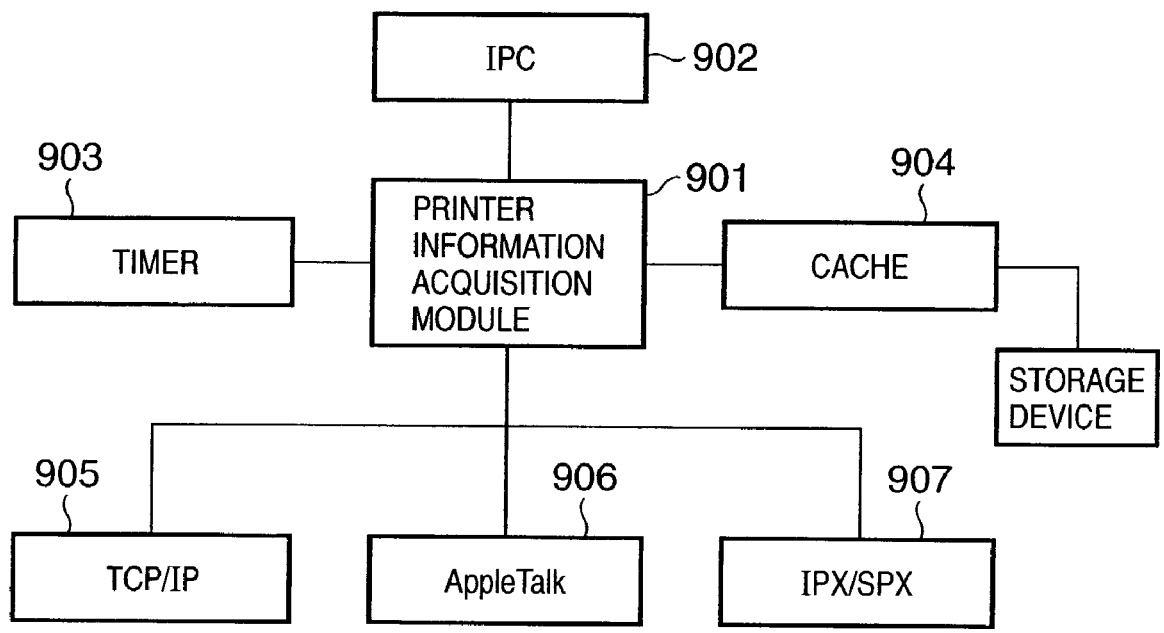
FIG. 9 is a block diagram showing the arrangement of a peripheral device information acquisition module.

FIG. 9 shows the configuration of the peripheral device information acquisition module 4031 of the server 2. Referring to FIG. 9, a main processing module 901 of the peripheral device information acquisition module executes overall control, processes for communications and management, a process upon generation of an interrupt, transfer of download data to peripheral devices, and the like. An IPC module 902 exchanges information via inter-process communications with other modules. A timer module 903 generates interrupts at predetermined time intervals, and the main processing module 901 operates to acquire peripheral device information at the interrupt timings. A cache management processing module 904 temporarily stores peripheral device information acquired by a timer interrupt, and outputs the information in the cache to another module via the IPC 902 in response to a data output instruction from the IPC module 902. A TCP/IP module 905 exchanges data with a peripheral device, which can acquire information and can receive downloaded data, in accordance with TCP/IP. An AppleTalk module 906 exchanges data with a peripheral device, which can acquire information and can receive downloaded data, in accordance with AppleTalk. An IPX/SPX module 907 exchanges data with a peripheral device, which can acquire information and can receive downloaded data, in accordance with IPX/SPX. Other protocols may be used.

Figure 10A:
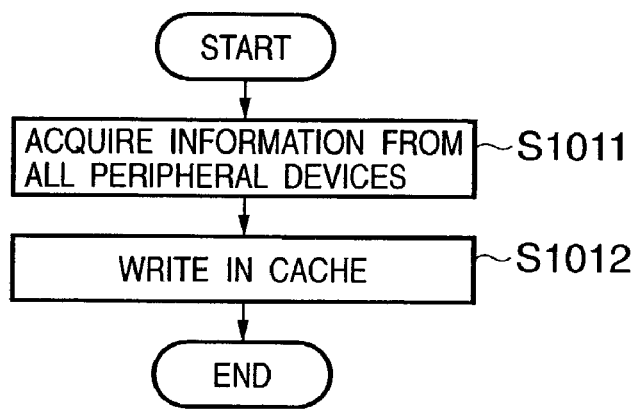
FIG. 10A is a flow chart showing a peripheral device information acquisition process by an interrupt.

FIG. 10A is a flow chart showing the peripheral device information acquisition processing sequence in response to an interrupt generated by the timer 903 in the peripheral device information acquisition module 4031. Upon generation of an interrupt, this process is executed.

In step S1011, information is acquired from all peripheral devices from which information is to be acquired. The information to be acquired includes information (e.g., the version of software or its resources, file size, date, font name in case of fonts, and the like) used to confirm if software and the resources used by the software have been changed. In step S1012, the acquired information is written in the cache 904.

Figure 10B:
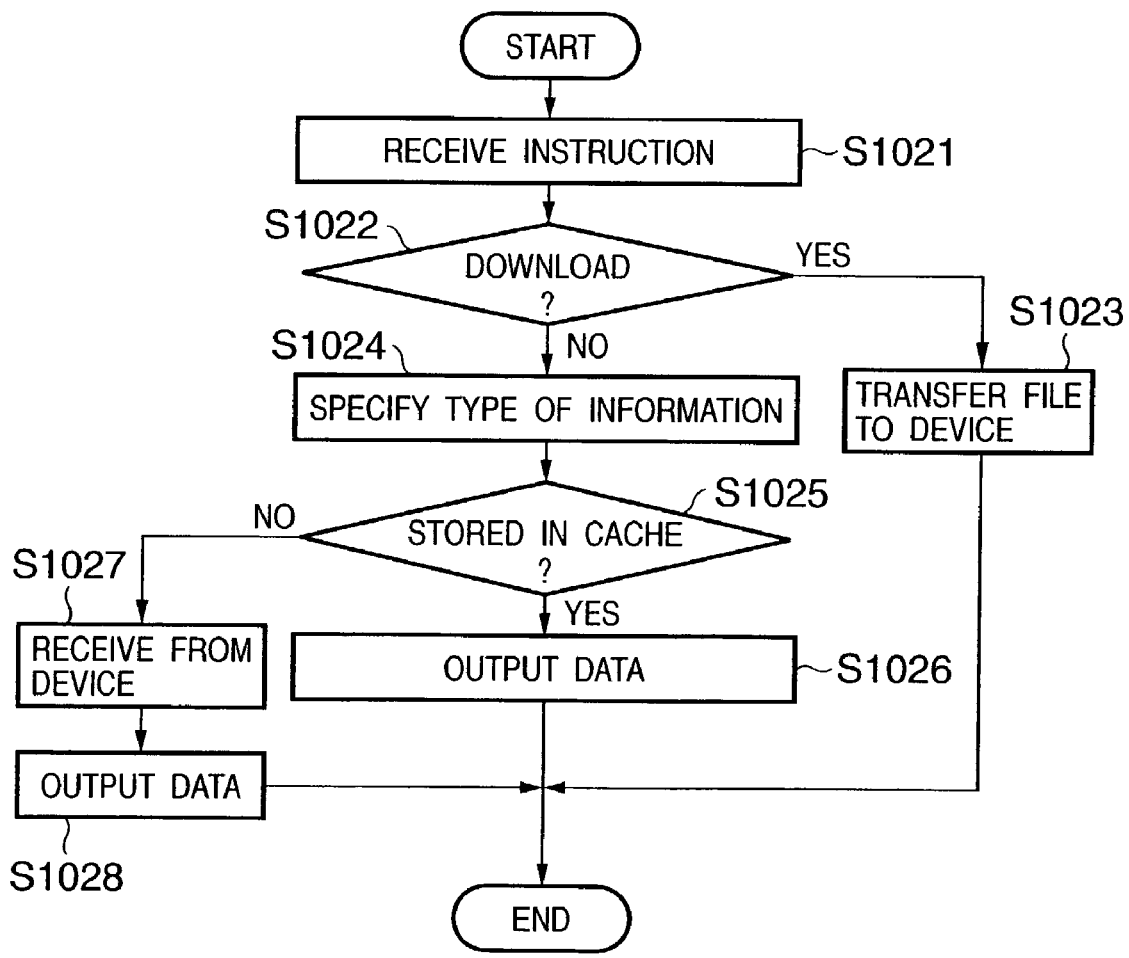
FIG. 10B is a flow chart showing a normal process.

FIG. 10B is a flow chart showing a normal process, i.e., the processing sequence upon receiving a data output instruction from the user, in the peripheral device information acquisition module 4031. In the normal process, an information acquisition or download process is executed in accordance with a user's instruction received by a module which has a user interface.

In step S1021, an instruction from a user IF module is received via the IPC 902. The contents of the received instruction include the processing contents, data (file) in case of a download instruction, peripheral device address, and the like. It is checked in step S1022 if the received instruction is a download instruction. If YES in step S1022, the flow advances to step S1023; otherwise, the flow advances to step S1024. In step S1023, the received data is downloaded to the designated peripheral device, thus ending the processing.

If it is determined that the received instruction is not a download instruction, it is determined that the received instruction is an information request. In this case, the type of requested information is specified in step S1024. The type of information includes, e.g., a font name, form size, software version, and the like. It is checked in step S1025 if the requested information is present in the cache 904. If YES in step S1025, the flow advances to step S1026; otherwise, the flow advances to step S1027. In step S1026, data is output from the cache 904 via the IPC 902.

If the requested information is not present in the cache 904, data is acquired from the peripheral device in step S1027. In step S1028, the acquired data is output via the IPC 902, thus ending the processing.

Figure 11:
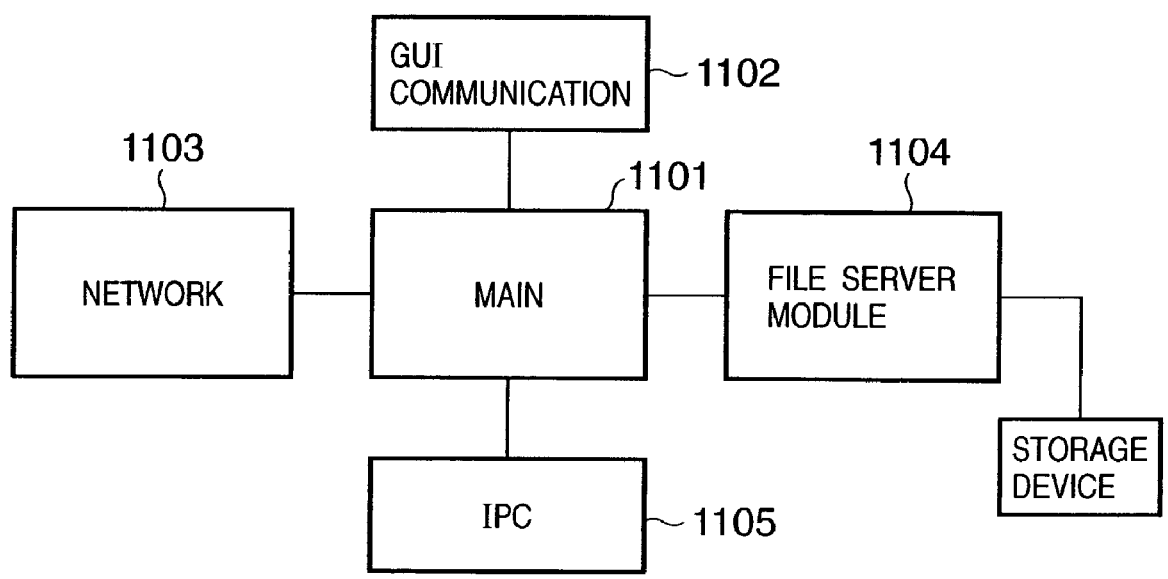
FIG. 11 is a block diagram showing the configuration of a main module of a management program.

FIG. 11 shows the configuration of the main module of the peripheral device management program 305 of the server 2. Referring to FIG. 11, a main processing module 1101 executes overall operation management, assignment of processes, and the like. A GUI communication module 1102 exchanges information with a GUI (e.g., it outputs information to be displayed, and receives processing instructions and data from the GUI). A network processing module 1103 inputs/outputs files and information via the network. A file server module 1104 reads out, writes, and manages files. An IPC module 1105 exchanges data and information with the IPC 902 via inter-process communications.

The peripheral device management program 305 can access the peripheral devices, GUI, network, and file server, and controls the overall operation.

Figure 12:
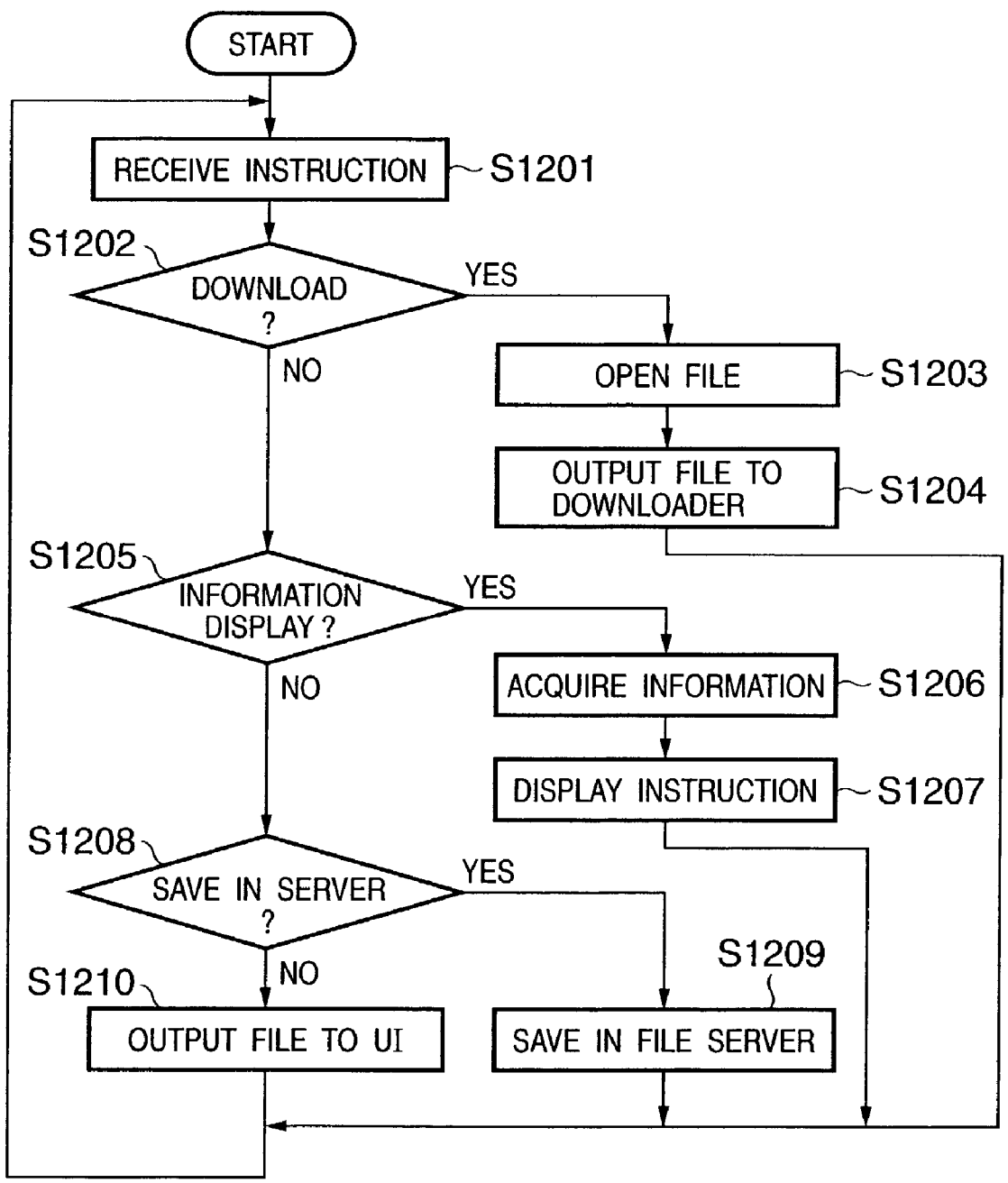
FIG. 12 is a flow chart showing the process of the management program.

FIG. 12 is a flow chart showing the process of the peripheral device management program 305 in FIG. 11. The operation of this program will be explained below using FIG. 12.

In step S1201, an instruction is received. It is checked in step S1202 if the received instruction is a download instruction. If YES in step S1202, the flow advances to step S1203; otherwise, the flow advances to step S1205. If it is determined that the received instruction is a download instruction, the peripheral device management program 305 fetches a file to be downloaded from the file server, and outputs it to the downloader 502.

In step S1203, a file on the file server is opened. In step S1204, the file is output to the downloader 502 via the network module 1103, and the flow returns to step S1201 to execute the next process.

It is checked in step S1205 if the received instruction is an information display instruction. If YES in step S1205, the flow advances to step S1206; otherwise, the flow advances to step S1208. If it is determined that the received instruction is an information display instruction, information in a peripheral device is output in accordance with an instruction received from the GUI communication module 1102.

In step S1206, information exchange is made between the IPC modules 902 and 1105 to acquire peripheral device information. In step S1207, information to be displayed is output to a GUI module via the GUI communication module 1102, and the flow returns to step S1201 to execute the next process.

It is checked in step S1208 if the received instruction is a file save instruction in the server. If YES in step S1208, the flow advances to step S1209; otherwise, the flow advances to step S1210.

A file is saved in the server in accordance with an instruction from the downloader 502, and is sent via the network. In step S1209, a file is saved in the file server, and the flow returns to step S1201 to execute the next process.

In step S1210, a file is output via a graphical user interface (GUI). In this process, the resources for the client PC or the like are output, and a file or the like is output to the client PC using the http protocol with which the GUI communicates with the client PC. After that, the flow returns to step S1201 to execute the next process.

With a series of processes described above, information and data in this system are exchanged.

Figure 13:
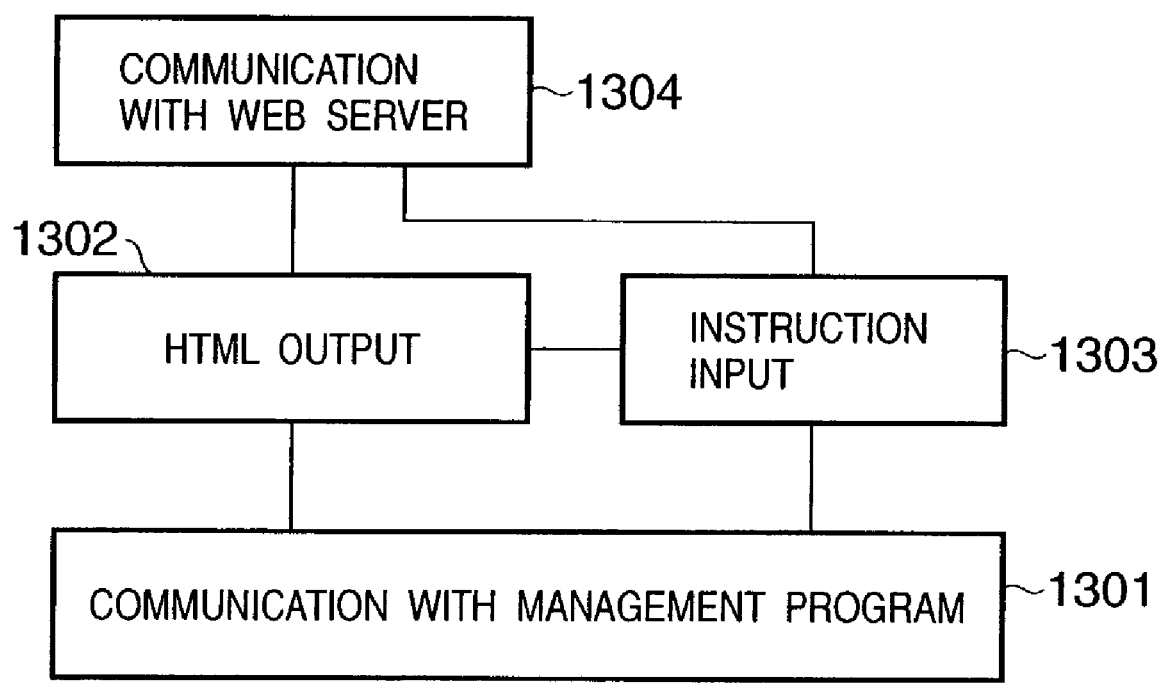
FIG. 13 is a block diagram showing the configuration of modules used to form a GUI.

FIG. 13 shows the GUI module 503 of the administrator PC. Referring to FIG. 13, a management program communication module 1301 communicates with the management program 505 to receive an instruction, file, and information from the management program, passes them to an html output module 1302, and also passes an instruction and file received from an instruction input module 1303 to the management program. The html output module 1302 generates a GUI screen file based on the html format on the basis the information and instruction received from the management program, and passes it to a Web server communication module 1304. The instruction input module 1303 receives an instruction from the Web server 303, or an archived or encoded file. The received instruction is output as a command to the management program 505. The received file is archived, files are extracted from the archive, or if it is encoded, the file is decoded, and the extracted or decoded file is output to the management program 505. The Web server communication module 1304 outputs html information to the Web server 303, and passes an instruction from the Web server 303 to the instruction input module 1303.

Figure 14:
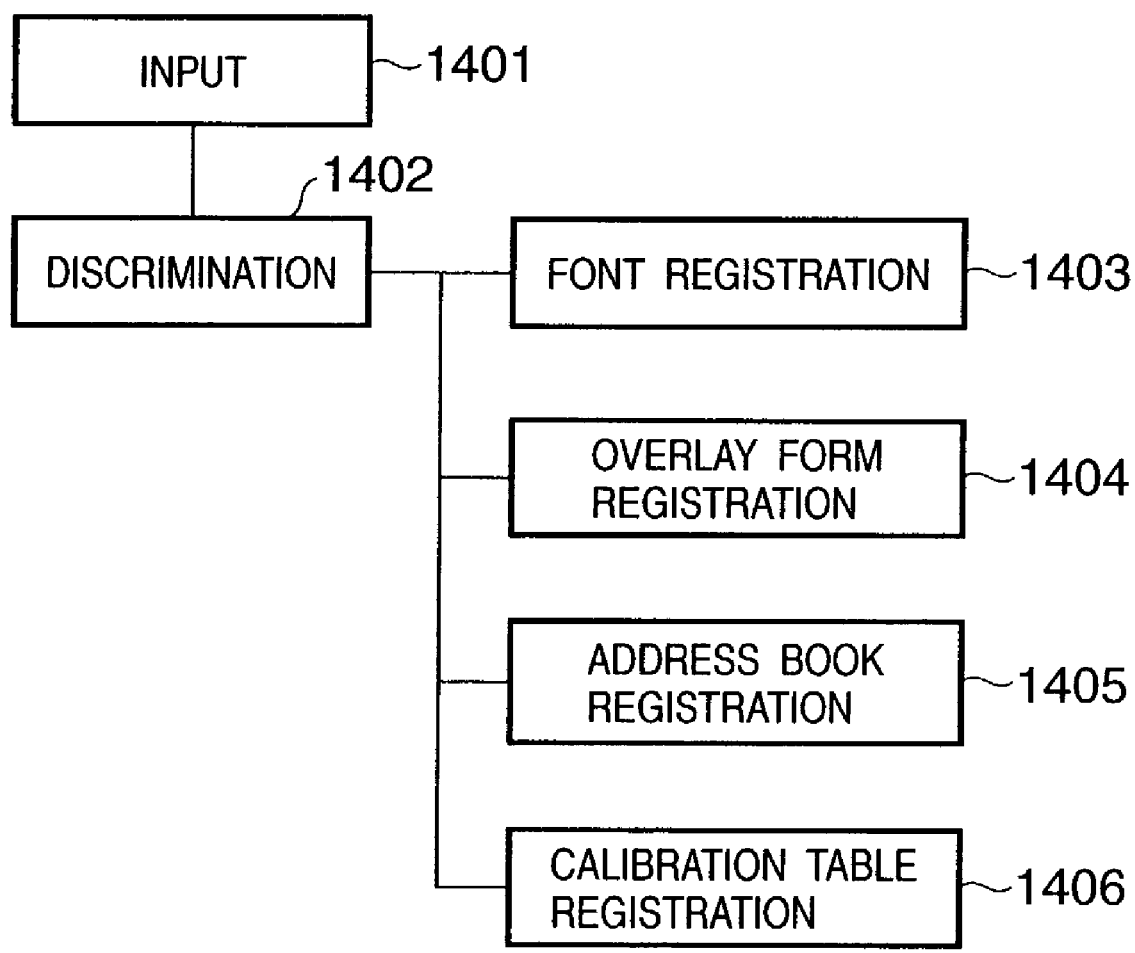
FIG. 14 is a block diagram showing the configuration of modules which run on a client.

FIG. 14 shows the configuration of the client module 603. This module is installed on the client PC, and processes a file received by the Web browser 602. An input module 1401 receives data from the Web browser 602. The received data normally archives management information and a file entity. A discrimination module 1402 extracts the management information and file entity from the received archived file, and discriminates the type of file based on the management information. The management information includes the type of file, file name, file size, and the like. If the type of file is a font, the discrimination module 1402 calls a font registration module 1403. If the type of file is an overlay form, the discrimination module 1402 calls an overlay form registration module 1404. If the type of file is an address book, the discrimination module 1402 calls an address book registration module 1405. If the type of file is a color calibration table, the discrimination module 1402 calls a color calibration table registration module 1406.

The font registration module 1403 registers the received font file in the client PC. The overlay form registration module 1404 registers the received file in an overlay form processing application. If no overlay form processing application is installed, this process is skipped. The address book registration module 1405 converts the received address book into a format compatible to a registration destination such as e-mail management software, a FAX driver, or the like, and registers the converted file. The color calibration table registration module 1406 registers the received file in a printer driver that executes an image process.

<Variations of Resource Exchange>

Figure 15:
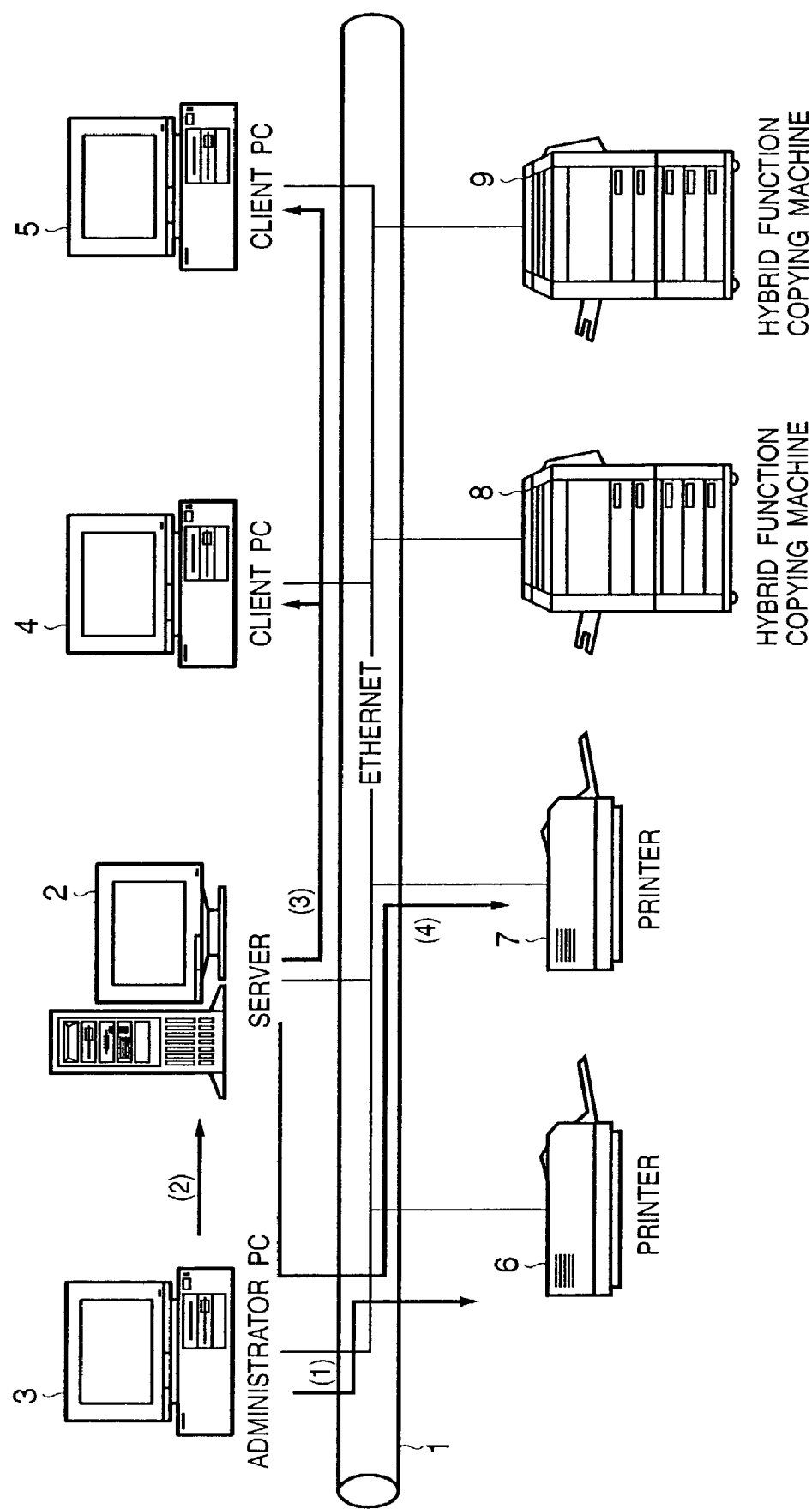
FIG. 15 is a diagram showing the flow of data upon downloading font data.

FIG. 15 shows the flow of data upon downloading font data from the administrator PC 3 to the printers 6 and 7. Referring to FIG. 15, the administrator downloads font data, which is loaded from a CD into the administrator PC 3, to the printer 6 (1). Then, the administrator registers that font data in the server 2 (2). Each of the client PCs 4 and 5 loads a font file for the client PC from the server 2 using the Web browser 602, and registers the loaded file in the system via the client module 603 (3). When the font data is to be downloaded to another printer, the administrator PC 3 loads font data registered in the server 2, and downloads it to the printer 7 (4). The same applies to a case wherein an overlay form is registered from the PC 3 to the printers 6 and 7.

Figure 16:
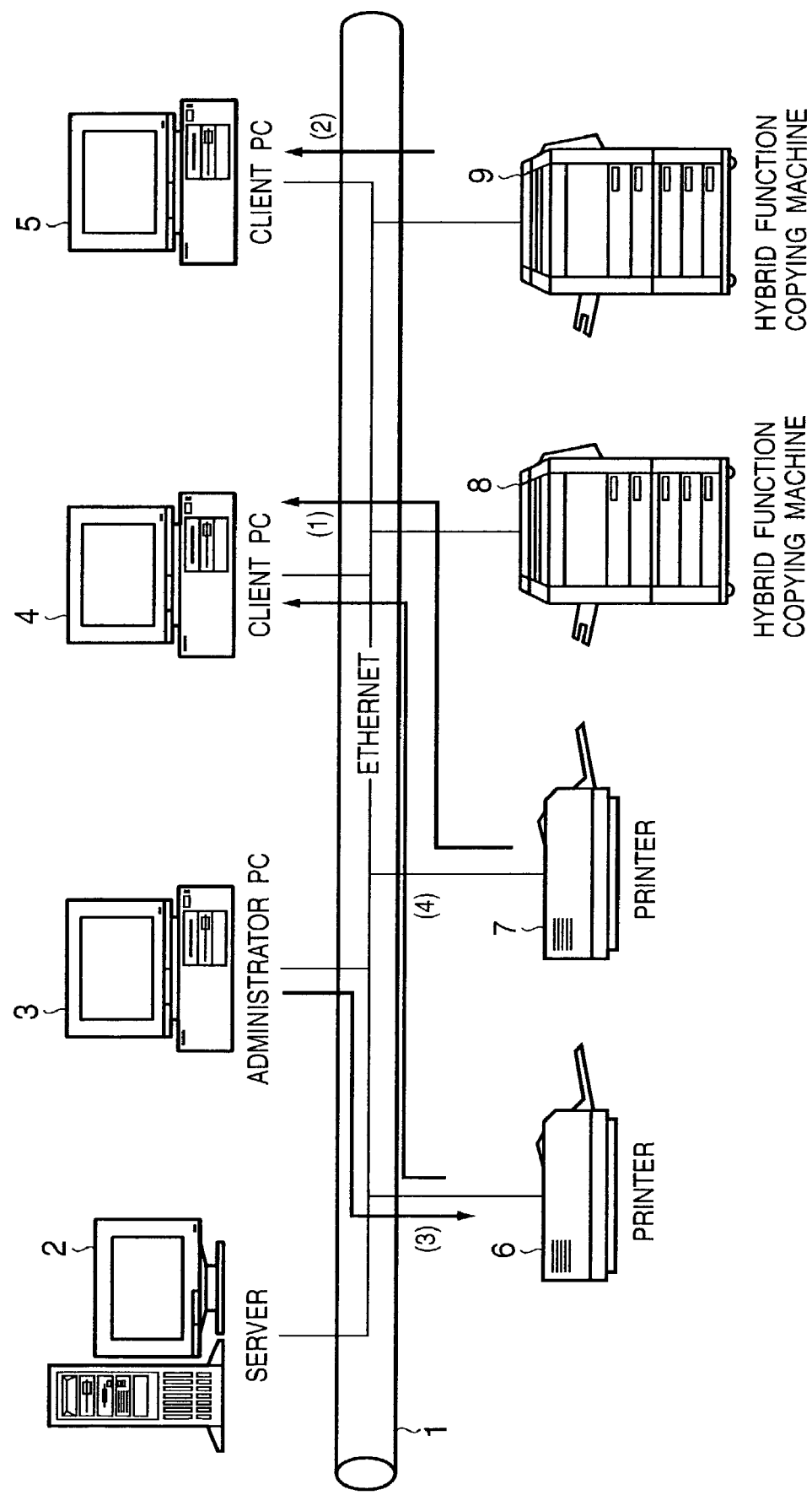
FIG. 16 is a diagram showing the flow of data when the client PC acquires a color calibration table.

FIG. 16 shows the flow of data when the client PC acquires a color calibration table possessed by a printer or copying machine. In the printers 6 and 7 and the hybrid function copying machines 8 and 9, a color calibration table is generated or updated in correspondence with various changes in environment in the devices or at a given timing. When a printer driver on the client PC 4 uses the printer 7, it requests to acquire a color calibration table generated in the printer 7 as needed, and receives that table (1).

When a printer driver on the client PC 5 uses the hybrid function copying machine 9, it requests to acquire a color calibration table generated in the hybrid function copying machine 9 as needed, and receives that table (2).

On the other hand, arrow (3) indicates the flow of data upon downloading a color calibration table from the administrator PC 3 to the printer 6. That is, when a color calibration table is generated in the administrator PC 3 using colorimetry software or the like, that table is downloaded from the administrator PC 3 (3). In the printer 6, the downloaded data is held. The printer 6 also looks up the color calibration table, which is generated using colorimetry software or the like, and is downloaded, upon generating or updating a color calibration table.

When a printer driver on the client PC 4 uses the printer 6, it requests to acquire a color calibration table generated in the printer 6 using the above method, and receives that table (4).

Figure 17:
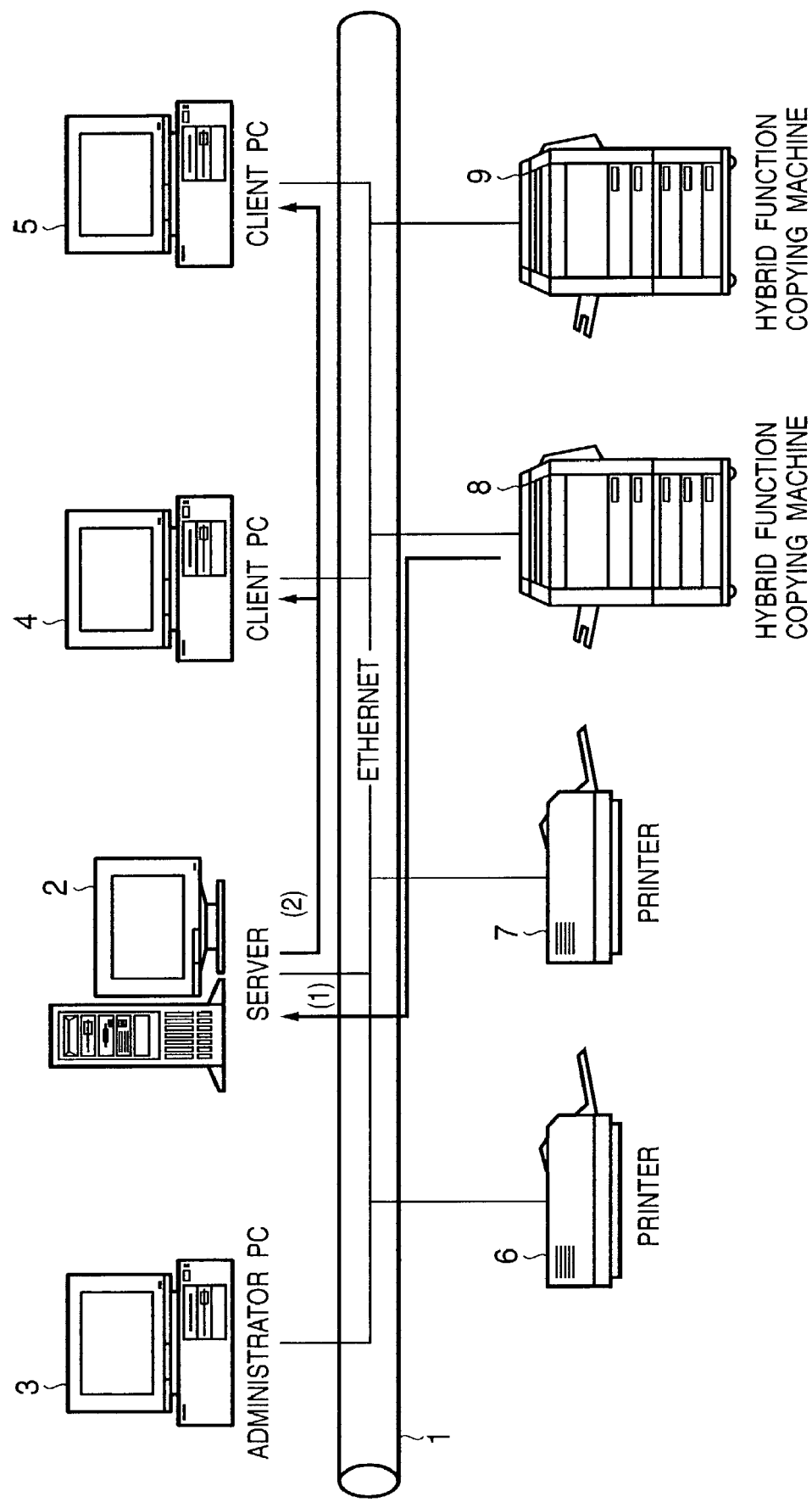
FIG. 17 is a diagram showing the flow of data when address book data is acquired from a hybrid function copying machine.

FIG. 17 shows the flow of data upon acquiring address book data from the hybrid function copying machine 8. Address book data in the hybrid function copying machine 8 is output to the server 2 (1). Each of the client PCs 4 and 5 receives data from the server 2 (2), and the client module 603 adds or overwrites the received data to or on the address book data in the client PCs 4 and 5.

Figure 18:
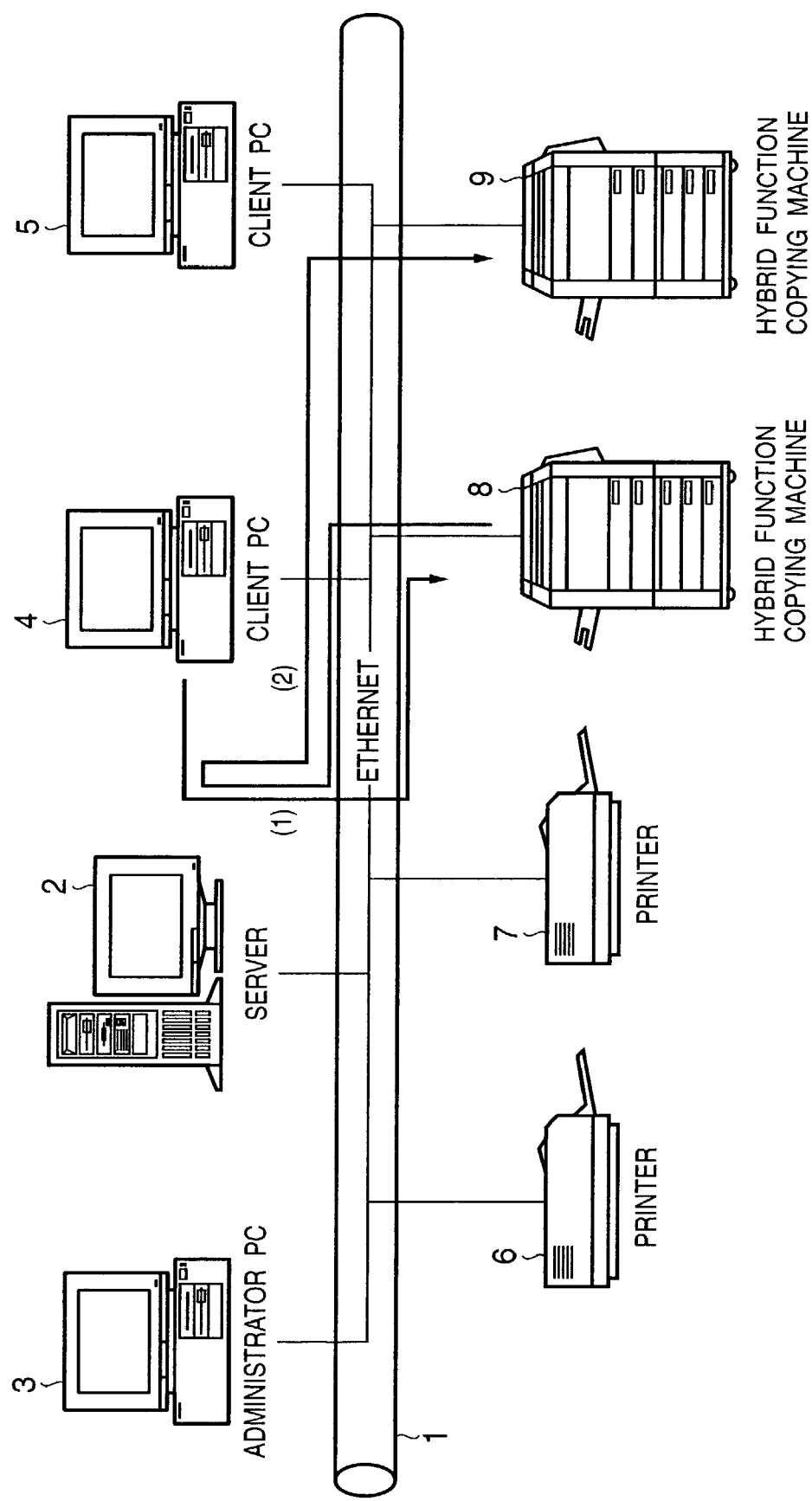
FIG. 18 is a diagram showing the flow of data when address book data on the client PC is downloaded to the hybrid function copying machine.

FIG. 18 shows the flow of data upon downloading address book data on the client PC 4 to the hybrid function copying machines 8 and 9. Address book data sent to the server 2 using the Web browser 602 is directly written in the hybrid function copying machine 8 (1). Arrow (2) indicates the flow of data upon copying the address book of the hybrid function copying machine 8 to the copying machine 9. Data in the hybrid function copying machine 8 is temporarily sent to the server 2, and is then directly written in the hybrid function copying machine 9 (2).

Figure 19:
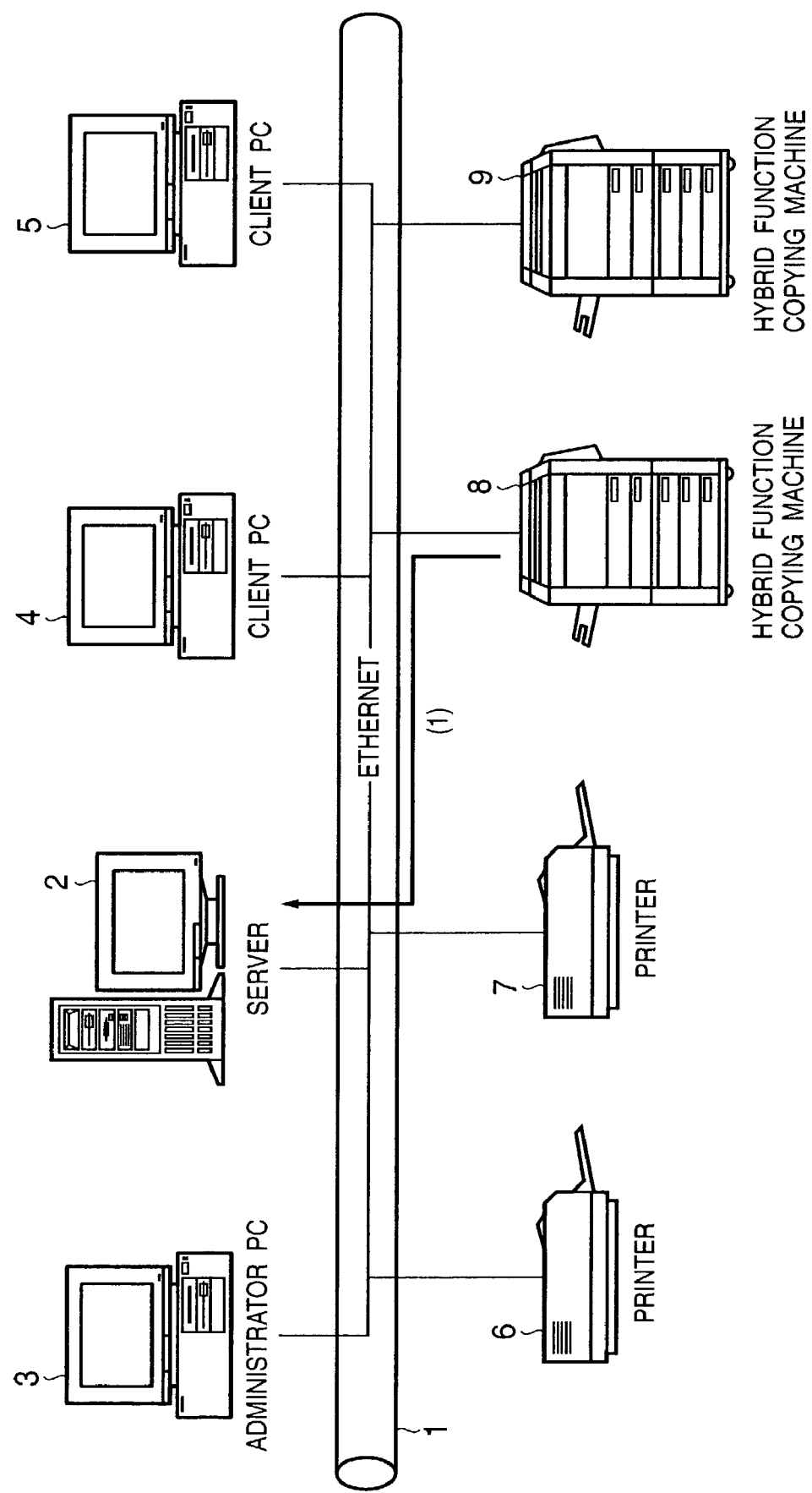
FIG. 19 is a diagram showing the flow of data when the contents of a storage device of a printer or the hybrid function copying machine are backed up.

FIG. 19 shows the flow of data upon backing up the contents of the storage device in the printer or hybrid function copying machine. This process is normally launched in response to an instruction from the Web browser 602, but it may be launched in response to an instruction from a control panel of the hybrid function copying machine. Also, this process may be automatically and periodically executed by the management program 401 which runs on the server 2. When the printer or hybrid function copying machine has a function of informing the server 2 of a change in resource, the management program 401 may automatically execute a backup process in response to that information. FIG. 19 shows an example in which the storage contents are backed up from the copying machine 8. Upon backup, the contents of the storage device of the hybrid function copying machine 8 are output to the sever 2, and are stored in the file server in the server 2 (1).

Figure 20:
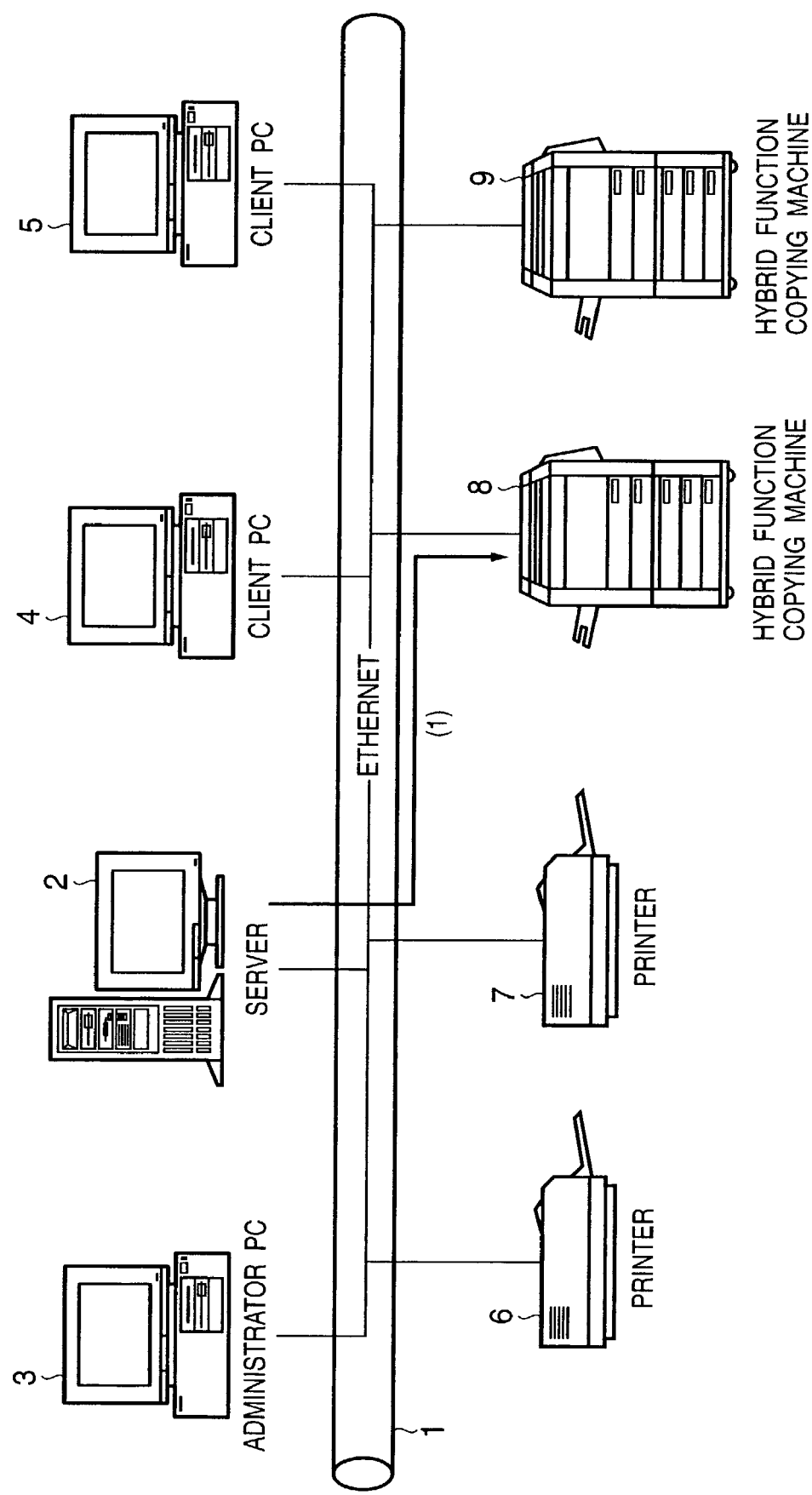
FIG. 20 is a diagram showing the flow of data when the backed-up contents of the storage device of the printer or hybrid function copying machine are restored.

FIG. 20 shows the flow of data upon restoring the backed-up contents of the storage device of the printer or hybrid function copying machine. This process is normally launched in response to an instruction from the Web browser 602, but it may be launched in response to an instruction from a control panel of the hybrid function copying machine. Also, this process may be automatically executed by the management program 401 which runs on the server 2. Data backed up in the file server of the server 2 is output to the storage device of the printer or hybrid function copying machine (in FIG. 20, the hybrid function copying machine 8) as a backup source (1).

Figure 21:
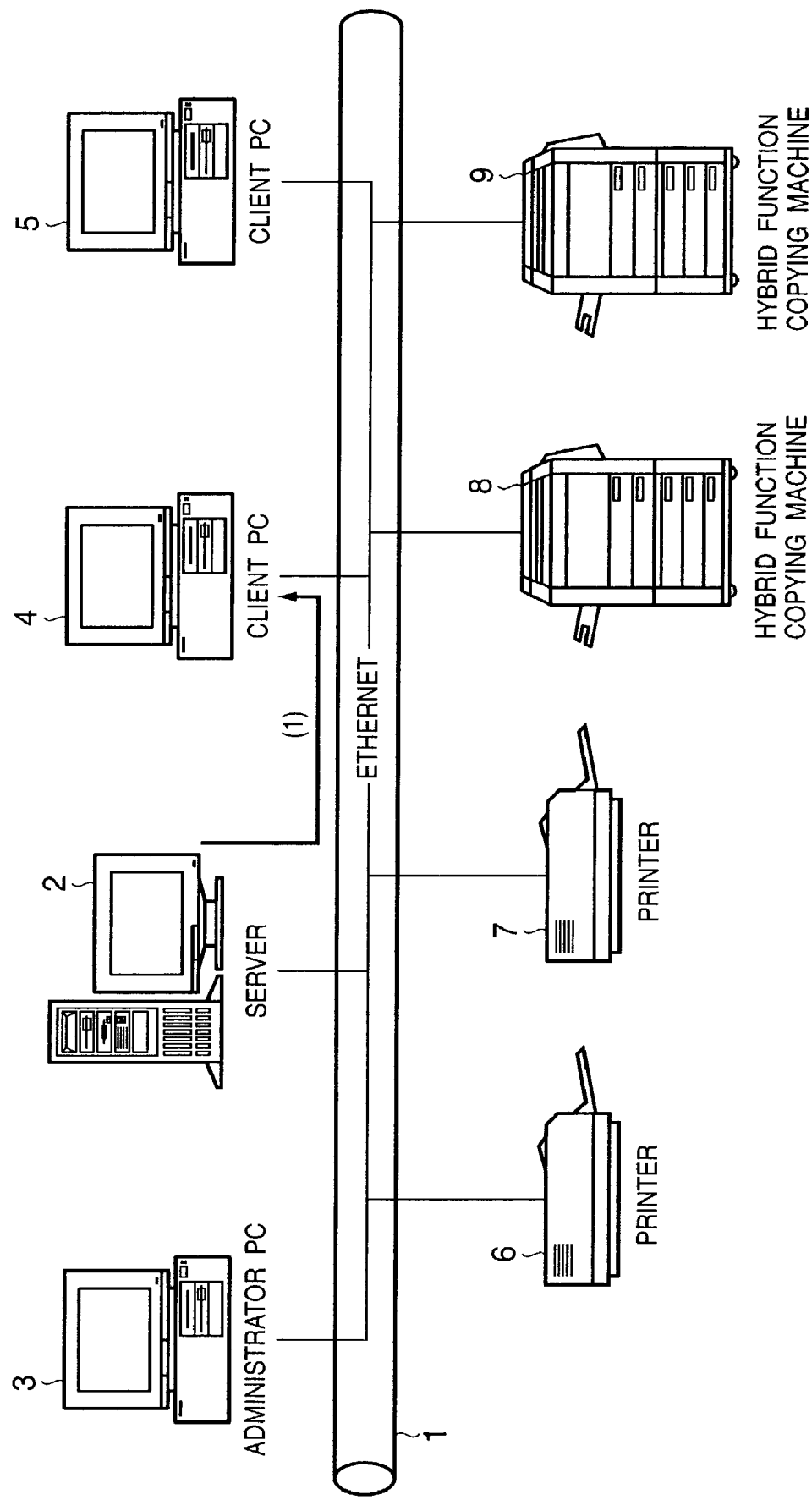
FIG. 21 is a diagram showing the flow of data when the client PC acquires software from a server.

FIG. 21 shows the flow of data when the client PC 4 or 5 acquires software from the server 2. The PC 4 acquires data from the server 2 (1), and the client module 603 of the PC 4 decodes data to install it.

Figure 22:
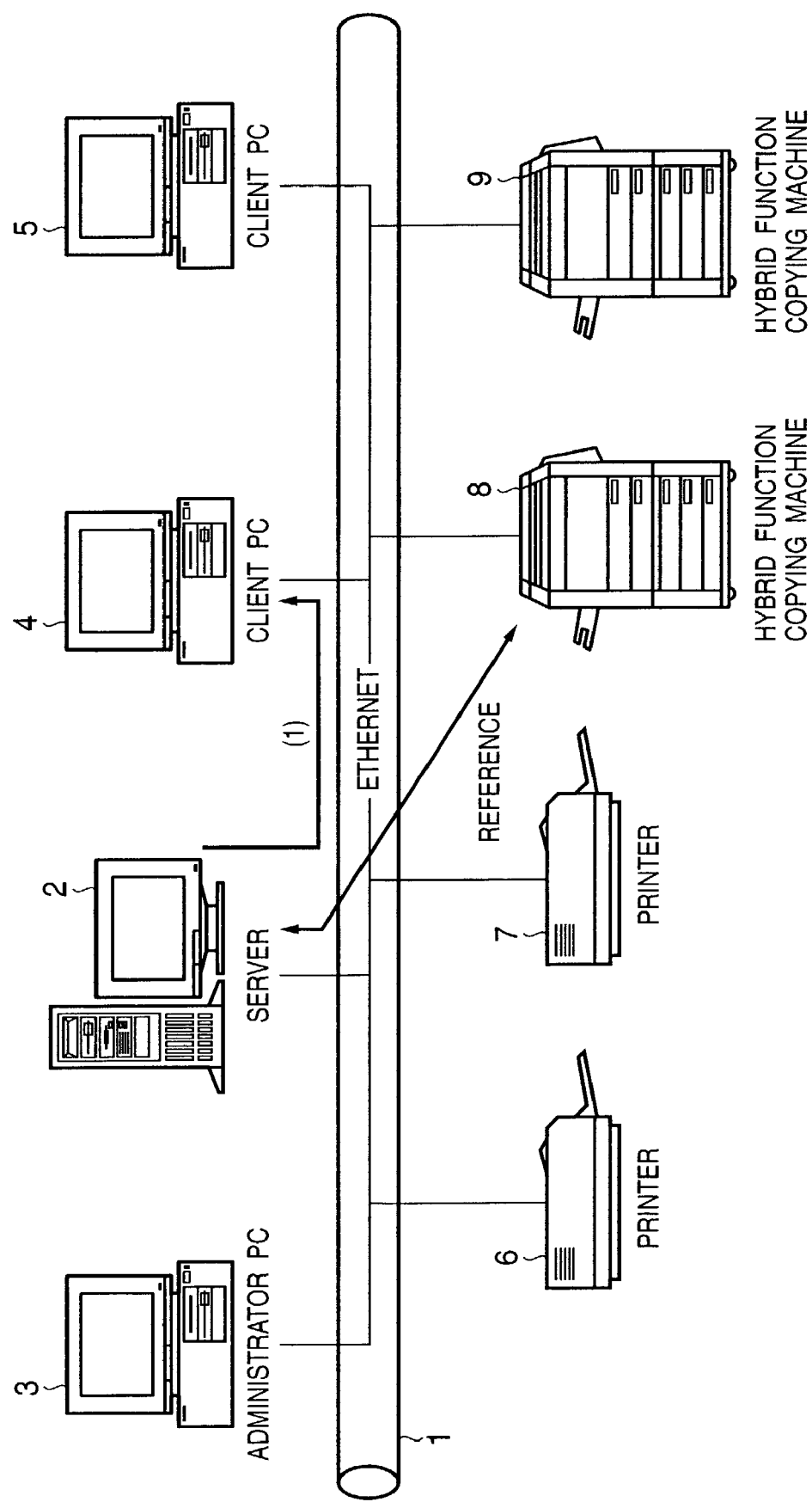
FIG. 22 is a diagram showing the flow of data when the client PC acquires a driver from the server.

FIG. 22 shows the flow of data when the client PC 4 or 5 acquires a peripheral device driver such as a printer driver, facsimile driver, scanner driver, or the like from the server 2. The client PC 4 acquires data (driver program) from the server 2. The server 2 refers to a target peripheral device to obtain correspondence with that peripheral device upon outputting data requested from the client PC 4. In FIG. 22, the copying machine 8 is referred to. The server 2 outputs the information obtained by referring to the peripheral device, i.e., the network address, model name, functions, and the like to the client PC 4 or 5 together with the driver program (2), and the client module 603 installs the driver based on the information received from the server 2.

<Transmission Data Format>

Figure 23:
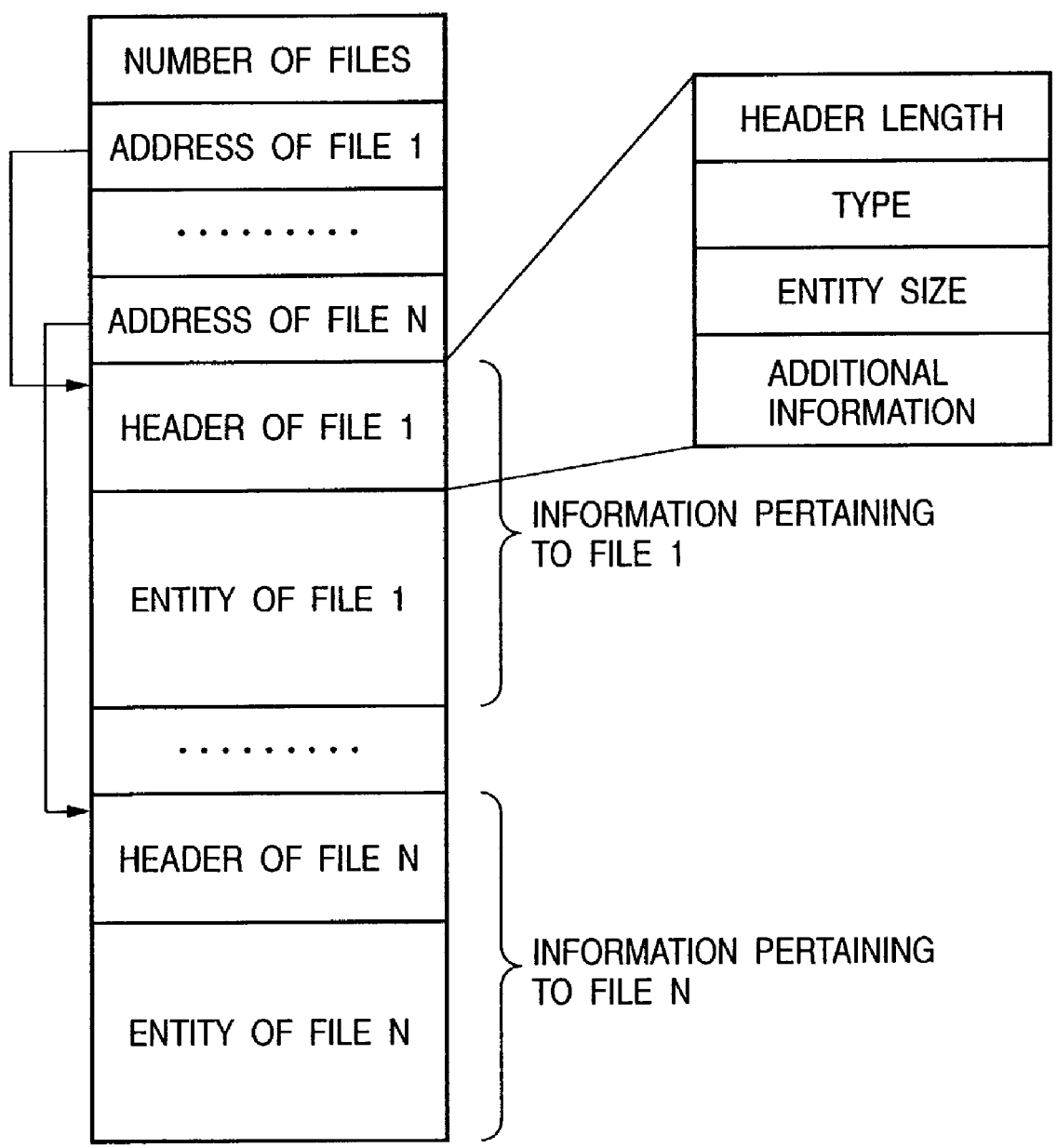
FIG. 23 shows the data structure used when the server outputs data to the client.

FIG. 23 shows the data structure upon outputting data from the server 2 to the client PC 4 or 5. As can be seen from FIG. 23, the number N of files held in an archive is inserted at the head of the data structure. Then, addresses for N files follow, and a header and file entity are held at each address position. The header contains a header length, file type, and entity size, and additional information is appended after the entity size if it is available. At an address as the sum of the start address of the header and the header length, a file entity is present.

Figure 24:
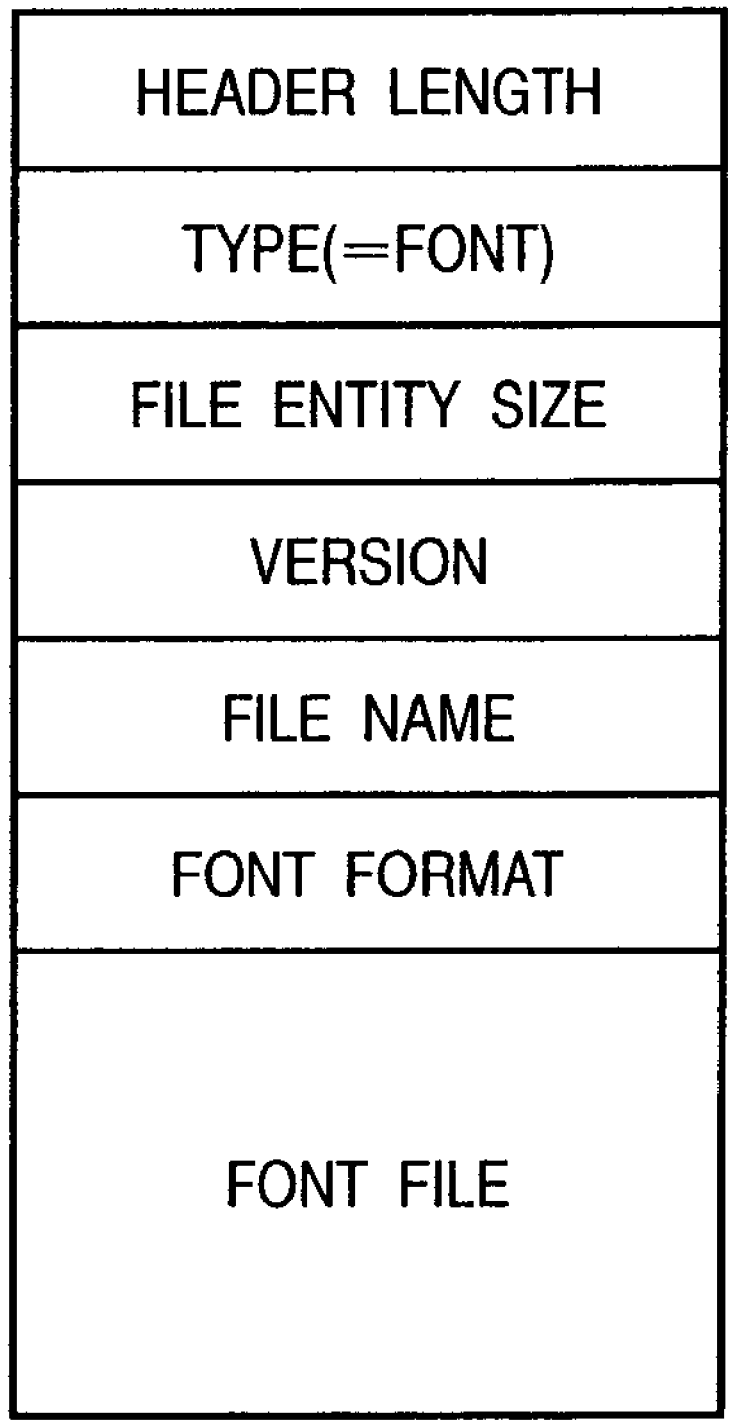
FIG. 24 shows header information in the data structure upon outputting a font file to the client PC.

FIG. 24 shows the header information in FIG. 23 when the server 2 outputs a font file to the client PCs 4 and 5. As can be seen from FIG. 24, the version, file name, and font format are appended as additional information.

Figure 25:
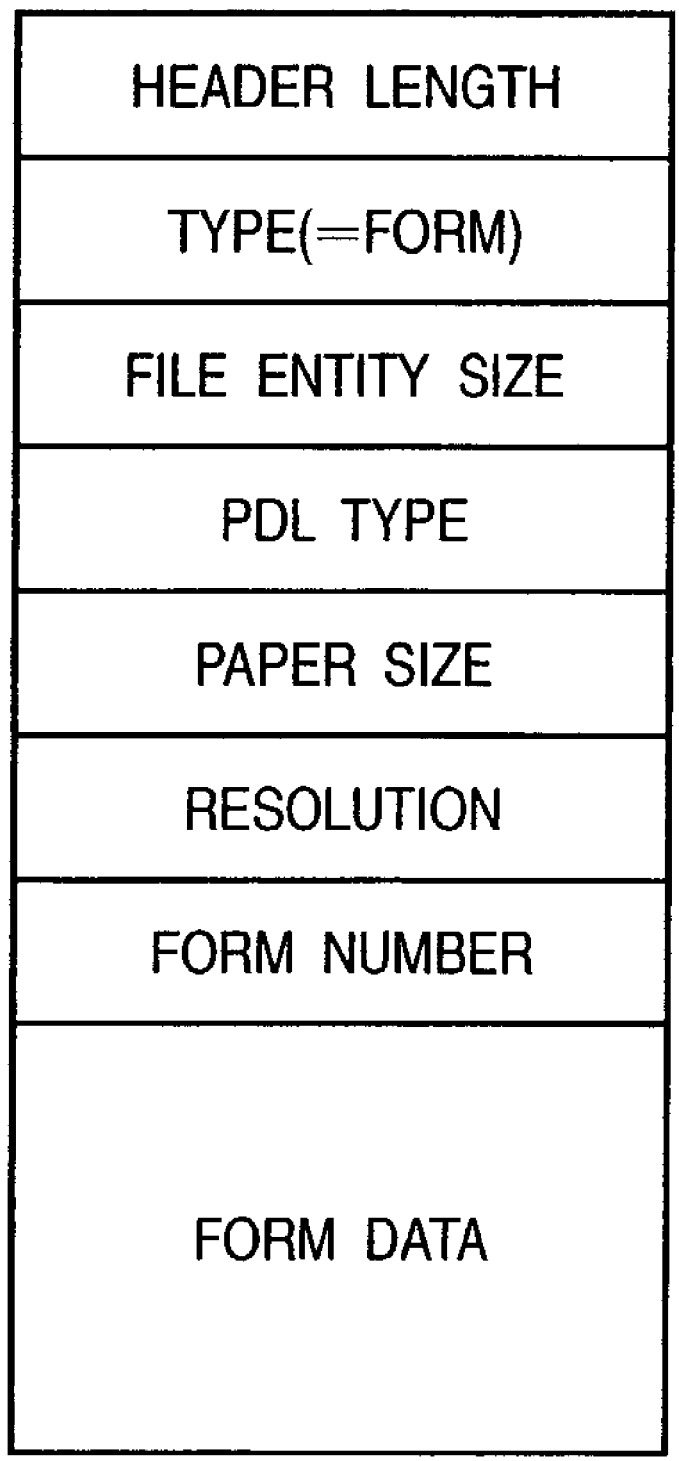
FIG. 25 shows header information in the data structure upon outputting an overlay form to the client PC.

FIG. 25 shows the header information in FIG. 23 when the server 2 outputs an overlay form to the client PCs 4 and 5. As can be seen from FIG. 25, the type of PDL, paper size, resolution, and form number are appended as additional information.

Figure 26:
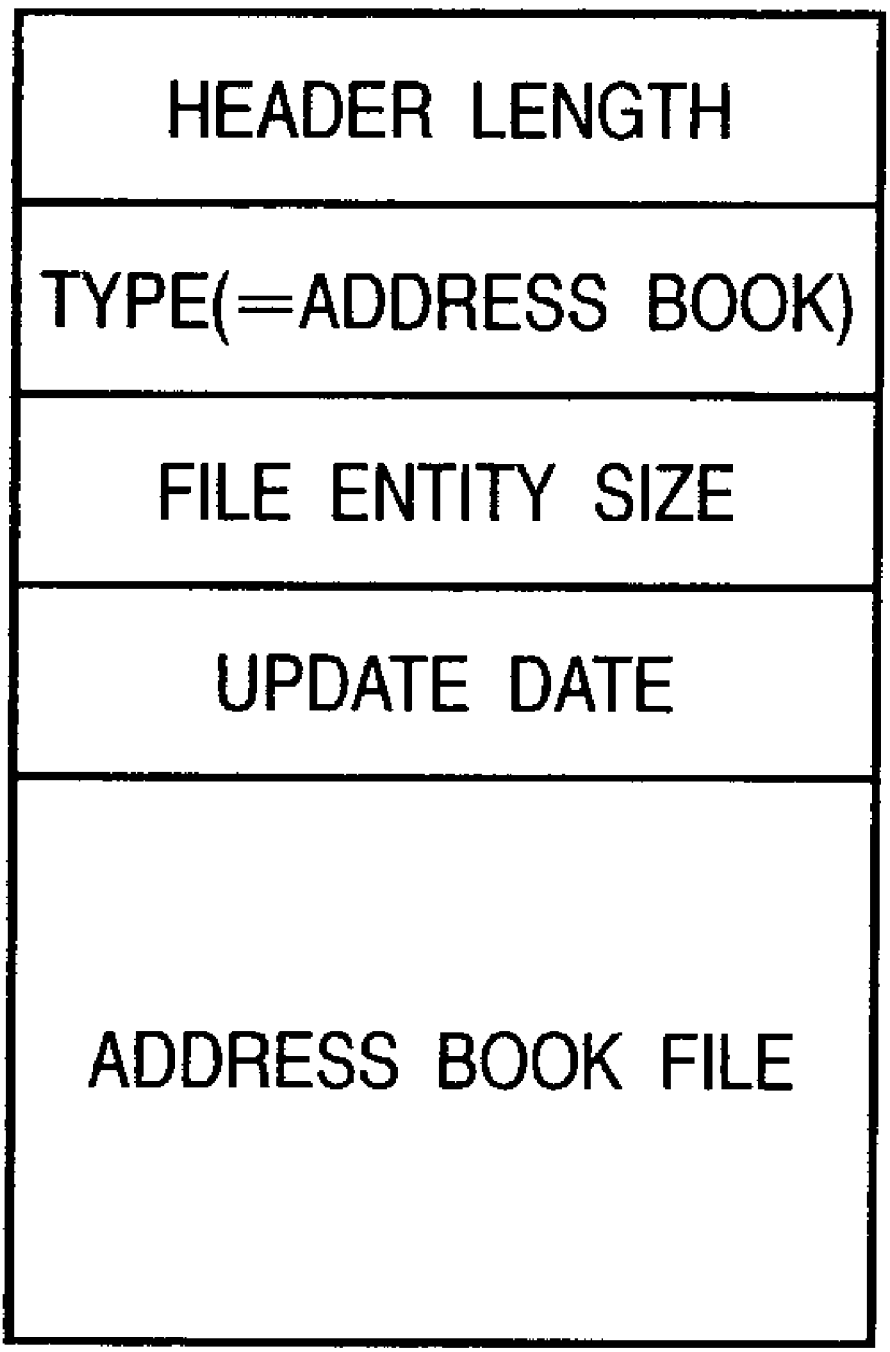
FIG. 26 shows header information in the data structure upon outputting a color calibration table to the client PC.

FIG. 26 shows the header information in FIG. 23 when the server 2 outputs an address book to the client PCs 4 and 5. As can be seen from FIG. 26, the update date of the address book is appended as additional information. Whether or not acquired address book is to be overwritten on that in the client PC 4 or 5 can be determined based on this information.

Figure 27:
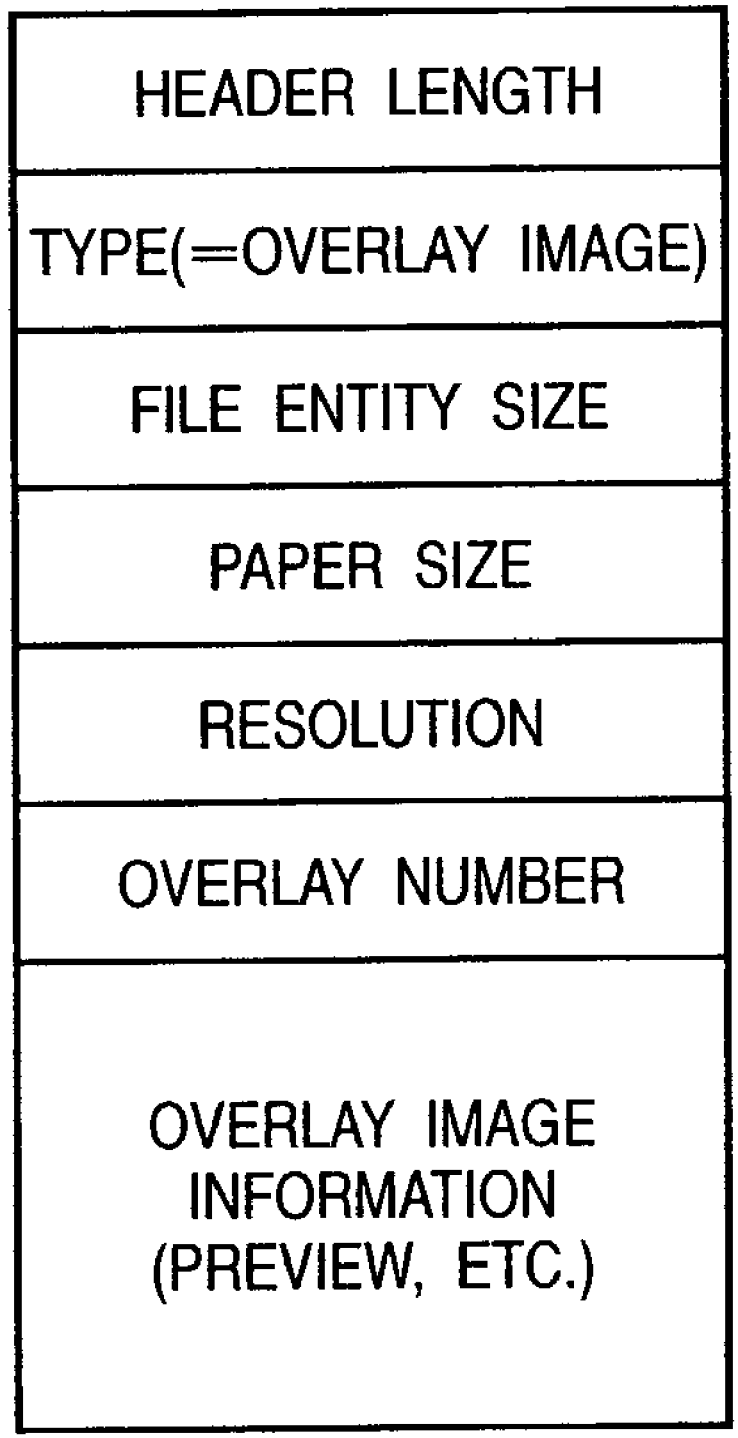
FIG. 27 shows header information in the data structure when information used by a printer driver is output to the client PC upon overlaying a scan image.

FIG. 27 shows the header information in FIG. 23 when the server 2 outputs information used by a printer driver upon overlaying an image scanned by the scanner to the client PCs 4 and 5. As can be seen from FIG. 27, the paper size, resolution, and overlay number are appended as additional information.

Figure 28:
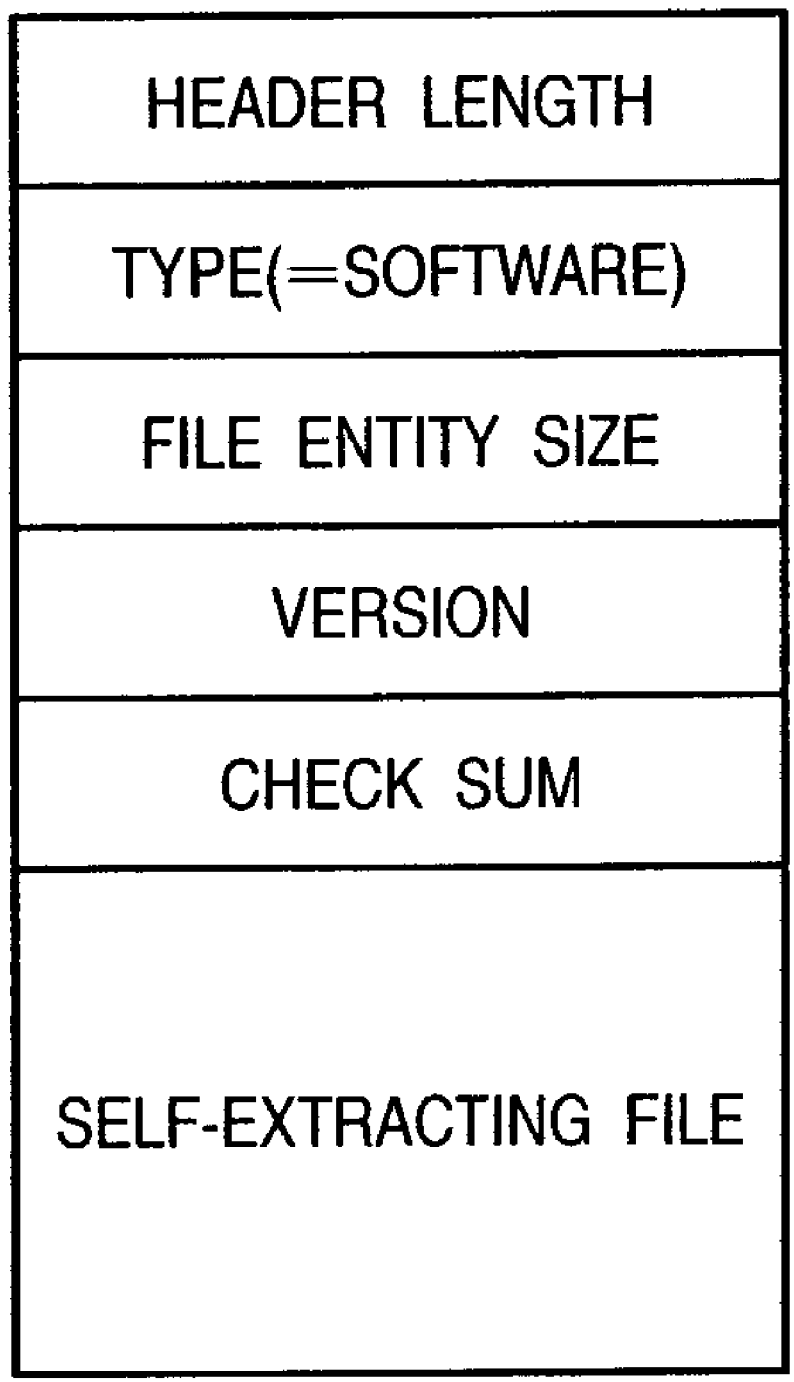
FIG. 28 shows header information in the data structure upon outputting software to the client PC.

FIG. 28 shows the header information in FIG. 23 when the server 2 outputs software to the client PCs 4 and 5. As can be seen from FIG. 28, the version of software and the check sum of a file are appended as additional information. The file entity is a self-extracting installer, and the client module 603 launches the downloaded self-extracting installer.

Figure 29:
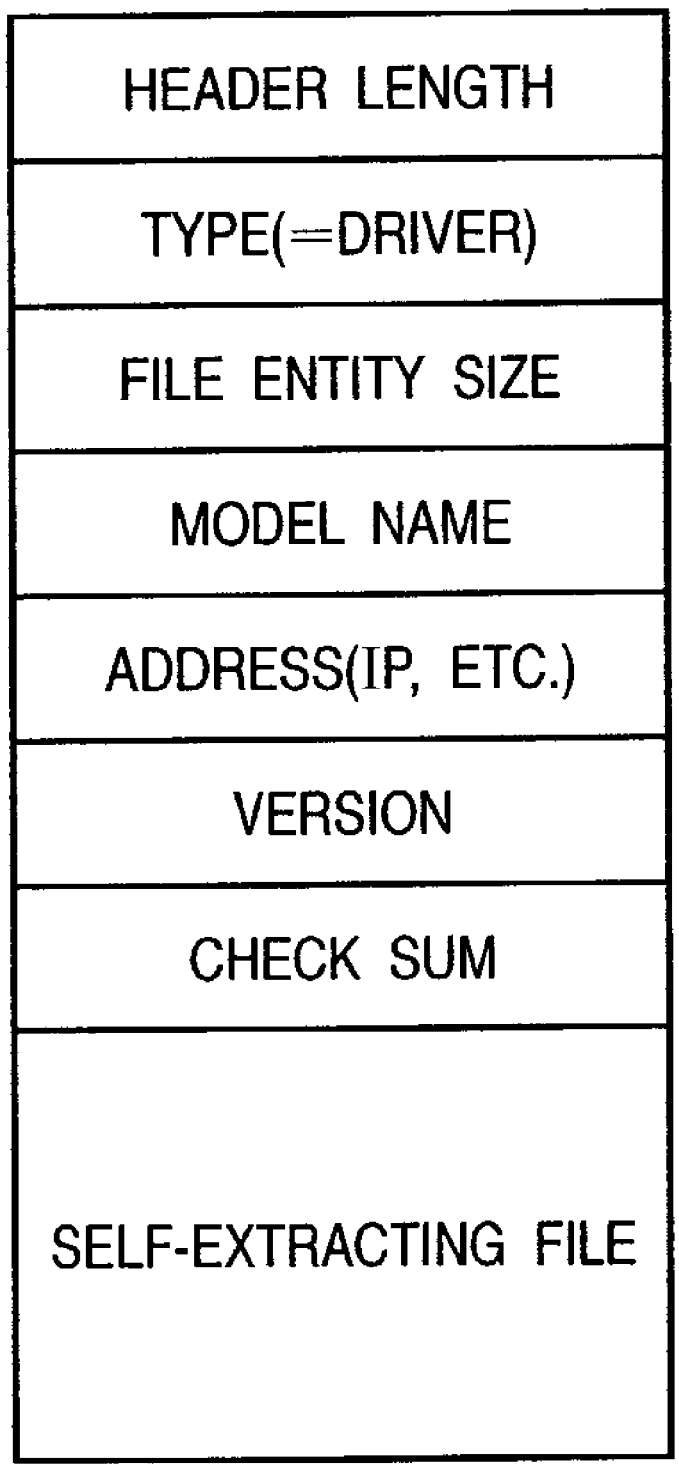
FIG. 29 shows header information in the data structure upon outputting a driver to the client PC.

FIG. 29 shows the header information in FIG. 23 when the server 2 outputs a driver to the client PCs 4 and 5. As can be seen from FIG. 29, the model name of a peripheral device, the address used to access the peripheral device (IP address in case of TCP/IP connection), the driver version, and the check sum of a file are appended as additional information. The file entity is a self-extracting installer, and the client module 603 launches the downloaded self-extracting installer using the model name and address as arguments.

<Data Packet Format>

Figure 37:
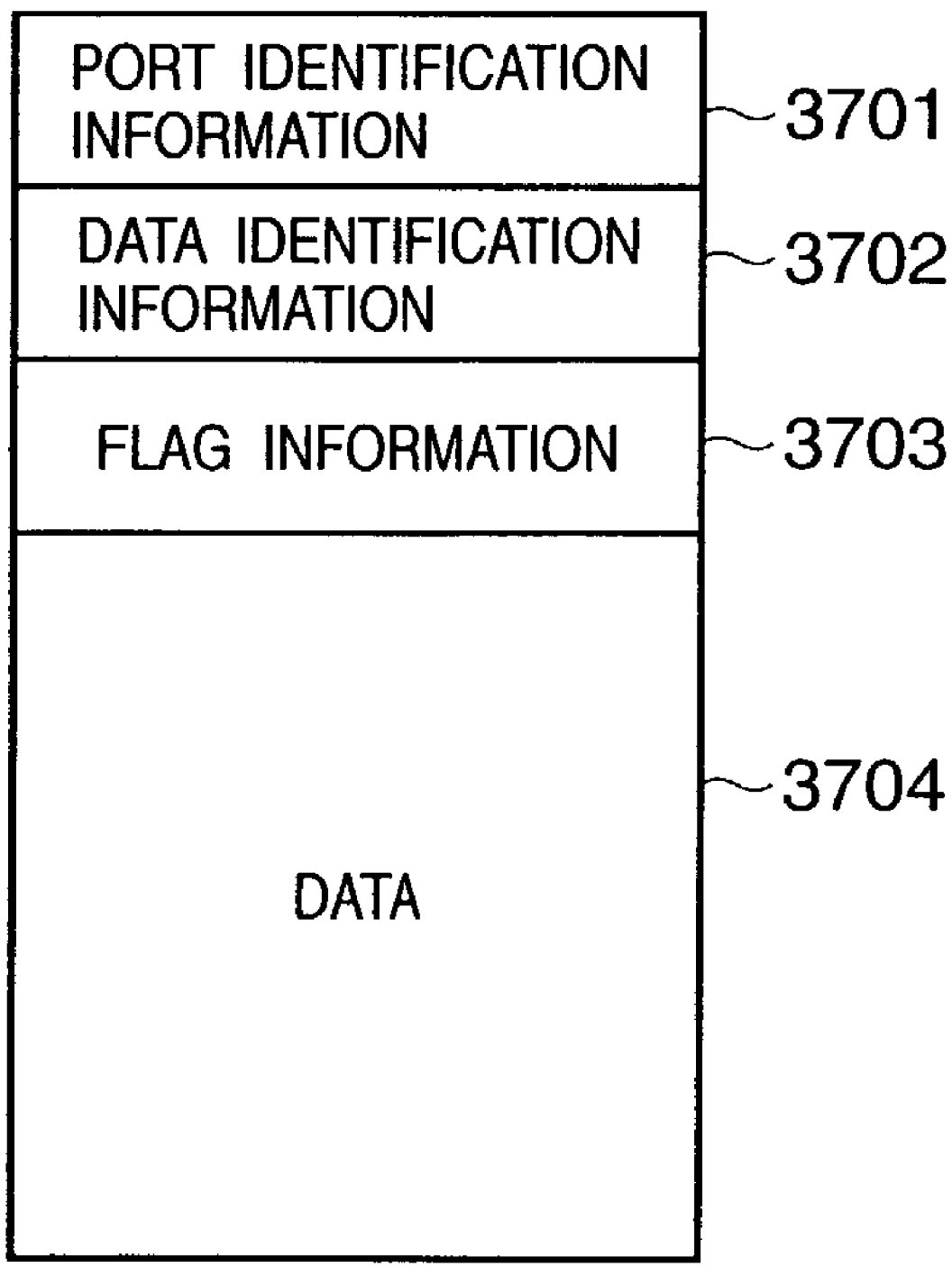
FIG. 37 is a view for explaining a data packet that implements multi-channels in the first and second embodiments.

FIG. 37 shows the format of a data packet which flows on the network line 201 and a connection line between modules when the server 2, administrator PC 3, client PCs 4 and 5, printers 6 and 7, and hybrid function copying machines 8 and 9 exchange data with each other. Port identification information 3701 is designated by the sender so that the recipient can determine ports in which data is to be received and processed. In this embodiment, a multi-channel system is implemented by the port identification information 3701. Data identification information 3702 is used to identify data of the same type when data is segmented into a plurality of packets. Flag information 3703 indicates whether or not data is segmented into a plurality of packets, and the order of data if the data is segmented into a plurality of packets. Data entity fields 3704 are extracted from the packets by the recipient, and are combined as needed to restore data sent from the sender.

Data shown in FIGS. 24 to 29 are exchanged as the data field 3704 in the packet shown in FIG. 37. When data has exceeded a predetermined size, it is segmented into a plurality of packets upon sending.

<Download Sequence>

Figure 34:
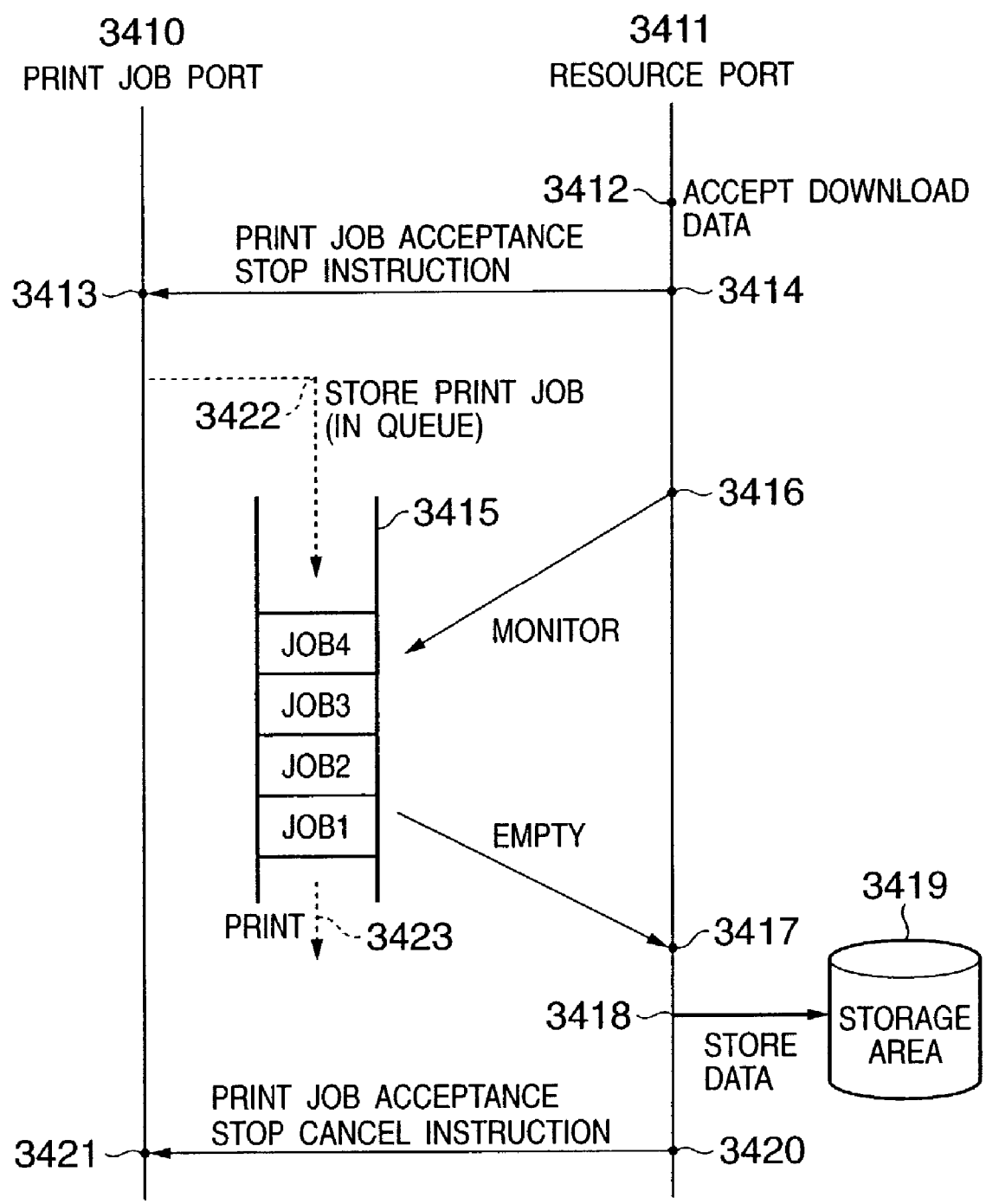
FIG. 34 is a sequence chart time-serially showing processes of respective ports in the processes of the first and second embodiments.

FIG. 34 is a sequence chart showing the process executed when font or form data associated with a print process is downloaded from the administrator PC 3 to the printers 6 and 7 and hybrid function copying machines 8 and 9. A print job port 3410 and resource port 3411 are designated by the port identification information 3701 contained in a data packet. For example, upon downloading, the resource port 3411 is designated by the administrator PC 3 that downloads data. On the other hand, upon executing a print process, the print job port 3410 is designated by the client PC or the like that issues a print job. The port identification information corresponds to, e.g., a port number in TCP.

Print data is sent to the print job port 3410 as a print job appended with a control code. In the print job port 3410, a buffering process 3422 normally enqueues the received print job in a print queue buffer 3415 in a print ready state, and a print process 3423 dequeues and executes the print job from the print queue buffer 3415. When the print job is executed, an actual print process is carried out. In this embodiment, the print job consists of a command group used to form a print image, text data, and image data, and is stored in the print queue buffer 3415 in that format. The print process 3423 interprets the command group used to form an image, thus forming an image. The command group used to form a print image includes commands that form an image using font and form data saved as resources on the printer.

On the other hand, download data is sent to the resource port 3411. Upon accepting download data at a timing 3412, a processing program of the resource port 3411 instructs the print job port to stop acceptance of a print job at a timing 3414. Upon receiving the stop instruction, the print job port stops acceptance of a print job at a timing 3413. In this embodiment, acceptance of a print job is stopped by setting the print job port that received the stop instruction in an acceptance stop state. The sender of a print job confirms the state of the print job port before it sends a print job. If the sender confirms that the print job port is inaccessible (acceptance stop state), it does not send any job.

If the sender and recipient of a print job can communicate in two ways, the print job port may have a function of informing the sender of a print job of denial of acceptance of the print job upon receiving a print job. In such case, the print job port 3410 informs the sender of a print job of denial of acceptance of the print job at the timing 3413.

If acceptance of a print job is stopped at the timing 3413, no more print jobs are stored in the print queue buffer 3415. The resource port 3411 begins to monitor the print queue buffer 3415 at a timing 3416. On the other hand, the print process 3423 is continued to process jobs in the print queue buffer 3415 in turn. When the resource port 3411 can confirm that the print queue buffer 3415 has become empty, it starts the next process 3418 at that timing 3417. Whether or not the print queue buffer 3415 becomes empty can be confirmed at the timing 3417 by monitoring by means of positive polling from the resource port 3411 or by information from the print queue buffer 3415 to the resource port 3411. At a timing 3418, the download data accepted at the timing 3412 is stored in an appropriate storage area 3419. Note that the appropriate storage area indicates a storage device such as a flash ROM, hard disk, or the like in the printers 6 and 7 and hybrid function copying machines 8 and 9. The resources stored in the storage area 3419 are used as needed, e.g., upon execution of a print job.

Finally, the resource port 3411 restarts acceptance of a print job at the print job port at a timing 3420. The print job port accepts a print job again from a timing 3421 at which it receives an acceptance restart instruction, and executes the normal process, i.e., the buffering process 3422 buffers print jobs in the print queue buffer 3415 and the print process 3423 executes the print jobs. Note that acceptance of a print job is restarted at the timing 3420 by the same mechanism as that when acceptance of a print job is stopped at the timing 3413. That is, in the print job port 3410, the acceptance stop state of a print job is canceled at a timing 3420. Note that the sender of a print job checks, prior to sending of a print job, if the print job port 3410 is in an acceptance stop state, and sends the entire print job if the print job port 3410 is not in an acceptance stop state, so as to download resources for respective print jobs.

Or the print job port 3410 informs the sender of a print job of cancel of denial of acceptance.

<Download Sequence>

Figure 35:
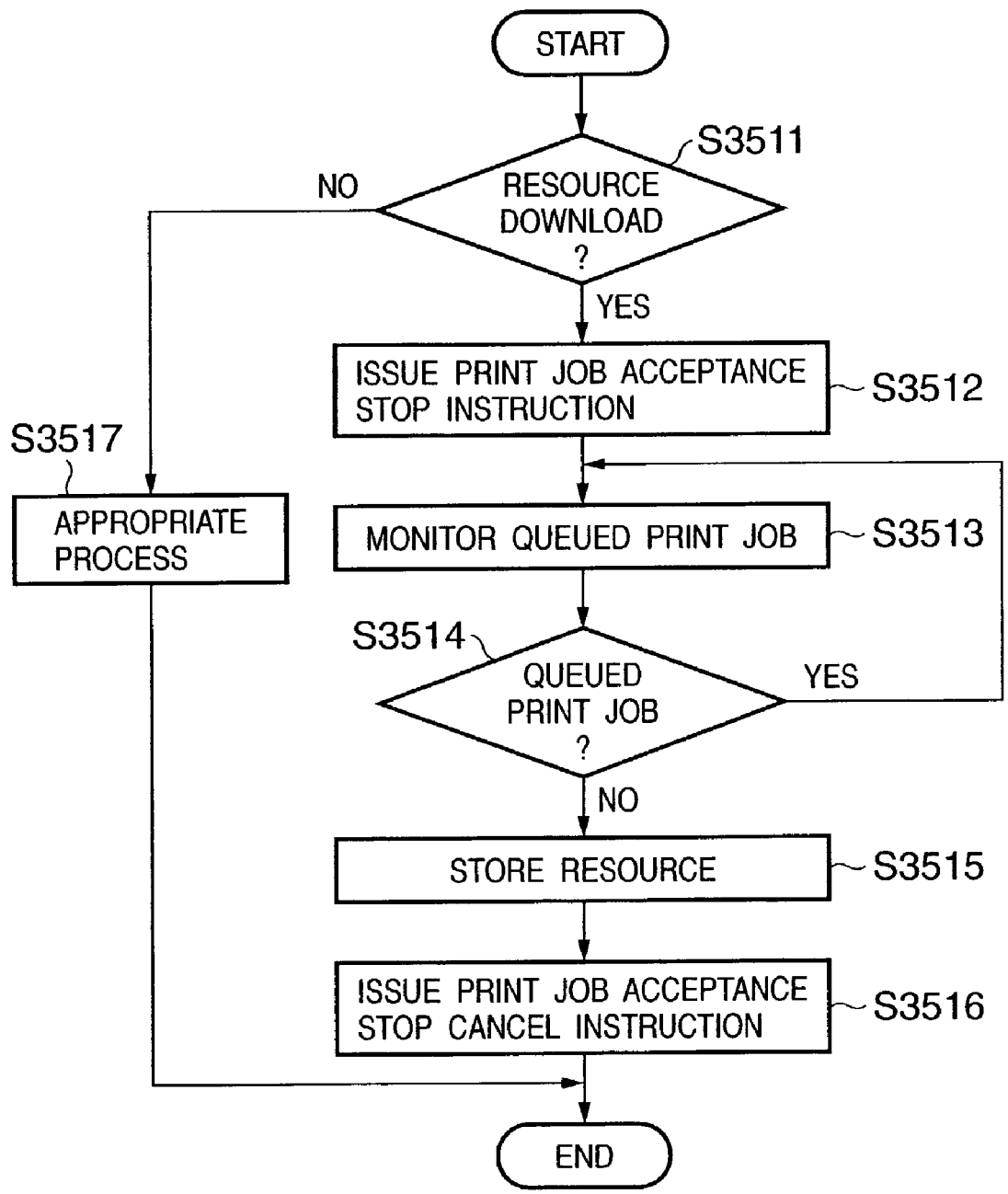
FIG. 35 is a flow chart showing the process at a resource port of the first embodiment.

FIG. 35 is a flow chart of a program that controls the resource port 3411 in FIG. 34.

As shown in FIG. 2, when the printers 6 and 7 and hybrid function copying machines 8 and 9 have a storage area such as the HD 222, since the print queue buffer 3415 is prepared in that printer or hybrid function copying machine, the program in FIG. 35 is executed in the printer or hybrid function copying machine.

On the other hand, when the printers 6 and 7 do not have any storage area, since the print queue buffer 3415 cannot be assured in the printer side, the print queue buffer 3415 is prepared in a PC so-called a printer server. In this case, a print request and download request are issued to the PC serving as the printer server, and the resource port and print job port are prepared in that printer server PC. Therefore, the sequence in FIG. 35 is executed not by the printer but by the printer server PC on which the printer queue buffer 3415 of the printer is prepared. However, the resource data storage process 3418 and print process 3423 in FIG. 34 are requested from the printer server PC to the printer.

Referring to FIG. 35, it is checked in step S3511 if data sent to the resource port 3411 is resource download data. If it is determined based on the port identification information 3701 in FIG. 37 that the designated port is the resource port, this checking process is done based on its contents, i.e., if data shown in one of FIGS. 24 to 29 is to be downloaded.

The data shown in FIGS. 24 to 29 are obtained by reconstructing the data 3704 in FIG. 37 as needed since they are often segmented into a plurality of packets. Using the "type" field of the data in the format shown in FIGS. 24 to 29, it is checked if the data sent to the resource port 3411 is resource download data. For the sake of easy checking, an identifier "download" may be contained as the type of data. Also, when a port exclusively used to download resources may be prepared, and is designated upon downloading, the checking process in step S3511 can be implemented by referring to the port identification information 3701 alone.

If it is determined in step S3511 that the data sent to the resource port 3411 is not data that aims at downloading of resources, an appropriate process is executed in step S3517, and the processing ends. If it is determined in step S3511 that the data sent to the resource port 3411 is data that aims at downloading of resources, the flow advances to step S3512.

In step S3512, an acceptance stop instruction of a print job is issued by the method that has been explained in association with the timing 3414 in FIG. 34. It is monitored in step S3513 if print jobs remain in the print queue buffer 3415. This monitoring process is repeated until it is determined in step S3514 that all queued print jobs are dequeued from the print queue buffer 3415. If it is confirmed in step S3514 that no print job is present in the print queue buffer 3415, the flow advances to step S3515 to store resource data in the appropriate storage area 3419. Finally, an acceptance stop cancel instruction of a print job, i.e., restart instruction is issued by the method that has been explained in association with the timing 3420 in FIG. 34 in step S3516, thus ending the processing.

As described above, since the output device such as a printer or the like is controlled not to accept a new print job upon downloading resources, and download data is stored in the appropriate storage area after completion of the print processes of the queued print jobs, adverse influence such as garbled characters or the like due to a change in resource data during generation of output data can be prevented. Also, print jobs which have already been sent before the beginning of resource download and have been queued at the beginning of resource download can stably output expected results without any unexpected results.

More specifically, since the update timing of the resources is set at a synchronous point of acceptance and execution of print jobs, print jobs issued before the resources are updated use those before update, and print jobs issued after the resources have been updated can use the updated resources.

[Second Embodiment]

Figure 30:
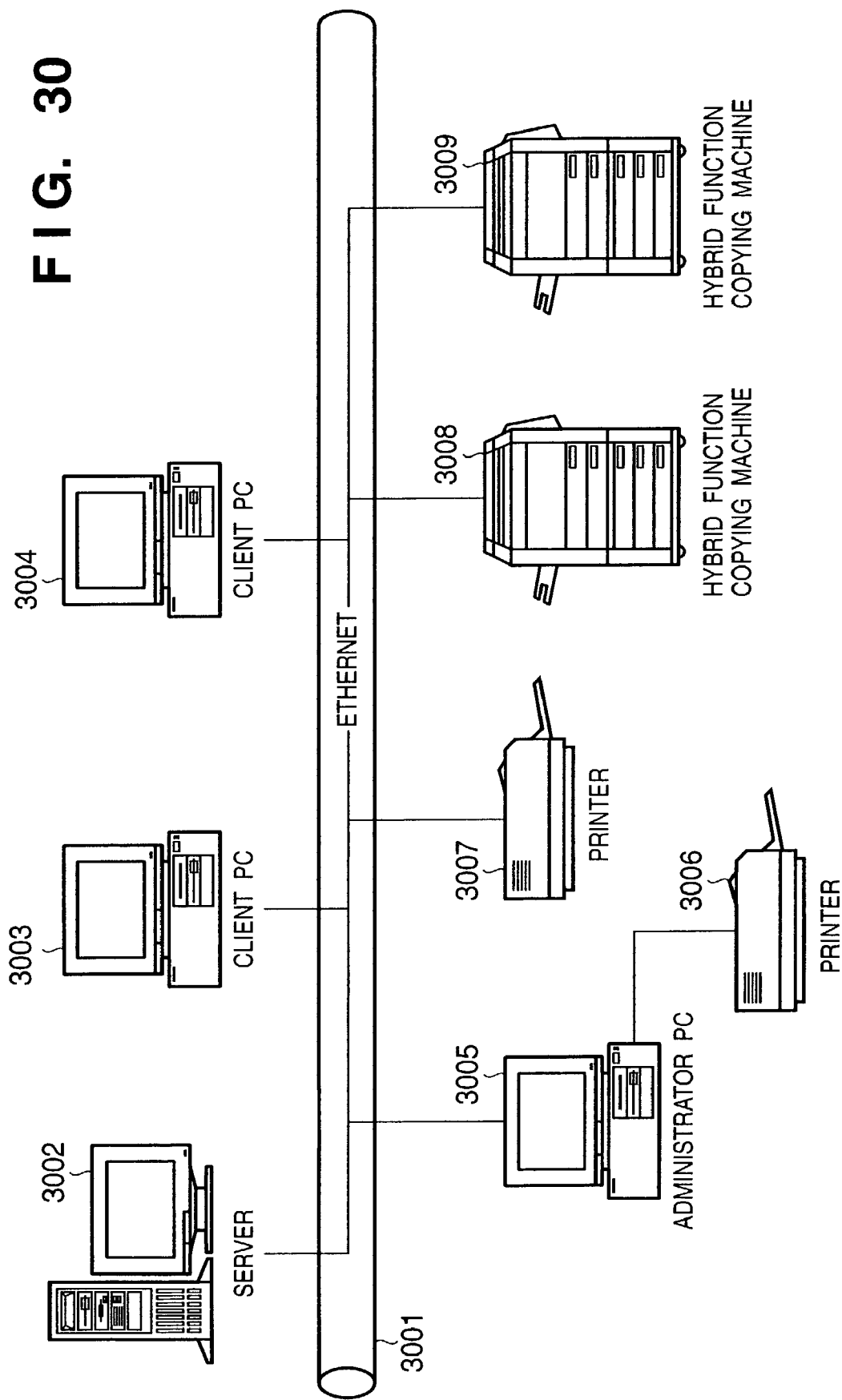
FIG. 30 is a diagram showing the arrangement of devices according to the second embodiment of the present invention.

FIG. 30 best illustrates a characteristic feature of a system of the second embodiment. In the system of this embodiment, a printer 3006 is not a network printer but is connected via a PC. Upon downloading resources to this printer 3006, acceptance of a new print job is stopped, and the resources are downloaded after completion of the processes of the already issued and queued print jobs.

In FIG. 30, Ethernet is normally used as a network 3001. In addition to Ethernet, LocalTalk or the like may be used. Note that "network" in this embodiment indicates a physical cable, an electrical signal that flows on the cable, and one or a plurality of protocols which implement information exchange as a combination of electrical signals, and normally indicates their generic description.

A server computer 3002 has functions of a Web server, and the like, and comprises the core of this invention. An administrator personal computer (to be abbreviated as a PC hereinafter) 3005 is used to issue instructions to the server and peripheral devices. Client PCs 3003 and 3004 are connected to the network, and are used by normal users. Note that even the administrator PC may be used as a client PC.

The printer 3006 is connected to the administrator PC 3005 via a cable such as a Centronics cable that allows two-way communications. Normally, this printer is exclusively used by the administrator PC 3005. However, when the administrator PC 3005 discloses the printer 3006 as a shared printer, other PCs such as the client PC 3004 connected to the network 3001 can use that printer.

A printer 3007 is connected to the network 3001, receives print commands (print jobs) from the client PCs 3003 and 3004, and executes print processes according to the commands. Hybrid function copying machines 3008 and 3009 comprise an image scanner function, printer function, and facsimile function, and can be used as a copying machine, printer, scanner, and facsimile by combining one or a plurality of functions.

The operation of this system will be explained below using FIG. 30. The server 3002 periodically communicates with the printers 3006 and 3007 and hybrid function copying machines 3008 and 3009 to monitor their states and software setups. The administrator PC 3005 changes setups, software, and resources used by software in the devices. The results of instructions issued by the administrator PC 3005 are collected as information in the server 3002, and the client PCs 3003 and 3004 receive that information from the server 3002. The server 3002 comprises a communication means using the http protocol, and the administrator PC 3005, and client PCs 3003 and 3004 can acquire information from the server 3002 using Web browsers or can issue instructions to the server 3002. Upon receiving an instruction from the administrator PC 3005 or the client PC 3003 or 3004, the server 3002 acquires information from the printer 3007 and hybrid function coping machines 3008 and 3009 and returns information to the administrator PC 3005 or the client PC 3003 or 3004, or executes, e.g., a setup process for the printer 3007 and hybrid function copying machines 3008 and 3009. When the same process is to be done for the printer 3006 disclosed as a shared printer, a peripheral device management program on the administrator PC 3005 to which the printer 3006 is connected receives an instruction, and the administrator PC 3005 itself processes a result of processing via a communication with the printer 3006 or returns the result to the client PC 3003 or 3004.

The client PCs 3003 and 3004 directly communicate with the printer 3007 and hybrid function copying machines 3008 and 3009 via the network 3001 to exchange information. When the client PCs 3003 and 3004 exchange information with the printer 3006 connected to the administrator PC 3005, the administrator PC 3005 communicates with the printer 3006, and a peripheral device management program on the administrator PC 3005 communicates as an agent with the client PCs 3003 and 3004.

The administrator PC 3005 comprises a downloader, and downloads software or resources used by software to the printers 3006 and 3007 and hybrid function copying machines 3008 and 3009. The software includes print control firmware, network control firmware, and the like of a device. In the hybrid function copying machines 3008 and 3009, the software to be downloaded includes scanner control firmware, facsimile control firmware, copying machine firmware, panel operation firmware, image management software, address management software, and the like in addition to the aforementioned firmware programs. The resources used by software include fonts, external characters, overlay forms, calibration tables, address information and facsimile numbers used by address management software, and the like.

The client PCs 3003 and 3004 hold software (drivers and the like) required to access and use the printers 3006 and 3007 and hybrid function copying machines 3008 and 3009, and resources (client PC resources) used by the software. The software held by these PCs includes a printer driver required to use a printer, a scanner driver required to use a scanner, a facsimile driver required to use a facsimile, copying machine utility software required to control the copying machine, a network driver required to use the network, a Web browser, application software, and the like. The resources used by the software include client PC fonts corresponding to printer fonts, address information used by the facsimile driver, a color calibration table required upon color calibration, an overlay image used in preview, and the like.

In addition to the aforementioned functions, the setup contents, software, and resources used by software of the printer 3006 can be reflected in the printer 3007, and hybrid function copying machines 3008 and 3009. Likewise, the setup contents, software, and resources used by software of the hybrid function copying machine 3008 can be reflected in the hybrid function copying machine 3009 and the printers 3006 and 3007. If functions are different between models, only functions common to these models are reflected. Information such as resources or the like that can be converted is reflected after conversion. Also, information on the client PC 3003 that pertains to these models can be reflected in the client PC 3004. Such processes are implemented by exchanging information via the server 3002.

The setup contents of the printers 3006 and 3007 and hybrid function copying machines 3008 and 3009 are often changed not only by instructions from the administrator PC 3005 but also by setups from a panel and the client PC 3003 or 3004. If this setup information is required by the client PC, an inquiry is issued to the printers 3006 and 3007 and hybrid function copying machines 3008 and 3009, and information at the time of the inquiry is returned to the client PC. In a connection between the administrator PC 3005 and printer 3006, a multi-channel system is implemented using packet data in the format shown in FIG. 37. Also, as for download processes of font and form resources according to the present invention, data are exchanged between the administrator PC 3005 and printer 3006 using the multi-channel system as in the sequence shown in FIG. 34.

Figure 36:
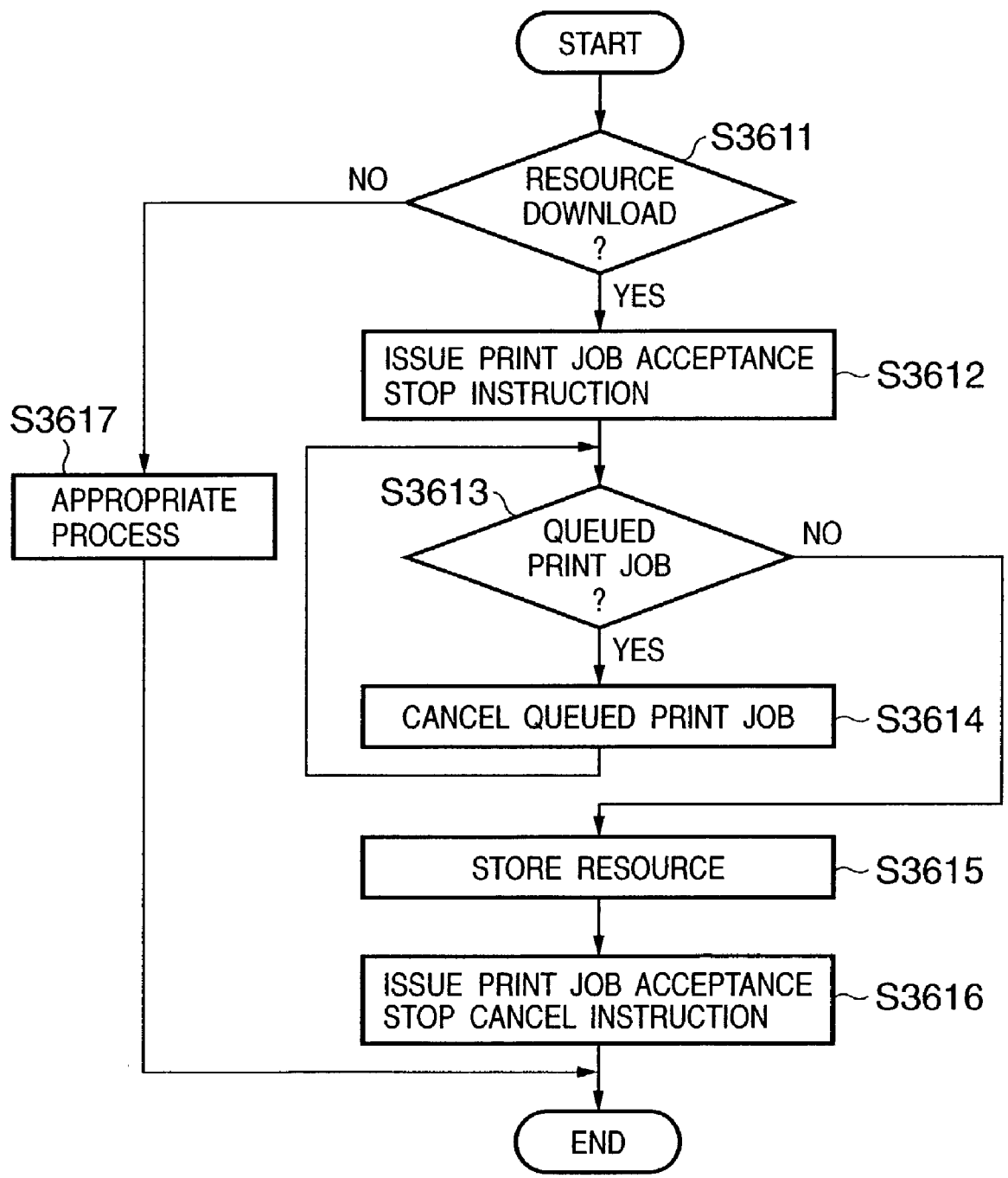
FIG. 36 is a flow chart showing the process at a resource port of the second embodiment.

FIG. 36 is a flow chart of a program that controls the resource port 3411 in FIG. 34 in this embodiment.

As shown in FIG. 30, when the printers 3006 and 3007 and hybrid function copying machines 3008 and 3009 have a storage area such as the HD 222, since the print queue buffer 3415 in FIG. 34 is prepared in that printer or hybrid function copying machine, the program in FIG. 36 is executed in the printer or hybrid function copying machine.

On the other hand, when the printers 3006 and 3007 do not have any storage area, since the print queue buffer 3415 cannot be assured in the printer side, the print queue buffer 3415 is prepared in the administrator PC 3005. In this case, a print request and download request are issued to the PC serving as a printer server, and the resource port and print job port are prepared in the administrator PC 3005. Therefore, the sequence in FIG. 36 is executed not by the printer but by the administrator PC 3005 on which the printer queue buffer 3415 of the printer is prepared. However, the resource data storage process 3418 and print process 3423 in FIG. 34 are requested from the administrator PC 3005 to the printer.

Referring to FIG. 36, it is checked in step S3611 if data sent to the resource port is resource download data. If it is determined based on the port identification information 3701 in FIG. 37 that the designated port is the resource port, this checking process is done based on its contents, i.e., if data shown in one of FIGS. 24 to 29 is to be downloaded. The data shown in FIGS. 24 to 29 are obtained by reconstructing the data 3704 in FIG. 37 as needed since they are often segmented into a plurality of packets. Using the "type" field of the data in the format shown in FIGS. 24 to 29, it is checked if the data sent to the resource port is resource download data. For the sake of easy checking, an identifier "download" may be contained as the type of data. Also, when a port exclusively used to download resources may be prepared, and is designated upon downloading, the checking process in step S3611 can be implemented by referring to the port identification information 3701 alone.

If it is determined in step S3611 that the data sent to the resource port is not resource download data, an appropriate process is executed in step S3617, and the processing ends. If it is determined in step S3611 that the data sent to the resource port 3411 is resource download data, the flow advances to step S3612.

In step S3612, an acceptance stop instruction of a print job is issued by the method that has been explained in association with the timing 3414 in FIG. 34. It is checked in step S3613 if print jobs remain in the print queue buffer 3415.

If it is determined in step S3613 that print jobs remain in the print queue buffer 3415, one print job is canceled, i.e., is deleted from the print queue buffer 3415 without any print process in step S3614. Steps S3613 and S3614 are repeated until all print jobs are deleted from the print queue buffer 3514 (until all of JOB1 to JOB4 are canceled in FIG. 34).

If it is confirmed in step S3613 that no print job remains in the print queue buffer 3415, the flow advances to step S3615 to store resource data in the appropriate storage area 3419. Finally, an acceptance stop cancel instruction of a print job, i.e., restart instruction is issued by the method that has been explained in association with the timing 3420 in FIG. 34 in step S3616, thus ending the processing.

As described above, even upon downloading data to the printer directly connected to the PC, since the printer is controlled not to accept a print job upon downloading resources, an unwanted print process such as garbled characters or the like due to a change in resource data during generation of output data can be prevented. Furthermore, in this embodiment, since queued print jobs are forcibly canceled at the time of reception of download data, a process which is normally executed by the administrator and influences all the clients can be preferentially and smoothly executed.

[Third Embodiment]

In the first and second embodiments, the download process is executed after all queued jobs in an output device such as a printer or the like are cleared, i.e., after the output processes of queued print jobs are completed or after all queued print jobs are forcibly deleted.

However, when a print job, the output process of which is protected by authentication information such as a password or the like, is queued, that print job is not output before authentication is made based on a password input by an authorized person (output authorized person), and stays in the print queue buffer in the ready state, thus disturbing the download process.

As for the method that forcibly deletes queued jobs, a protected job cannot be deleted, and such method is unreasonable for even the user who issued an unprotected print job.

In this embodiment, image data of print jobs, which have already been queued upon downloading resource data, are generated using resources, and the output processes of these print jobs are suspended in that state. Hence, even a print job that requires authentication of an output authorized person can be removed from the print queue buffer, and queued print jobs can be quickly processed without forcibly deleting print jobs. In this way, after queued print jobs are processed, resource data can be downloaded.

The system of this embodiment is common to the first and second embodiments in the arrangements shown in FIGS. 1 to 33. Hence, differences will be mainly explained.

FIG. 41 shows the structure of print data which is sent from the administrator PC 3 and client PCs 4 and 5 (FIG. 1) to the printers 6 and 7 and hybrid function copying machines 8 and 9. The entire data shown in FIG. 41 is contained in the data field 3704 in FIG. 37.

Referring to FIG. 41, sender information 3801 contains the data sender name, IP address of a PC, e-mail address, and the like. Output authorized person information 3802 contains information such as the name or group name, password, e-mail address, and the like as information of a person who is authorized to output the corresponding print data from the printer 6 or 7 or the hybrid function copying machine 8 or 9. Note that the data sender and output authorized person may be the same person. Data 3803 contains text data and image data which form a printout, and a command group used to form an image. Upon actually outputting a printout, the printer 6 or 7 or the hybrid function copying machine 8 or 9 interprets these commands to form a print image. The data shown in FIG. 41 corresponds to a print job. When the output authorized person wants to obtain a printout based on the sent print data, he or she inputs a password by operating the panel of an output device that stores the print data or sending an instruction to the output device that stores the print data via the network, and undergoes an authentication process. When the password is input, the output device outputs the authorized print job.

In this embodiment, print data sent from the administrator PC 3 or the client PC 4 or 5 to the printer 6 or 7 or the hybrid function copying machine 8 or 9 is stored in the print queue buffer and a job save area to have the structure shown in FIG. 41, which requires a smaller data size than a rendered image, except for a special job.

Figure 38:
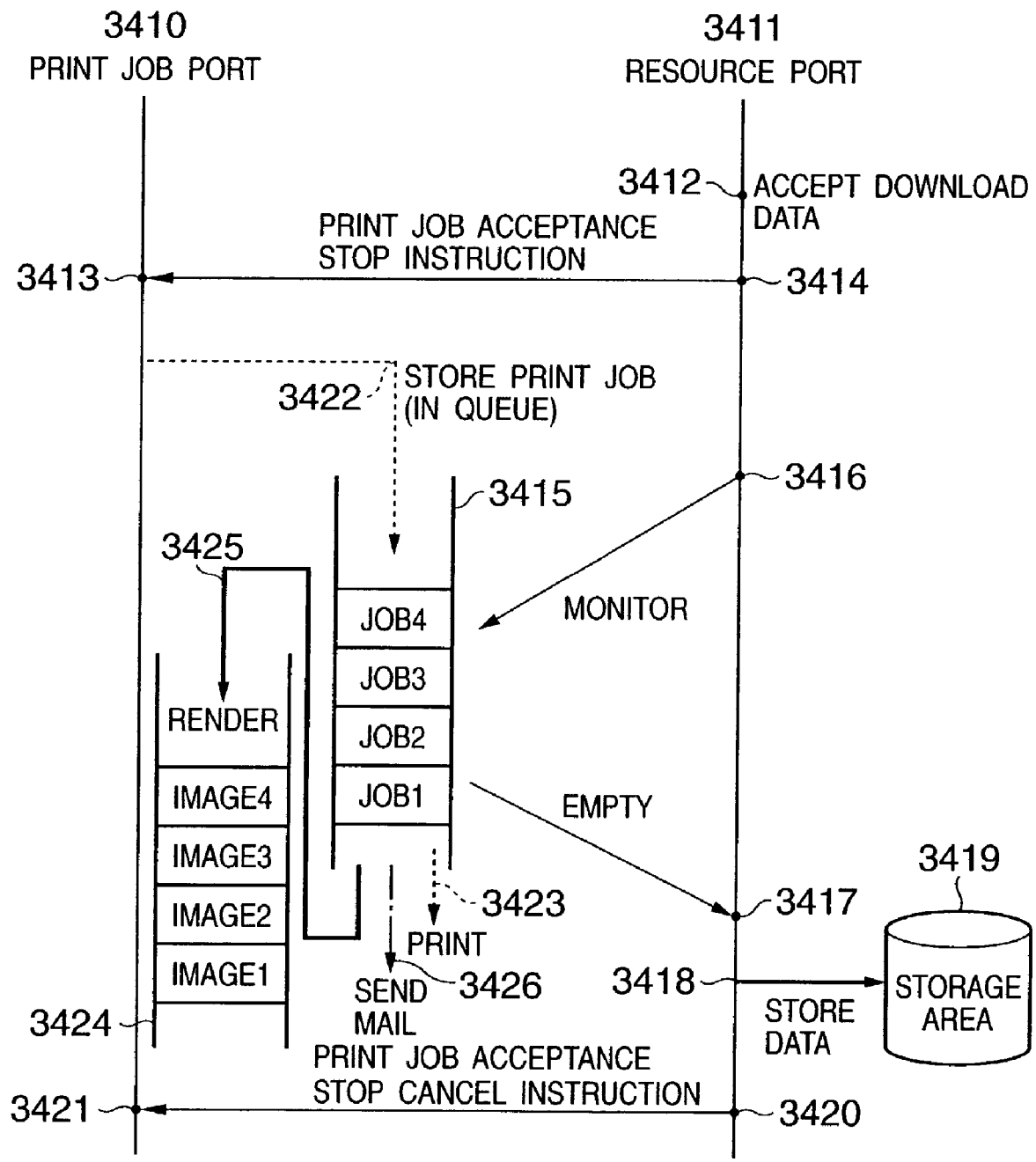
FIG. 38 is a sequence chart time-serially showing processes of respective ports in the processes of the third and fourth embodiments.

FIG. 38 is a sequence chart showing the process executed when font or form data associated with a print process is downloaded to the printers 6 and 7 and hybrid function copying machines 8 and 9. A job port 3410 and resource port 3411 are designated by the port identification information 3701 contained in a data packet, as shown in FIG. 37. Print data is sent to the print job port 3410 as a print job appended with a control code. In the print job port 3410, a buffering process 3422 normally enqueues the received print job in a print queue buffer 3415 in a print ready state, and an output process 3423 executes print jobs in turn. In this embodiment, the print job consists of a command group used to form a print image, text data, and image data, and is stored in the print queue buffer 3415 in that format. The output process 3423 interprets the command group used to form an image, thus forming an image.

The command group used to form a print image includes commands that form an image using font and form data saved as resources in the printer. If a print job in the print queue buffer 3415 requires authentication of the output authorized person, the authentication procedure of the output authorized person is required to proceed with the output process 3423.

On the other hand, download data is sent to the resource port 3411. Upon accepting download data at a timing 3412, a processing program of the resource port 3411 instructs the print job port to stop acceptance of a print job at a timing 3414. Upon receiving the instruction, the print job port stops acceptance of a print job at a timing 3413. In this embodiment, acceptance of a print job is stopped by setting the print job port that received the stop instruction in an acceptance stop state. The sender of a print job confirms the state of the print job port before it sends a print job. If the sender confirms that the print job port is inaccessible (acceptance stop state), it does not send any job.

If the sender and recipient of a print job can communicate in two ways, the print job port may have a function of informing the sender of a print job of denial of acceptance of the print job upon receiving a print job. In such case, the print job port 3410 informs the sender of a print job of denial of acceptance of the print job at the timing 3413.

If acceptance of a print job is stopped at the timing 3413, no more print jobs are stored in the print queue buffer 3415. The resource port 3411 begins to monitor the print queue buffer 3415 at a timing 3416.

Jobs in the print queue buffer 3415 include ones which cannot be printed in turn since they require authentication for output. Hence, a rendering process 3425 renders print data 3803 to image data, and that image data is stored in a print queue data save area 3424 together with the sender information 3801 and output authorized person information 3802. Alternatively, as will be described in detail later in the fourth embodiment, a mail sending process 3426 sends an e-mail message using the sender information 3801 and output authorized person information 3802.

When the resource port 3411 can confirm that the print queue buffer 3415 has become empty, it starts the next process 3418 at that timing 3417. Whether or not the print queue buffer 3415 becomes empty can be confirmed at the timing 3417 by monitoring by means of positive polling from the resource port 3411 or by information from the print queue buffer 3415 to the resource port 3411.

When the print queue buffer (job queue) has become empty, the download data accepted at the timing 3412 is stored in an appropriate storage area 3419. Note that the appropriate storage area indicates a storage device such as a flash ROM, hard disk, or the like in the printers 6 and 7 and hybrid function copying machines 8 and 9. The resources stored in the storage area 3419 are used as needed, e.g., upon execution of a print job.

Finally, the resource port 3411 instructs the print job port 3410 to restart acceptance of a print job at a timing 3420. The print job port 3410 accepts a print job again from a timing 3421 at which it receives an acceptance restart instruction, and executes the normal process, i.e., the buffering process 3422 buffers print jobs in the print queue buffer 3415 and the output process 3423 executes the print jobs. Note that acceptance of a print job is restarted at the timing 3420 by the same mechanism as that when acceptance of a print job is stopped at the timing 3413.

Figure 39:
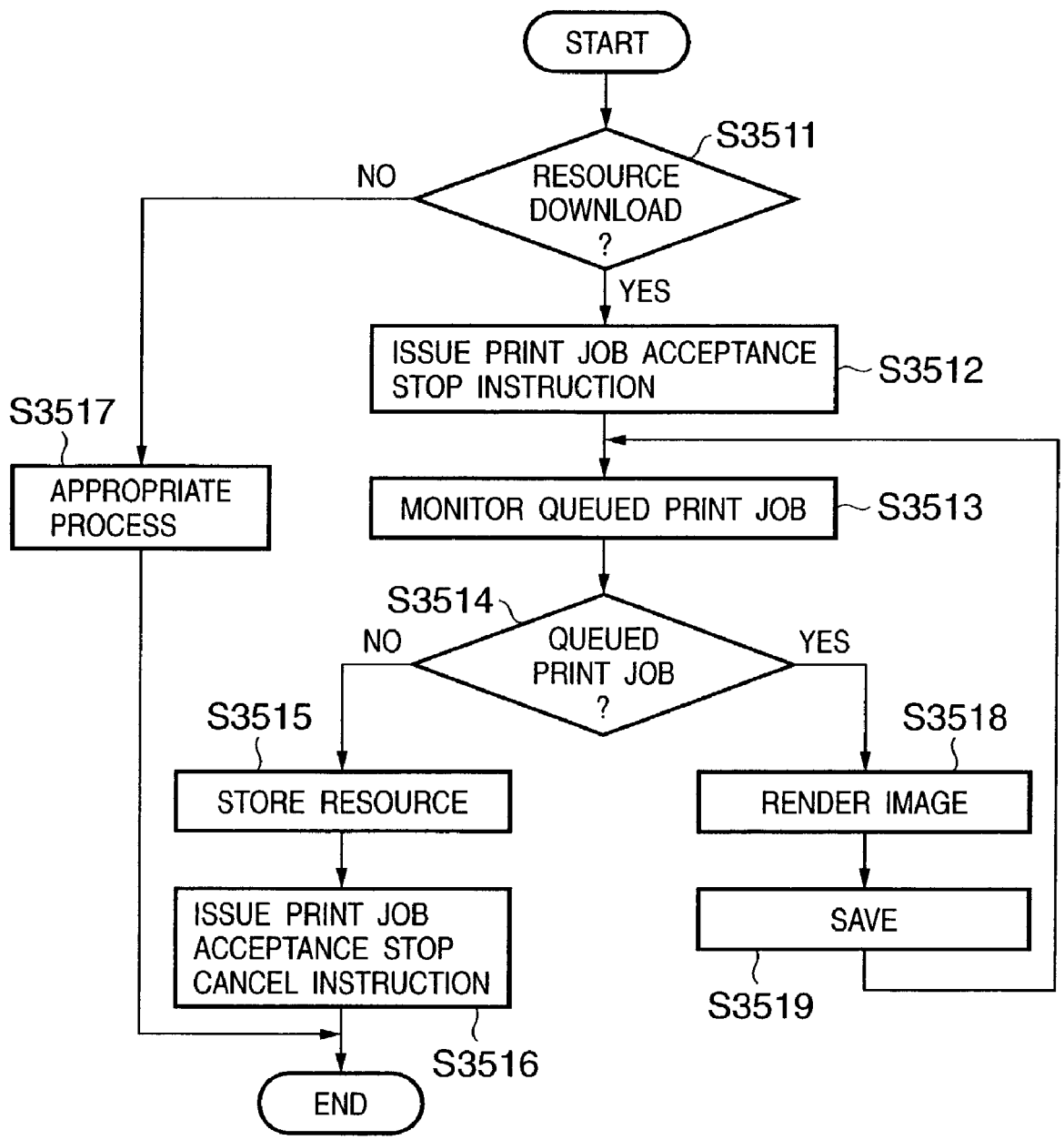
FIG. 39 is a flow chart showing the process of the third embodiment.

FIG. 39 is a flow chart of a program that controls the resource port 3411 and print job port 3410 in FIG. 38.

As shown in FIG. 2, when the printers 6 and 7 and hybrid function copying machines 8 and 9 have a storage area such as the HD 222, since the print queue buffer 3415 is prepared in that printer or hybrid function copying machine, the program in FIG. 39 is executed in the printer or hybrid function copying machine.

On the other hand, when the printers 6 and 7 do not have any storage area, since the print queue buffer 3415 cannot be assured in the printer side, the print queue buffer 3415 is prepared in a PC so-called a printer server. In this case, a print request and download request are issued to the PC serving as the printer server, and the resource port and print job port are prepared in that printer server PC. Therefore, the sequence in FIG. 39 is executed not by the printer but by the printer server PC on which the printer queue buffer 3415 of the printer is prepared. However, the resource data storage process 3418 and print process 3423 in FIG. 38 are requested from the printer server PC to the printer.

Note that the same step numbers in FIG. 39 denote processing steps common to those in FIG. 35.

It is checked in step S3511 in FIG. 39 if data sent to the resource port 3411 is resource download data. If it is determined based on the port identification information 3701 in FIG. 37 that the designated port is the resource port, this checking process is done based on its contents, i.e., if data shown in one of FIGS. 24 to 29 is to be downloaded. The data shown in FIGS. 24 to 29 are obtained by reconstructing the data 3704 in FIG. 37 as needed since they are often segmented into a plurality of packets. Using the "type" field of the data in the format shown in FIGS. 24 to 29, it is checked if the data sent to the resource port 3411 is resource download data. For the sake of easy checking, an identifier "download" may be contained as the type of data. Also, when a port exclusively used to download resources may be prepared, and is designated upon downloading, the checking process in step S3511 can be implemented by referring to the port identification information 3701 alone.

If it is determined in step S3511 that the data sent to the resource port 3411 is data that aims at downloading of resources, the flow advances to step S3512.

In step S3512, an acceptance stop instruction of a print job is issued by the method that has been explained in association with the timing 3414 in FIG. 38. It is monitored in step S3513 if print jobs remain in the print queue buffer 3415. This monitoring process is repeated until it is determined in step S3514 that all queued print jobs are dequeued from the print queue buffer 3415.

If it is determined in step S3514 that print jobs remain in the print queue buffer, the data field 3803 of that job is rendered to a print image in step S3518, and that image is stored in the print data save area 3424 together with the sender information 3801 and output authorized person information 3802 in step S3519. With the processes in steps S3518 and S3519, a print job to be processed is removed from the print queue buffer 3415. In this way, the processes in steps S3518 and S3519 are repeated for all print jobs in the print queue buffer 3415.

If it is confirmed in step S3514 that no print job is present in the print queue buffer 3415, the flow advances to step S3515 to store resource data in the appropriate storage area 3419. Finally, an acceptance stop cancel instruction of a print job, i.e., restart instruction is issued by the method that has been explained in association with the timing 3420 in FIG. 34 in step S3516, thus ending the processing.

As described above, since the printer is controlled not to accept a print job upon downloading resources, and download data is stored in the appropriate storage area after queued print jobs are rendered to print images and the print images are saved, adverse influence such as garbled characters or the like due to a change in resource data during generation of output data can be prevented. Also, print jobs which have already been sent before the beginning of resource download and have been queued at the beginning of resource download can be printed without being deleted. Furthermore, the aforementioned merits can be applied to a print job which requires authentication of the output authorized person upon output.

[Fourth Embodiment]

In the fourth embodiment, if a queued print job is found upon downloading, a message indicating that the job will be output is sent to an e-mail address designated by that print job, thus calling the attention of a person who issued the print job or the output authorized person. Since the arrangement of the system in this embodiment is the same as that in the third embodiment, a description thereof will be omitted.

Figure 40:
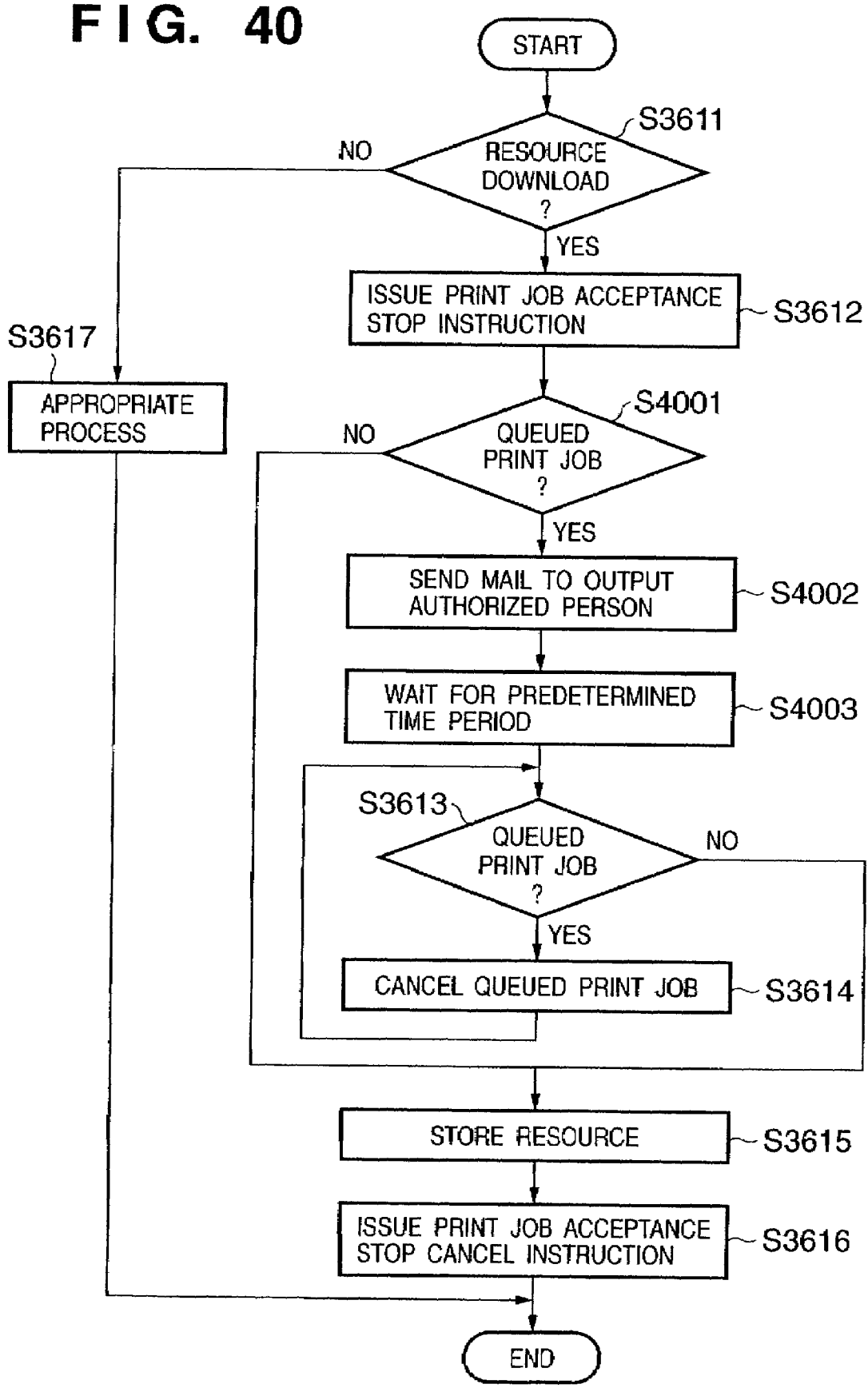
FIG. 40 is a flow chart showing the process of the fourth embodiment.

FIG. 40 is a flow chart of a program that controls the resource port 3411 and print job port 3410 in FIG. 38.

As shown in FIG. 2, when the printers 6 and 7 and hybrid function copying machines 8 and 9 have a storage area such as the HD 222, since the print queue buffer 3415 is prepared in that printer or hybrid function copying machine, the program in FIG. 40 is executed in the printer or hybrid function copying machine.

On the other hand, when the printers 6 and 7 do not have any storage area, since the print queue buffer 3415 cannot be assured in the printer side, the print queue buffer 3415 is prepared in a PC so-called a printer server. In this case, a print request and download request are issued to the PC serving as the printer server, and the resource port and print job port are prepared in that printer server PC. Therefore, the sequence in FIG. 40 is executed not by the printer but by the printer server PC on which the printer queue buffer 3415 of the printer is prepared. However, the resource data storage process 3418 and print process 3423 in FIG. 38 are requested from the printer server PC to the printer.

Note that the same step numbers in FIG. 40 denote processing steps common to those in FIG. 36.

It is checked in step S3611 in FIG. 40 if data sent to the resource port 3411 is resource download data. If it is determined based on the port identification information 3701 in FIG. 37 that the designated port is the resource port, this checking process is done based on its contents, i.e., if data shown in one of FIGS. 24 to 29 is to be downloaded. The data shown in FIGS. 24 to 29 are obtained by reconstructing the data 3704 in FIG. 37 as needed since they are often segmented into a plurality of packets. Using the "type" field of the data in the format shown in FIGS. 24 to 29, it is checked if the data sent to the resource port is resource download data. For the sake of easy checking, an identifier "download" may be contained as the type of data. Also, when a port exclusively used to download resources may be prepared, and is designated upon downloading, the checking process in step S3611 can be implemented by referring to the port identification information 3701 alone.

If it is determined in step S3611 that the data sent to the resource port is not data that aims at downloading of resources, an appropriate process is executed in step S3617, and the processing ends.

If it is determined in step S3611 that the data sent to the resource port 3411 is data that aims at downloading of resources, the flow advances to step S3612. In step S3612, an acceptance stop instruction of a print job is issued by the method that has been explained in association with the timing 3414 in FIG. 34. It is checked in step S4001 if print jobs remain in the print queue buffer 3415.

If it is determined in step S4001 that print jobs remain in the print queue buffer 3415, an e-mail message indicating that resource data will be downloaded is sent to the mail address in the output authorized person information 3802 (FIG. 38) for all jobs in the print queue buffer 3415 in step S4002. In this embodiment, the e-mail messages are sent to the output authorized persons. However, if print data senders are authorized to output data, e-mail messages may be sent to the senders using the sender information 3801.

The e-mail message may contain a comment that prompts the user to output or delete the print job, and information that pertains to a time period until the download process starts, which is determined by the system administrator upon sending download data, or a time period until the download process starts, which is predetermined in the system of this embodiment.

In step S4003, the control waits for an elapse of a predetermined time period, which has been explained as the information that pertains to the time period. The output authorized person of each job in the print queue buffer 3415 receives the e-mail message issued in step S4002, and can output or delete that job within this predetermined time period. After an elapse of the predetermined time period, it is checked again in step S3613 if print jobs remain in the print queue buffer 3415.

If it is determined in step S3613 that print jobs still remain in the print queue buffer 3415, one of such print jobs is canceled by the authority of the administrator, i.e., is deleted from the print queue buffer without being printed in step S3614. Steps S3613 and S3614 are repeated until all print jobs are deleted from the print queue buffer 3514 (until all of JOB1 to JOB4 are canceled in FIG. 38).

If it is confirmed in step S3613 that no print job remains in the print queue buffer 3415, the flow advances to step S3615 to store resource data in the appropriate storage area 3419.

Finally, an acceptance stop cancel instruction of a print job, i.e., restart instruction is issued by the method that has been explained in association with the timing 3420 in FIG. 34 in step S3616, thus ending the processing.

As described above, even upon downloading data to the printer directly connected to the PC, since the printer is controlled not to accept a print job upon downloading resources, an unwanted print process such as garbled characters or the like due to a change in resource data during generation of output data can be prevented. Furthermore, in the present invention, since queued print jobs are forcibly canceled at the time of reception of download data, a process which is normally executed by the administrator and influences all the clients can be preferentially and smoothly executed. Moreover, since an e-mail message is sent, a chance to rescue queued print jobs issued by the output authorized person can be provided prior to the download process of the administrator.

[Fifth Embodiment]

Figure 31:
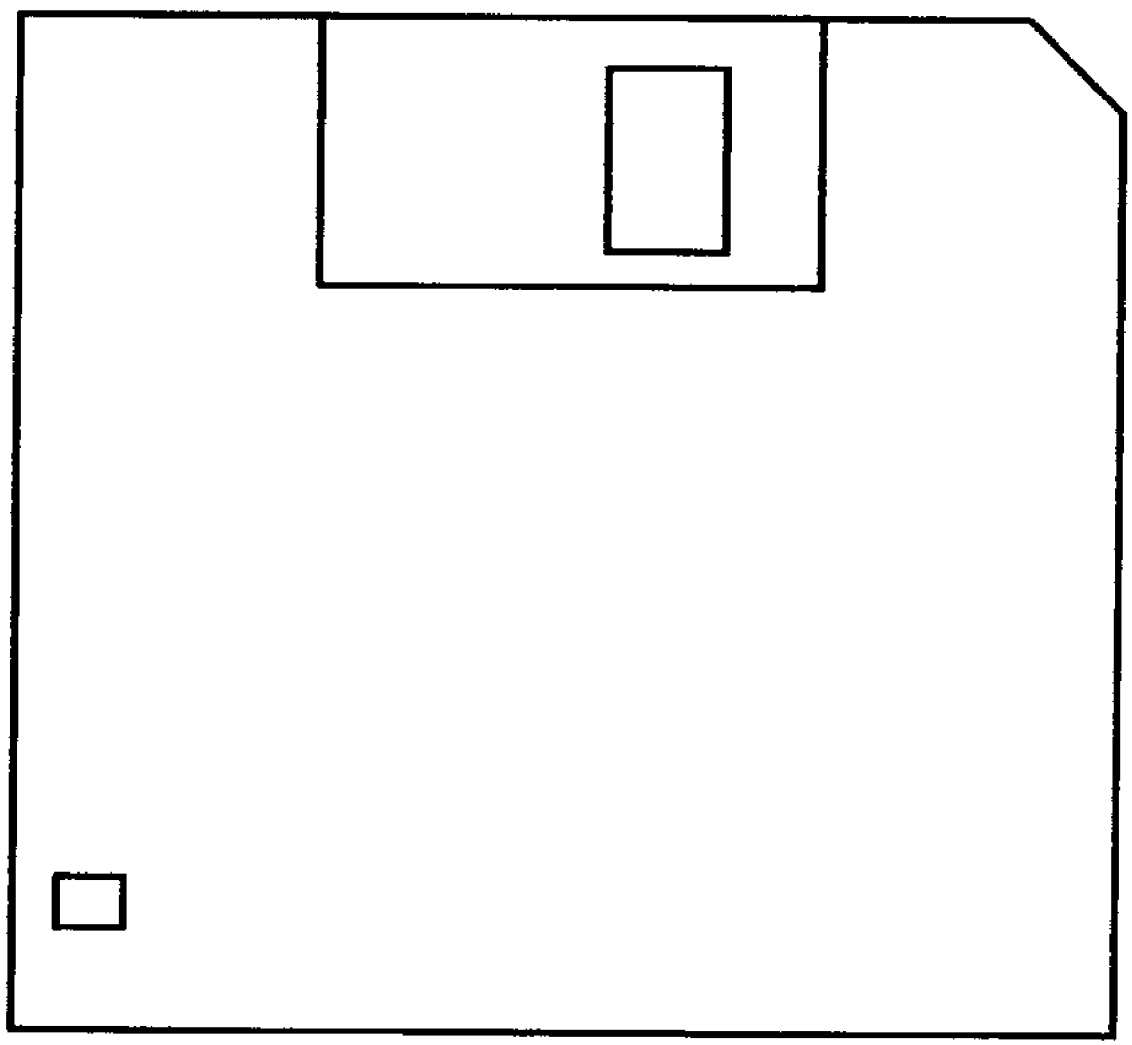
FIG. 31 shows a storage medium that stores a program which implements the present invention.

FIG. 31 shows a storage medium that stores a program which implements the present invention.

Figure 32A:
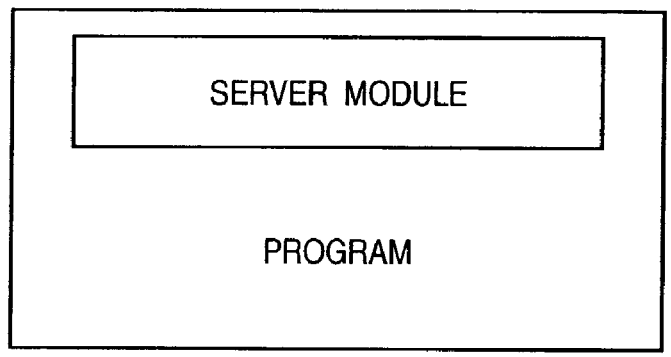
FIGS. 32A to 32C show program modules of the present invention.
Figure 32B:
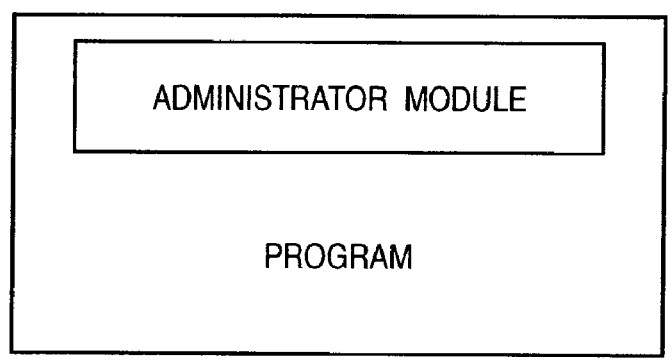
Figure 32C:
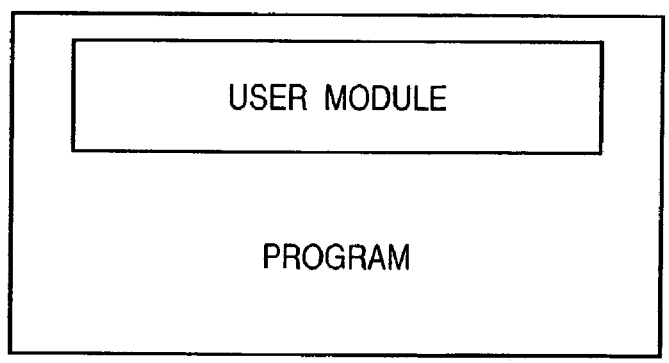

FIGS. 32A to 32C show program modules of the present invention.

Figure 33:
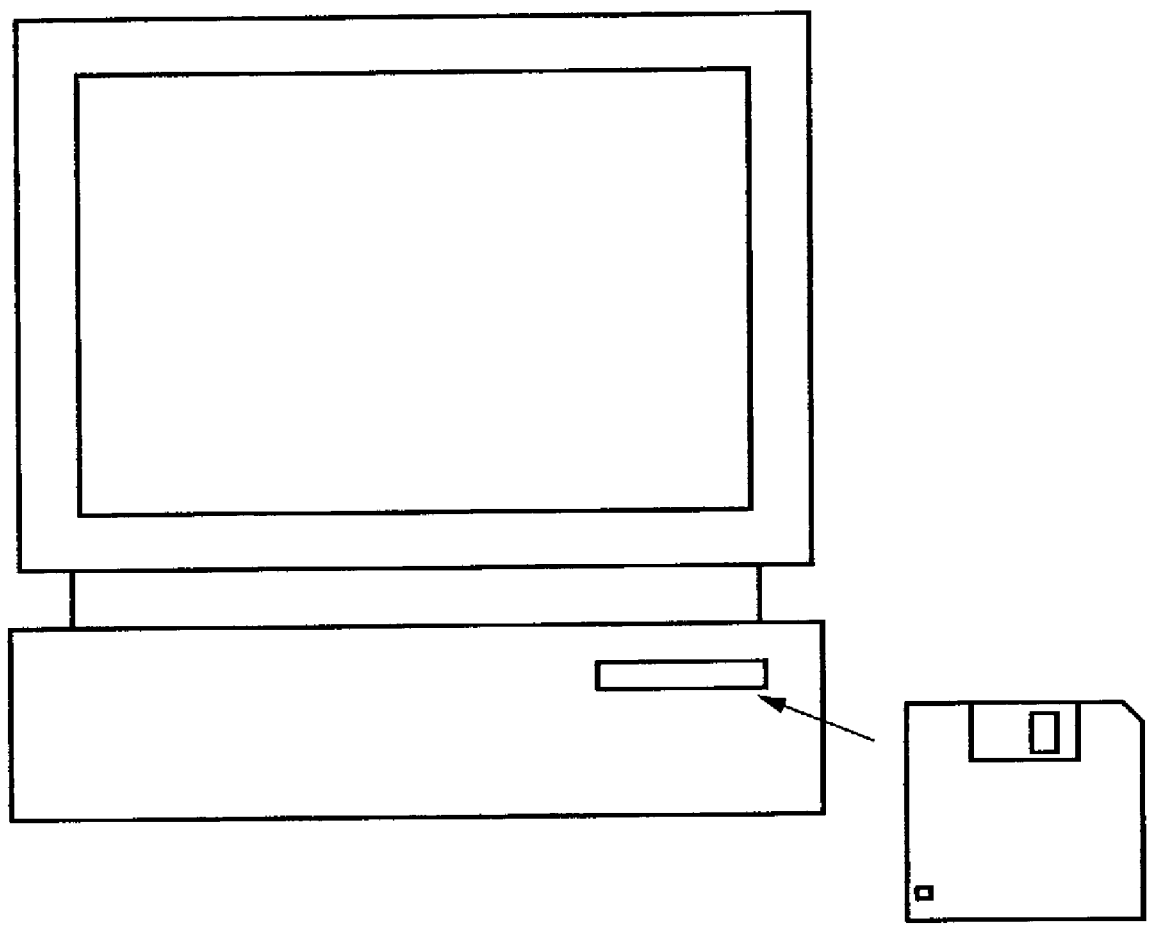
FIG. 33 is a view showing the process for loading a storage medium that stores a program of the present invention to a server, administrator personal computer, or user personal computer.

FIG. 33 is a view showing the process for loading a storage medium that stores a program of the present invention to a server, administrator personal computer, or user personal computer.

As can be understood from these figures, according to the present invention, a computer program shown in the form of the flow chart in each embodiment can be stored in a portable storage medium, which can be supplied to and executed by a computer such as a workstation, personal computer, or the like. Also, the program that controls the printing apparatus can be executed on the printing apparatus by directly loading the storage medium of FIG. 33 into the printing apparatus if the printing apparatus has a means for loading the storage medium, or by downloading that program from the administrator PC, as described in the first to fourth embodiments.

As described above, according to the present invention, upon receiving resource data by a printing apparatus or information processing apparatus which can asynchronously receive an output job and resource data used upon processing the output job, reception of a new output job after reception of the resource data is stopped. If it is determined that processes of print jobs which have already been received and queued are complete, held resource data is updated by the received resource data to avoid contention between the output request and the resource download process, and the resource data can be downloaded safely.

Since completion of the process of a print job is determined after the print process of the print job which has already been received and queued is completed, the job can be completed before downloading, in addition to the above effects.

Also, since a print job which has already been received and queued is deleted, and completion of the process of that print job is determined, the resource data can be downloaded quickly, in addition to the above effects.

Since completion of the process of a print job is determined after data of the print job which has already been received and queued is converted using the held resource data, and the converted data is stored in a save area, a job that requires authentication can be processed without authentication, and the resource data can be downloaded quickly, in addition to the above effects.

Since a message indicating that resource data is to be updated is issued to an address designated by each print job, which has already been received and queued, the message can be reliably sent to the source of the print job, in addition to the above effects.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which can receive an output job and resource data to be used upon processing the output job from a peripheral device management apparatus, and that holds updatable resource data, comprising:
    a detecting unit that detects reception of resource data by a reception unit;
    a reception control unit that stops reception of a new output job in response to the detecting unit detecting reception of the resource data; and
    an update unit that updates resource data held by the printing apparatus with the received resource data, when it is determined that a process of a print job which has already been received and queued is complete,
    wherein data of the print job, which has already been received and queued, is converted using the held resource data, and
    wherein said update unit determines processing of the print job which has already been received and queued is complete when conversion of the data of the queued print job has been finished.

2. The apparatus according to claim 1, wherein said update unit determines, upon receiving the resource data, completion of the process of the print job if a printout process of the print job which has already been received and queued is complete.

3. The apparatus according to claim 1, wherein said update unit determines, upon receiving the resource data, completion of the process of the print job by deleting the print job which has already been received and queued.

4. The apparatus according to claim 1, wherein the resource data contains font data, and the print job is converted into image data using the held resource data.

5. The apparatus according to claim 4, wherein the print job includes a print job which requires authentication of an authorized person upon outputting the print job, and authentication information required to permit output of the image data is stored together with the image data for the print job which requires authentication.

6. The apparatus according to claim 3, further comprising an issuing unit that issues, upon receiving the resource data, a message indicating that the resource data is to be updated to an address designated by each print job, which has already been received and queued, and wherein said update unit deletes the print job a predetermined time period after the message is issued.

7. The apparatus according to claim 1, wherein the print job includes a print job which requires authentication of an authorized person upon outputting the print job, and said update unit stores authentication information required to permit output of the image data together with the image data for the print job which requires authentication.

8. An information processing apparatus connected to a printing apparatus, which can receive an output job and resource data to be used upon processing the output job from a peripheral device management apparatus, and that holds updatable resource data, comprising:
    a detecting unit that detects reception of resource data by a reception unit;
    a reception control unit that stops reception of a new output job in response to the detecting unit detecting reception of the resource data by the reception unit; and
    an update unit that updates resource data held by the printing apparatus with the received resource data, when it is determined that a process of a print job which has already been received and queued is complete,
    wherein data of the print job, which has already been received and queued, is converted using the held resource data, and
    wherein said update unit determines processing of the print job which has already been received and queued is complete when conversion of the data of the queued print job has been finished.

9. The apparatus according to claim 8, wherein said update unit determines, upon receiving the resource data, completion of the process of the print job if a printout process of the print job which has already been received and queued is complete.

10. The apparatus according to claim 8, wherein said update unit determines, upon receiving the resource data, completion of the process of the print job by deleting the print job which has already been received and queued.

11. The apparatus according to claim 8, wherein the resource data contains font data, and the print job is converted into image data using the held resource data.

12. The apparatus according to claim 11, wherein the print job includes a print job which requires authentication of an authorized person upon outputting the print job, and authentication information required to permit output of the image data is stored together with the image data for the print job which requires authentication.

13. The apparatus according to claim 10, further comprising an issuing unit that issues, upon receiving the resource data, a message indicating that the resource data is to be updated to an address designated by each print job, which has already been received and queued, and wherein said update unit deletes the print job a predetermined time period after the message is issued.

14. An information processing apparatus connected to a printing apparatus, which can receive resource data and a processing request, which is processed using the resource data, from a peripheral device management apparatus, and that holds updatable resource data, comprising:
   a detecting that detects reception of resource data by a reception unit;
   a reception control unit that stops reception of a new processing request in response to the detecting unit detecting reception of the resource data; and
   an update unit that updates resource data held by the information processing apparatus with the received resource data, when it is determined that a process of a processing request which has already been received and queued is complete,
   wherein data of the print job, which has already been received and queued, is converted using the held resource data, and
   wherein said update unit determines processing of the print job which has already been received and queued is complete when conversion of the data of the queued print job has been finished.

15. A method of controlling a printing apparatus, which can receive an output job and resource data to be used upon processing the output job from a peripheral device management apparatus, and that holds updatable resource data, comprising:
   a detecting step of detecting reception of resource data by a reception unit;
   a reception control step of stopping reception of a new output job in response to the detecting step detecting reception of the resource data; and
   an update step of updating resource data held by the printing apparatus with the received resource data, when it is determined that a process of a print job which has already been received and queued is complete,
   wherein data of the print job, which has already been received and queued, is converted using the held resource data, and
   wherein said update step determines processing of the print job which has already been received and queued is complete when conversion of the data of the queued print job has been finished.

16. The method according to claim 15, wherein the update step includes the step of determining, upon receiving the resource data, completion of the process of the print job if a printout process of the print job which has already been received and queued is complete.

17. The method according to claim 15, wherein the update step includes the step of determining, upon receiving the resource data, completion of the process of the print job by deleting the print job which has already been received and queued.

18. The method according to claim 15, wherein the resource data contains font data, and the print job is converted into image data using the held resource data.

19. The method according to claim 18, wherein the print job includes a print job which requires authentication of an authorized person upon outputting the print job, and authentication information required to permit output of the image data is stored together with the image data for the print job which requires authentication.

20. The method according to claim 17, further comprising an issuing step of issuing, upon receiving the resource data, a message indicating that the resource data is to be updated to an address designated by each print job, which has already been received and queued, and wherein the update step includes the step of deleting the print job a predetermined time period after the message is issued.

21. A method of controlling a peripheral device, which can receive resource data and a processing request, which is processed using the resource data, and that holds updatable resource data, comprising:
   a detecting step of detecting reception of resource data by a reception unit; and
   an update step of stopping reception of a new output job in response to the detecting step detecting reception of the resource data, and updating resource data held by the peripheral device with the received resource data, when it is determined that a process of a print job which has already been received and queued is complete,
   wherein data of the print job, which has already been received and queued, is converted using the held resource data, and
   wherein said update step determines processing of the print job which has already been received and queued is complete when conversion of the data of the queued print job has been finished.

22. A computer readable recording medium on which a program for controlling a printing apparatus is encoded, wherein the printing apparatus can receive an output job and resource data used upon processing the output job from a peripheral device management apparatus, and that holds updatable resource data, said computer program comprising the steps of:
   a detecting step of detecting reception of resource data by a reception unit; and
   an update step of stopping reception of a new output job in response to the detecting step detecting reception of the resource data, and updating resource data held by the printing apparatus with the received resource data, when it is determined that a process of a print job which has already been received and queued is complete,
   wherein data of the print job, which has already been received and queued, is converted using the held resource data, and
   wherein said update step determines processing of the print job which has already been received and queued is complete when conversion of the data of the queued print job has been finished.

23. The recording medium according to claim 22, wherein said update step determines, upon receiving the resource data, completion of the process of the print job if a printout process of the print job which has already been received and queued is complete.

24. The recording medium according to claim 22, wherein said update step determines, upon receiving the resource data, completion of the process of the print job by deleting the print job which has already been received and queued.

25. The recording medium according to claim 22, wherein the resource data contains font data, and the print job is converted into image data using the held resource data.

26. The recording medium according to claim 25, wherein the print job includes a print job which requires authentication of an authorized person upon outputting the print job, and authentication information required to permit output of the image data is stored together with the image data for the print job which requires authentication.

27. The recording medium according to claim 24, further comprising an issuing step of issuing, upon receiving the resource data, a message indicating that the resource data is to be updated to an address designated by each print job, which has already been received and queued, and wherein said update step deletes the print job a predetermined time period after the message is issued.

28. A computer readable recording medium on which a program for controlling a peripheral device is encoded, wherein the peripheral device can receive resource data and a processing request, which is processed using the resource data, and that holds updatable resource data, said program comprising the steps of:

a detecting step of detecting reception of resource data by a reception unit; and an update step of stopping reception of a new output job in response to the detecting step detecting reception of the resource data and updating resource data held by the peripheral device with the received resource data, when it is determined that a process of a print job which has already been received and queued is complete, wherein data of the print job, which has already been received and queued, is converted using the held resource data, and wherein said update unit determines processing of the print job which has already been received and queued is complete when conversion of the data of the queued print job has been finished.

* * * * *

UNITED STATES PATENT AND TRADEMARK OFFICE
CERTIFICATE OF CORRECTION

PATENT NO. : 7,154,617 B2  Page 1 of 1
APPLICATION NO. : 10/190533
DATED : December 26, 2006
INVENTOR(S) : Ikeno It is certified that error appears in the above-identified patent and that said Letters Patent is hereby corrected as shown below:

COLUMN 1:
Line 28, "parallelly execute" should read -- execute in parallel --;
Line 43, "parallelly executed," should read -- executed in parallel, --; and
Line 57, "uses" should read -- users --.

COLUMN 11:
Line 9, "basis" should read -- basis of --.

COLUMN 13:
Line 45, "not" should read -- not the --.

COLUMN 15:
Line 40, "cancel" should read -- cancellation --.

COLUMN 26:
Line 53 Claim 9, "pnntout" should read -- printout --.

Signed and Sealed this

Eighteenth Day of March, 2008

JON W. DUDAS
*Director of the United States Patent and Trademark Office*